United States Patent
Kitazato et al.

(10) Patent No.: US 11,528,539 B2
(45) Date of Patent: Dec. 13, 2022

(54) RECEIVING DEVICE, RECEIVING METHOD, TRANSMITTING DEVICE, AND TRANSMITTING METHOD

(71) Applicant: SATURN LICENSING LLC, New York, NY (US)

(72) Inventors: Naohisa Kitazato, Tokyo (JP); Yoshiharu Dewa, Tokyo (JP); Jun Kitahara, Shizuoka (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/916,507

(22) PCT Filed: Jul. 17, 2015

(86) PCT No.: PCT/JP2015/070498
§ 371 (c)(1),
(2) Date: Mar. 3, 2016

(87) PCT Pub. No.: WO2016/017451
PCT Pub. Date: Feb. 4, 2016

(65) Prior Publication Data
US 2016/0205449 A1  Jul. 14, 2016

(30) Foreign Application Priority Data

Aug. 1, 2014 (JP) .............................. JP2014-158231

(51) Int. Cl.
*H04N 21/81* (2011.01)
*H04N 21/435* (2011.01)
(Continued)

(52) U.S. Cl.
CPC ........ *H04N 21/8166* (2013.01); *H04H 20/93* (2013.01); *H04H 60/13* (2013.01);
(Continued)

(58) Field of Classification Search
CPC .................................................... H04N 21/234
(Continued)

(56) References Cited

U.S. PATENT DOCUMENTS 7,516,472 B2 * 4/2009 Danker .............. H04N 7/17318
  348/180
8,196,169 B1 * 6/2012 Herz ................. H04N 21/25841
  725/25
(Continued)

FOREIGN PATENT DOCUMENTS

CN  202282838 U  6/2012
CN  202663513 U  1/2013
(Continued)

OTHER PUBLICATIONS

International Search Report dated Oct. 6, 2015 in PCT/JP15/070498 Filed Jul. 17, 2015.
(Continued)

*Primary Examiner* — Mushfikh I Alam
(74) *Attorney, Agent, or Firm* — Oblon, McClelland, Maier & Neustadt, L.L.P.

(57) ABSTRACT

A receiving device, a receiving method, a transmitting device, and a transmitting method. The receiving device acquires a digital broadcast signal that includes audio-video (AV) content and location information, the location information indicating a source from which application control information for controlling an operation of an application executed in conjunction with a progressing timing of the AV content is obtainable, acquires the application control information from the source indicated by the location information, the application control information including an application ID and a uniform resource locator (URL), obtains, from the URL included in the acquired application control information, control information during a polling period that is defined in accordance with an attribute specified in the (Continued)

```
Trigger = locator_part [ "?" terms ]

terms = (action | media_time | event) [ "&" spread ] [ "&" version] [ "&" others]
```

US 11,528,539 B2
Page 2 acquired application control information, and controls the operation of the application based on the acquired application control information and the obtained control information.

24 Claims, 36 Drawing Sheets

(51) Int. Cl.
*H04N 21/2183* (2011.01)
*H04N 21/6543* (2011.01)
*H04N 21/858* (2011.01)
*H04N 21/237* (2011.01)
*H04H 60/13* (2008.01)
*H04H 20/93* (2008.01)
*H04N 21/845* (2011.01)
*H04N 21/8547* (2011.01)
*H04N 21/8543* (2011.01)

(52) U.S. Cl.
CPC ....... *H04N 21/2183* (2013.01); *H04N 21/237* (2013.01); *H04N 21/435* (2013.01); *H04N 21/6543* (2013.01); *H04N 21/8126* (2013.01); *H04N 21/8456* (2013.01); *H04N 21/858* (2013.01); *H04N 21/8543* (2013.01); *H04N 21/8547* (2013.01); *H04N 21/8586* (2013.01); *H04H 2201/40* (2013.01)

(58) Field of Classification Search
USPC .................................................. 725/74–104
See application file for complete search history.

(56) References Cited

U.S. PATENT DOCUMENTS

| | | | | |
|---|---|---|---|---|
| 9,936,256 | B2* | 4/2018 | Kitahara | H04N 21/4722 |
| 10,567,833 | B2* | 2/2020 | Kitahara | H04N 21/4345 |
| 2002/0147984 | A1* | 10/2002 | Tomsen | H04N 5/4401 725/109 |
| 2004/0059775 | A1* | 3/2004 | Jacobs | H04L 29/06027 709/203 |
| 2004/0237102 | A1* | 11/2004 | Konig | G06Q 30/02 725/36 |
| 2005/0246757 | A1* | 11/2005 | Relan | H04N 5/76 725/135 |
| 2006/0277566 | A1* | 12/2006 | Vince | H04N 21/42684 725/30 |
| 2007/0067817 | A1* | 3/2007 | Hamilton | H04L 63/08 725/100 |
| 2007/0256097 | A1* | 11/2007 | Hong | H04H 60/25 725/38 |
| 2008/0301262 | A1* | 12/2008 | Kinoshita | H04L 67/02 709/219 |
| 2009/0313663 | A1* | 12/2009 | Kitazato | H04N 21/6408 725/87 |
| 2010/0017820 | A1* | 1/2010 | Thevathasan | G11B 27/036 725/35 |
| 2010/0049781 | A1* | 2/2010 | Keeni | H04L 41/046 709/202 |
| 2010/0115540 | A1* | 5/2010 | Fan | H04N 21/25816 725/1 |
| 2010/0138536 | A1* | 6/2010 | Koreeda | H04L 67/325 709/225 |
| 2010/0223653 | A1* | 9/2010 | Koppelaar | H04N 21/23406 725/142 |
| 2010/0313247 | A1* | 12/2010 | Pen | G06Q 30/02 726/4 |
| 2011/0055862 | A1* | 3/2011 | Harp | H04N 7/17318 725/25 |
| 2011/0060993 | A1* | 3/2011 | Cotter | H04N 21/2743 715/720 |
| 2011/0072269 | A1* | 3/2011 | Takechi | H04L 63/0428 713/175 |
| 2011/0222510 | A1* | 9/2011 | Benjamins | H04W 48/12 370/331 |
| 2011/0296472 | A1* | 12/2011 | Soldan | H04N 5/4401 725/81 |
| 2012/0131611 | A1* | 5/2012 | Yeap | H04N 21/42202 725/35 |
| 2012/0159344 | A1* | 6/2012 | Park | H04L 67/025 715/740 |
| 2012/0243851 | A1* | 9/2012 | Koreeda | G11B 20/00847 386/252 |
| 2012/0254918 | A1* | 10/2012 | Takahashi | H04N 21/6543 725/40 |
| 2013/0074111 | A1* | 3/2013 | Hyde | H04N 21/2146 725/25 |
| 2013/0111530 | A1* | 5/2013 | Kitazato | H04N 21/4627 725/93 |
| 2013/0132999 | A1* | 5/2013 | Pandey | H04N 21/4221 725/35 |
| 2013/0198768 | A1 | 8/2013 | Kitazato | |
| 2013/0198772 | A1* | 8/2013 | Wang | H04H 20/18 725/32 |
| 2013/0212634 | A1* | 8/2013 | Kitazato | H04N 21/4307 725/116 |
| 2013/0254824 | A1* | 9/2013 | Eyer | H04N 21/2353 725/116 |
| 2013/0283311 | A1 | 10/2013 | Eyer | |
| 2013/0340007 | A1* | 12/2013 | Eyer | H04N 21/8133 725/40 |
| 2013/0343762 | A1* | 12/2013 | Murayama | H04B 10/116 398/130 |
| 2014/0040965 | A1 | 2/2014 | Kitazato et al. | |
| 2014/0040968 | A1* | 2/2014 | Kitazato | H04N 21/462 725/115 |
| 2014/0043540 | A1* | 2/2014 | Kitazato | H04N 5/44 348/723 |
| 2014/0075470 | A1 | 3/2014 | Oh et al. | |
| 2014/0105116 | A1* | 4/2014 | Ding | H04W 74/06 370/328 |
| 2014/0237520 | A1* | 8/2014 | Rothschild | H04N 21/236 725/88 |
| 2014/0337867 | A1* | 11/2014 | Wilson | G01S 19/14 725/9 |
| 2014/0373042 | A1* | 12/2014 | Le Pelerin | H04N 21/4348 725/31 |
| 2015/0012937 | A1* | 1/2015 | Yamagishi | H04W 88/04 725/32 |
| 2015/0033271 | A1* | 1/2015 | Lee | H04N 21/858 725/93 |
| 2015/0161632 | A1* | 6/2015 | Humay | G06Q 30/0203 705/7.32 |
| 2015/0215670 | A1* | 7/2015 | Patel | H04N 21/6143 725/44 |
| 2015/0237410 | A1* | 8/2015 | Yu | H04N 21/812 725/32 |
| 2016/0100220 | A1* | 4/2016 | Toma | H04H 60/13 725/110 |
| 2016/0165276 | A1* | 6/2016 | Toma | H04N 21/8547 725/116 |
| 2017/0238032 | A1* | 8/2017 | Casavant | H04N 21/25816 725/25 |
| 2017/0339730 | A1* | 11/2017 | Van Phan | H04W 72/1289 |

FOREIGN PATENT DOCUMENTS

| | | |
|---|---|---|
| CN | 103765912 A | 4/2014 |
| JP | 2001-136444 A | 5/2001 |
| WO | 2014/021126 A1 | 2/2014 |
| WO | 2014/027563 A1 | 2/2014 |

OTHER PUBLICATIONS

Extended European Search Report dated Jan. 22, 2018 in Patent Application No. 15828221.0.

(56) References Cited

OTHER PUBLICATIONS

"Digital Video Broadcasting (DVB); Signaling and carriage of interactive applications and services in Hybrid broadcast/broadband environments", ETSI TS 102 809, V1.2.1, XP055132824, Jul. 2013, 98 pages.

Notification of the First Office Action dated Apr. 18, 2019 in corresponding Chinese Application No. 201580002007.X, filed Jul. 17, 2015 (with English translation) (19 pages).

Office Action dated Aug. 8, 2019 in Japanese Patent Application No. 2016-510532.

* cited by examiner

FIG. 2

```
<action>
a=<appID>.<action_code>[.<event_data>][&a=<appID>.<action_code>[.<event_data>]]* [&t=<event_time>]

action_code
a1 : Prefetch / a2 : Execute / a3 : Kill / a4 : Suspend/
e1 TO eN : fire event with eventID (1 TO N)
```

```
<event>
e=<eventID>.<edit_code> [&t=<event_time>]

edit_code
1 : delete / 2 : update
```

FIG. 4

| Trigger sample | |
|---|---|
| xbc.tv/e12 | Pre-load metadata file(AIT and others if any) from identified location. (on line at http://xbc.tv/e12 or within associated SCS FLUTE Session) |
| xbc.tv/e12?m=5a33 | Identify the location of metadata and establish the current media time of the associated content. |
| xbc.tv/e12?a=42a8.a2 | Identify the location of metadata and signal that the application with appId=0x42a8 will start execution. |
| xbx.tv/e12?a=42a8.a4&a=4314.a2 | Identify the location of metadata and signal that the application with appId=0x42a8 will be suspended and that the application with appId=0x4314 will start execution. |
| xbc.tv/e12?a=42a8.e1.1762&t=77ee | Identify the location of metadata and signal that the application with appId=0x42a8 will fire the event with eventId=1 at media time 77ee and the associated data with integer value of 1762 will inject to the application. |
| xbc.tv/e12?e=12.1 | Identify the location of metadata and signal the event with eventId=12 in EMT will be deleted. |
| xbc.tv/e12?e=12.2&t=77ee | Identify the location of metadata and signal the event time of event with eventId=12 in EMT will be updated to media time 77ee. |

*FIG. 5*

| Element/Attribute(with@) | | | | | Cardinality | Data Type | Description |
|---|---|---|---|---|---|---|---|
| ServiceDiscovery | | | | | | | |
| | ApplicationDiscovery | | | | 1 | | |
| | | @DomainName | | | 1 | String | |
| | | ApplicationList | | | 1 | | List of applications (TDOs) which can execute at current program. |
| | | | Application | | 1..N | | Application (TDO) |
| | | | | appName | 0..N | String | Application name. which can be multi-lingual |
| | | | | applicationIdentifier | 1 | | Global unique application ID. |
| | | | | orgID | 1 | unsigned Short | Organization ID, which submits the application. |
| | | | | appID | 1 | unsigned Int | Application ID within the scope of the organization. |
| | | | | applicationDescriptor | 1 | | |
| | | | | type | 1 | String | "ATSC-HTML" |
| | | | | controlCode | 1 | String | "AUTOSTART"," PRESENT"," KILL"," PREFETCH", |
| | | | | serviceBound | 0..1 | Boolean | Indicates whether the application operation scope is within the service or unbound |
| | | | | priority | 0..1 | Hexadecimal 8bit | Application priority value to judge which app should be launched |
| | | | | icon | 0..1 | | Application icon location and size |
| | | | | applicationTransport | 1..N | | Application transport method & rough location |
| | | | | @type | | String | "HTTPTransportType" |
| | | | | URLBase | 1 | anyURI | Application URL Base (upper) |
| | | | | URL Extension | 0..N | anyURI | Application URL extension (middle) |
| | | | | applicationLocation | 1 | anyURI | Applicatoion file URL (lower) |
| | | | | applicationBoundary | 0..N | anyURI | Apploation operation scope of domain |

FIG. 6

| Element/Attribute (with@) | Cardinality | Data Type | Description |
|---|---|---|---|
| EMT | | | |
| @majorProtocolversion | 0..1 | Integer0..15 | Major protocol version default="1" |
| @minorProtocolVersion | 0..1 | Integer 0..15 | Minor protocol version default="0" |
| @id | 1 | anyURI | domain_name/program_id/segment_id (function as AIT/EMT location) |
| @EMTVersion | 1 | unsignedByte | Data version of EMT |
| @beginMT | 0..1 | unsignedInt | Start time of this segment time scope |
| LiveTrigger | 0..1 | | Info on internet live trigger delivery |
| @URL | 1 | any URI | URL of server for live triggers |
| @pollPeriod | 0..1 | unsignedByte | Short polling period in seconds |
| Event | 0..N | | Event message |
| @id | 1 | unsignedShort | Unique identifier of this Event element within the scope of the program |
| @appID | 1 | unsignedShort | Application ID of this app. Unique within the scope of the program |
| @action | 1 | string | Allowed values are "Prefetch", "Execute", "Suspend", and "Kill", "Inject Event" |
| @startTime | 1 | unsignedInt | Start time of action period |
| @endTime | 0..1 | unsignedInt | End time of action period |
| Data | 0..N | base64Binary | Data to be used for this event |
| @dataID | 1 | unsignedShort | Unique identifier of this Data element within the scope of the program. |

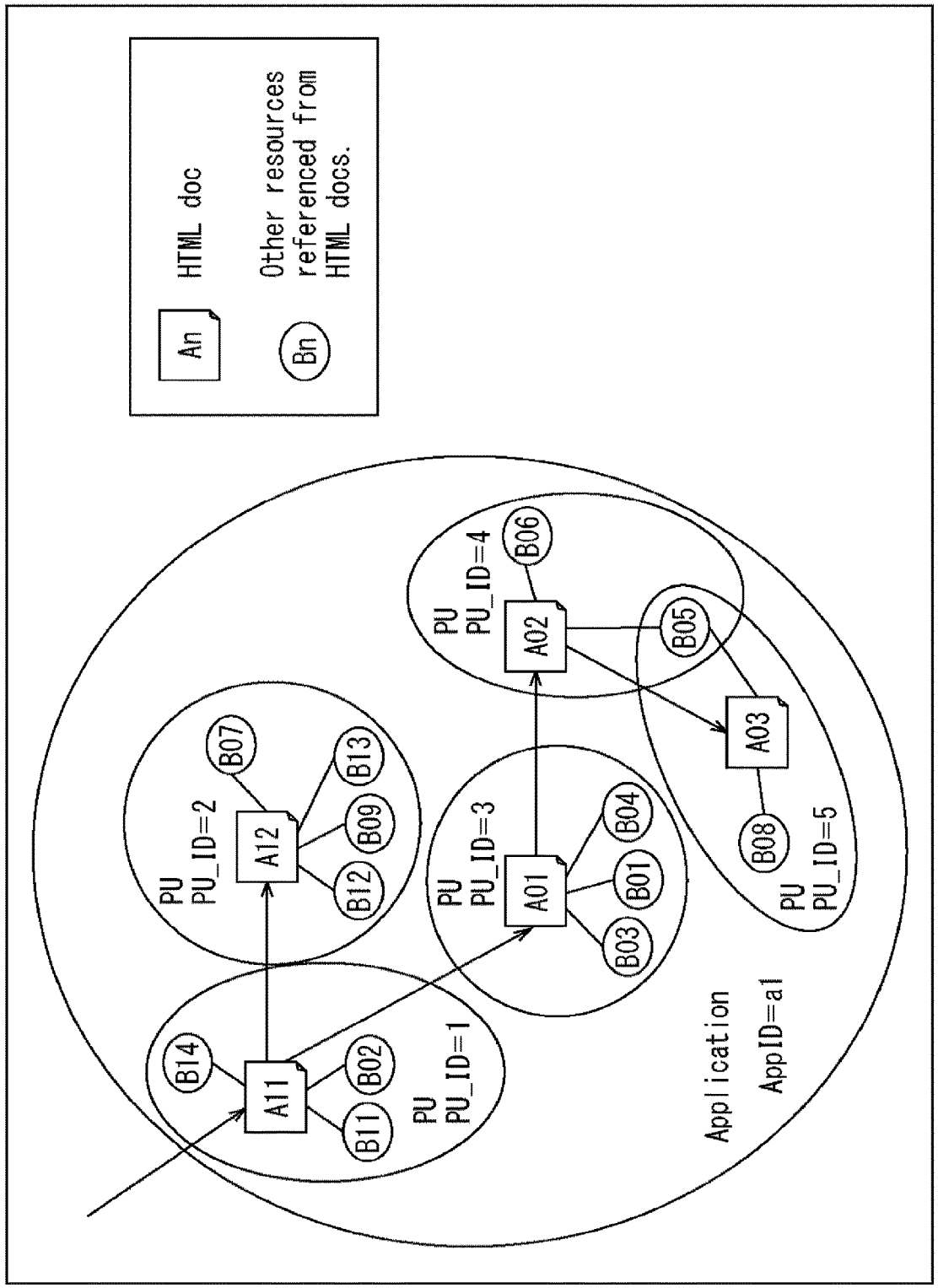

FIG. 9

| Element/Attribute (with@) | | | | Cardinality | Data Type | Description |
|---|---|---|---|---|---|---|
| CCT | | | | | | |
| | @majorProtocolVersion | | | 0..1 | Integer0..15 | Major protocol version default= "1" |
| | @minorProtocolVersion | | | 0..1 | Integer 0..15 | Minor protocol version default= "0" |
| | @CCTVersion | | | 1 | unsignedByte | Data version of CCT |
| | @baseURI | | | 0..1 | anyURI | Base URL for all relative URLs in CCT |
| | Application | | | 0..N | | Application (TDO) |
| | | @appID | | 1 | unsignedShort | Application ID Lower part of AIT application identifier (=application ID) |
| | | @size | | 0..1 | unsignedShort | Application size (kByte) |
| | | PU | | 1..N | unsignedShort | Presentation unit of the application, which is the set of items used simultaneously of the application. |
| | | | @id | 1 | unsignedByte | Presentation unit ID within the scope of the application. |
| | | | @size | 1 | unsignedShort | Presentation unit size (Kbyte) |
| | | | Item | 1..N | | Each file to be cached at the PU. |
| | | | @primary | 0..1 | Boolean | Primary file of the PU, or not. |
| | | | @uri | 1 | anyURI | Item URL |
| | | | @type | 0..1 | string | m: member file of the PU p: not member but to be cached (pre-cache) |
| | | | LinkedPU | 0..N | | PUs which is linked from the PU. This info. Is supposed to be used as hint for receiver voluntary pre-cache. |
| | | | @id | 1 | unsignedByte | PU ID of Linked PU |

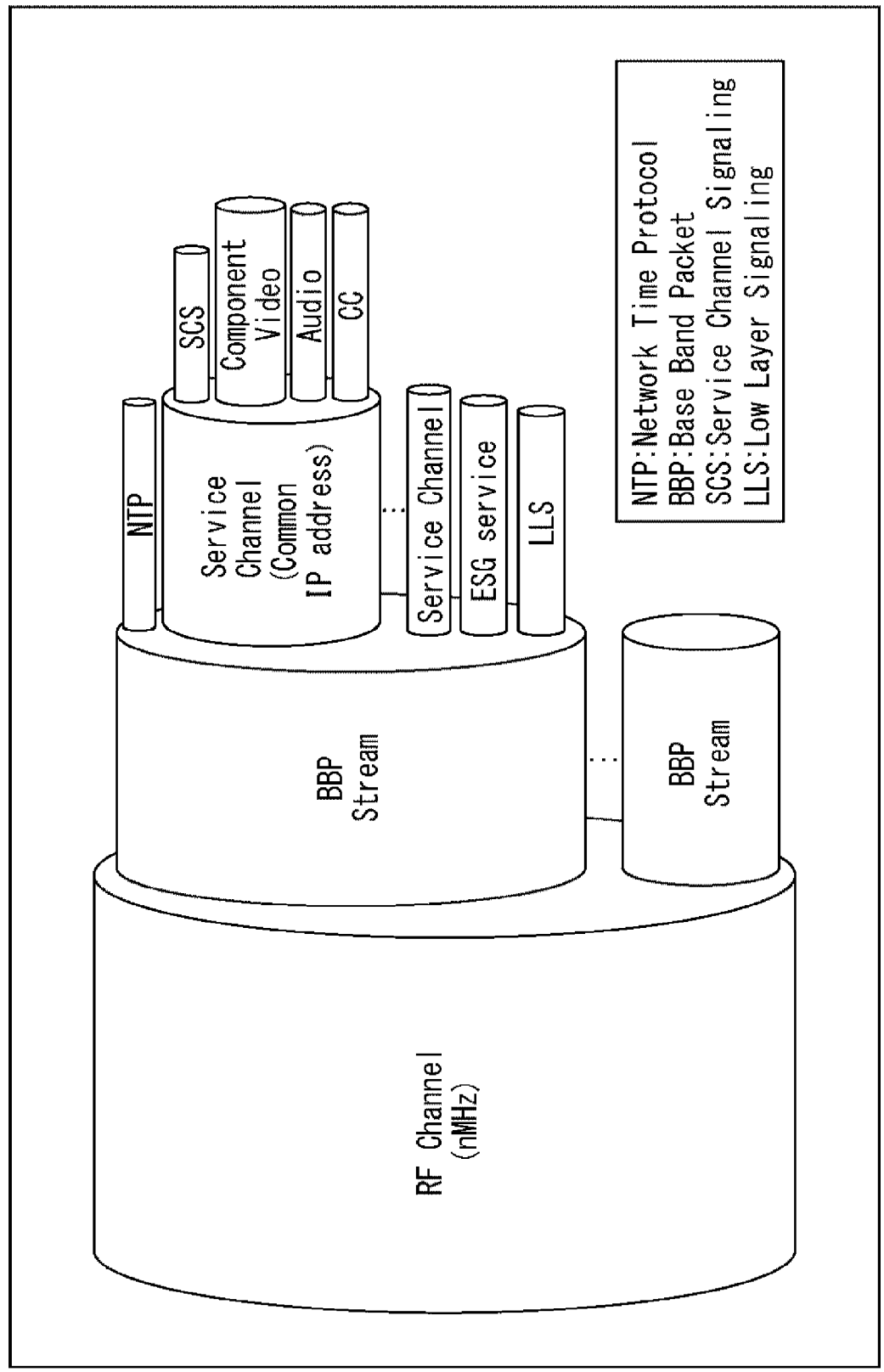

RECEIVING DEVICE, RECEIVING METHOD, TRANSMITTING DEVICE, AND TRANSMITTING METHOD

TECHNICAL FIELD

The present technique relates to a receiving device, a receiving method, a transmitting device, and a transmitting method, and more particularly, to a receiving device, a receiving method, a transmitting device, and a transmitting method that can satisfactorily operate an application which is executed in conjunction with AV content.

BACKGROUND ART

An operation of redistributing audio-video (AV) content such as programs which are broadcast in terrestrial broadcast using cable television (CATV) or satellite broadcast has been carried out (for example, see Patent Document 1).

CITATION LIST

Patent Document

Patent Document 1: Japanese Patent Application Laid-Open No. 2001-136444

SUMMARY OF THE INVENTION

Problems to be Solved by the Invention

When AV content such as programs which are broadcast in terrestrial broadcast are redistributed by cable TV or the like, systems defined in the terrestrial broadcast such as control of applications to be executed in conjunction with the AV content may not be used in redistribution by the cable TV or the like. In this case, since a receiver cannot operate the applications executed in conjunction with the AV content such as programs, there is a need for techniques for satisfactorily operating the applications.

The present technique is invented in consideration of the above-mentioned circumstances and an object thereof is to satisfactorily operate an application which is executed in conjunction with AV content.

Solutions to Problems

A receiving device according to a first aspect of the present technique including: a first acquiring unit that acquires trigger information including at least location information as information for controlling an operation of an application which is executed in conjunction with audio-video (AV) content; a second acquiring unit that acquires application control information for controlling the operation of the application; and a control unit that controls the operation of the application based on the trigger information and the application control information.

The trigger information may include time information serving as a reference of a time to control the operation of the application, the second acquiring unit may acquire schedule control information in which the operation of the application is prescribed in a time series, and the control unit may control the operation of the application based on action information for the application corresponding to the time when the time counted based on the time information passes through the time prescribed in the schedule control information.

The application may be constituted by a plurality of files, the second acquiring unit may acquire cache control information for controlling a cache of a file group constituting the application, and the control unit may store the file group constituting the application in a cache memory based on the cache control information.

The trigger information may include editing information for editing details prescribed in the schedule control information, and the control unit may edit the schedule control information based on the editing information.

The location information may be information for acquiring the application control information, the schedule control information, and the cache control information, and the application control information, the schedule control information, and the cache control information may be correlated by identification information of the application.

The trigger information may include action information for the application, and the control unit may control the operation of the application based on the action information included in the trigger information when the trigger information is acquired.

The application may be constituted by a plurality of files, the second acquiring unit may acquire cache control information for controlling a cache of a file group constituting the application, and the control unit may store the file group constituting the application in a cache memory based on the cache control information.

The location information may be information for acquiring the application control information and the cache control information, and the trigger information, the application control information, and the cache control information may be correlated by identification information of the application.

The AV content may be broadcast content which is transmitted by a digital broadcast signal, the trigger information may be included in the digital broadcast signal and is distributed along with the digital broadcast signal or distributed from a server on the Internet, and the first acquiring unit may acquire the trigger information which is distributed in broadcast or communication.

The receiving device according to the first aspect of the present technique may be an independent device or an internal block constituting one device. The receiving method according to the first aspect of the present technique is a receiving method corresponding to the receiving device according to the first aspect of the present technique.

In the receiving device and the receiving method according to the first aspect of the present technique, trigger information including at least location information is acquired as information for controlling the operation of an application which is executed in conjunction with AV content, application control information for controlling the operation of the application is acquired, and the operation of the application is controlled based on the trigger information and the application control information.

A transmitting device according to a second aspect of the present technique, includes: an acquiring unit that acquires AV content; a first generating unit that generates trigger information including at least location information as information for controlling an operation of an application which is executed in conjunction with the AV content; a second second generating unit that generates application control information for controlling the operation of the application; and a transmitter unit that transmits the trigger information and the application control information along with the AV content.

The first generating unit may generate the trigger information including time information serving as a reference of a time to control the operation of the application, the second generating unit may generate schedule control information in which the operation of the application is prescribed in a time series, and the transmitter unit may transmit the trigger information including the time information and the schedule control information.

The application may be constituted by a plurality of files, the second generating unit may generate cache control information for controlling a cache of a file group constituting the application, and the transmitter unit may additionally transmit the cache control information.

The first generating unit may generate the trigger information including editing information for editing details prescribed in the schedule control information, and the transmitter unit may transmit the trigger information including the editing information.

The location information may be information for acquiring the application control information, the schedule control information, and the cache control information, and the application control information, the schedule control information, and the cache control information may be correlated by identification information of the application.

The first generating unit may generate the trigger information including action information for the application, and the transmitter unit may transmit the trigger information including the action information.

The application may be constituted by a plurality of files, the second generating unit may generate cache control information for controlling a cache of a file group constituting the application, and the transmitter unit may additionally transmit the cache control information.

The location information may be information for acquiring the application control information and the cache control information, and the trigger information, the application control information, and the cache control information may be correlated by identification information of the application.

The AV content may be broadcast content, and the transmitter unit may transmit the trigger information and the application control information along with the AV content using a digital broadcast signal.

The transmitting device according to the second aspect of the present technique may be an independent device or an internal block constituting one device. The transmitting method according to the second aspect of the present technique is a transmitting method corresponding to the transmitting device according to the second aspect of the present technique.

In the transmitting device and the transmitting method according to the second aspect of the present technique, AV content is acquired, trigger information including at least location information is generated as information for controlling the operation of an application which is executed in conjunction with the AV content, application control information for controlling the operation of the application is acquired, and the trigger information and the application control information are transmitted along with the AV content.

Effects of the Invention

According to the first aspect and the second aspect of the present technique, it is possible to satisfactorily operate an application which is executed in conjunction with AV content.

The present technique is not limited to the above-described effects but may have any effect described in this disclosure.

BRIEF DESCRIPTION OF DRAWINGS

FIG. 2 is a diagram illustrating a method of describing action information.
FIG. 4 is a diagram illustrating a description example of trigger information.
FIG. 5 is a diagram illustrating an example of syntax of an AIT.
FIG. 6 is a diagram illustrating an example of syntax of an EMT.
FIG. 7 is a diagram illustrating a summary of a CCT.
FIG. 9 is a diagram illustrating an example of syntax of a CCT.
FIG. 10 is a diagram illustrating a system pipe model of digital broadcast using an IP transmission method.

MODE FOR CARRYING OUT THE INVENTION

Hereinafter, embodiments of the present technique will be described with reference to the accompanying drawings. The description is made in the following order.

1. Summary of Application Control
2. Summary of Digital Broadcast using IP Transmission Method
3. Specific Use Case
 (1) Use Case 1: Application Control in conjunction with Recorded Program
 (2) Use Case 2: Application Control in conjunction with Live Program
 (3) Use Case 3: Hybrid Application Control
 (4) Use Case 4: Application Control in conjunction with Recorded Program (corresponding to ACR)
 (5) Use Case 5: Application Control in conjunction with Live Program (corresponding to ACR)
 (6) Use Case 6: Application Control using SCS Signaling Information
4. Configuration of System
5. Process Flows performed by Devices
6. Configuration of Computer <1. Summary of Application Control>

First, the summary of application control according to the present technique will be described below.

In the application control according to the present technique, an operation of an application which is executed in conjunction with AV content such as programs is controlled using trigger information and metadata.

The trigger information is information for controlling an operation of an application and includes at least location information. The metadata includes an application information table (AIT), an event message table (EMT), and a content configuration table (CCT).

The AIT is application control information for controlling an operation of an application. The EMT is schedule control information in which the operation of the application is prescribed in a time series. The CCT is cache control information for controlling a cache of a file group constituting the application. Detailed configurations of the trigger information and the metadata will be described below.

(Detailed Configuration of Trigger Information)

Figure 1:
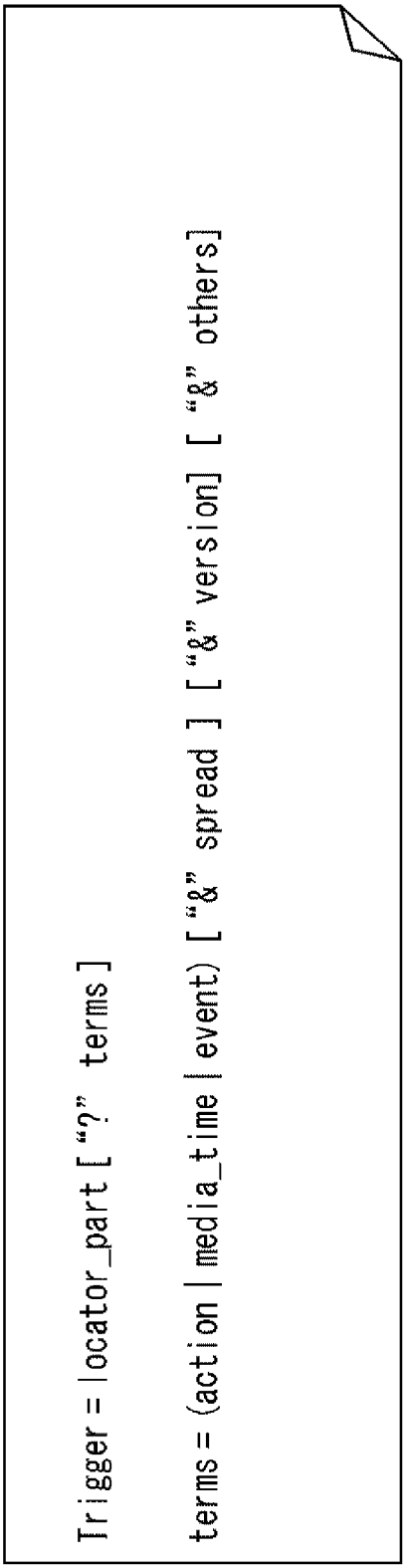
FIG. 1 is a diagram illustrating a configuration of trigger information.

FIG. 1 is a diagram illustrating a configuration of trigger information.

The trigger information has a structure in which a command ID (cmdID) indicating the type of the trigger information and a uniform resource identifier (URI) as location information which is a main body of the trigger information are described. When the trigger information is applied to the application control according to the present technique, for example, "0" is designated in the command ID. In FIG. 1, locator part corresponds to the URI, and terms can be designated as an option. In FIG. 1, the command ID is not illustrated.

In the terms, action information (action), media time information (media_time), or event information (event) is specified. In the action information, various actions for the application are specified. In the media time information, information (time information) indicating a reference time (for example, current time) for controlling the operation of the application is specified. In the event information, information (editing information) for editing details prescribed in the EMT is specified.

In terms, spread information (spread), version information (version), or other parameters (others) can be specified as an option. In the spread information, information for stochastically distributing the operation of the application is specified. As the version information, version information of the AIT, the EMT, or the CCT is specified. The parameters are connected by "&".

As illustrated in FIG. 2, in the action information specified in the terms in FIG. 1, an application ID (appID) and an action code (action_code) are connected by a period. In the application ID, identification information of a target application is specified.

In the action code, an action which is performed by the application identified by the application ID is specified. For example, codes such as "a1" to "a4" or "e1" to "eN" (where N is an integer equal to or greater than 1) are specified in the action code.

Prefetch (Prefetch) is an action for instructing acquisition of an application. The action code of the prefetch is "a1". The pre fetch may be referred to as prepare (Prepare), but the prefetch is generically used herein.

Executing (Execute (Exec)) is an action for instructing acquisition or start of an application. When a target application is deactivated, the executing action restarts execution of the application. The action code of the executing is "a2".

Kill (Kill) is an action for terminating an application in execution. The action code of the kill is "a3".

Suspending (Suspend) is an action for interrupting and deactivating an application in execution. The action code of the suspending is "a4".

In the action code, "e1" to "eN" (where N is an integer equal to or greater than 1) is specified as an event ID (stream event ID). When the stream event ID is specified as the action code, data accompanied with the stream event is specified as event data (event_data). That is, the event data is an optional value in the stream event. By assigning the stream event ID, an event can be ignited (a predetermined script can be executed) for an application in execution.

When plural pieces of action information are simultaneously described, the application ID (appID), the action code (action_code), and the optional event data (event_data) are repeatedly described. In event time (event_time), the time at which an action for an application is executed is specified. When the action is executed immediately after the trigger information is acquired, it is not necessary to assign the event time.

Figure 3:
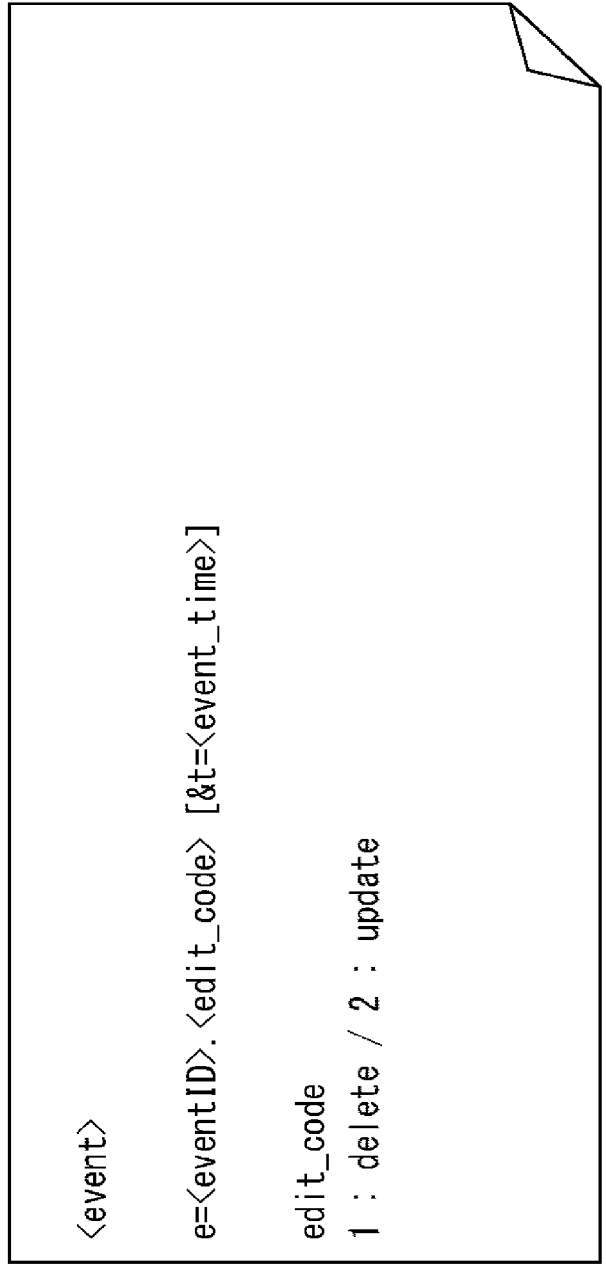
FIG. 3 is a diagram illustrating a method of describing event information.

As illustrated in FIG. 3, in the event information specified in the terms in FIG. 1, an event ID (eventID) and an editing code (edit_code) are connected by a period. In the event ID, identification information of a target event among events prescribed in a time series in the EMT is specified.

In the editing code, information (editing information) for editing the event identified by the event ID is specified. As the editing information, delete (delete) or update (update) is specified. In the case of update, information indicating the time after the update is specified in the event time (event_time). The editing code of the delete is "1" and the editing code of the update is "2".

(Description Example of Trigger Information)

FIG. 4 is a diagram illustrating a description example of trigger information.

In FIG. 4, "xbc.tv/e12" in the first row represents trigger information when the term is not specified. When metadata (AIT, EMT, and CCT) is distributed in communication, a file of the metadata is acquired by accessing a server on the Internet based on the uniform resource locator (URL) in which "http://" is added to the head of the trigger information. When the metadata (AIT, EMT, and CCT) is distributed in broadcast, the file of the metadata is acquired by accessing a service channel signaling (SCS) stream which is transmitted in a file delivery over unidirectional transport (FLUTE) session based on the URL acquired from the trigger information.

"xbc.tv/e12?m=5a33" in the second row represents trigger information when the media time information (m: media time) is specified as the terms. The time at which the trigger information is received is specified by "m=5a33".

"xbc.tv/e12?a=42a8.a2" in the third row represents trigger information when the action information (a: action) is specified as the terms. An application ID of "42a8" and an action code of "a2" are specified by "a=42a8.a2". That is, the trigger information specifies an executing action for an application with an application ID of "42a8".

"xbx.tv/e12?a=42a8.a4&a=4314.a2" in the fourth row represents trigger information when plural actions are specified as the terms. That is, the trigger information specifies a suspending action for an application with an application ID "42a8" and an executing action for an application with an application ID of "4314".

"xbc.tv/e12?a=42a8.e1.1762&t=77ee" in the fifth row represents trigger information when an event igniting action is specified as the terms. That is, the trigger information specifies an event (stream event) of "e1" for an application with an application ID of "42 a8". Here, the event is executed at a time of "77ee" and data of "1762" is used to ignite the event.

"xbc.tv/e12?e=12.1" in the sixth row represents trigger information when an event is specified as the terms. That is, the trigger information specifies deleting of an even with an event ID of "12" among the events prescribed in a time series in the EMT.

"xbc.tv/e12?e=12.2&t=77ee" in the seventh row represents trigger information when an event is specified as the terms. That is, the trigger information specifies updating of the time of an event with an event ID of "12" among the events prescribed in a time series in the EMT to the time of "77ee".

(Detailed Configuration of Metadata)
(Detailed Configuration of AIT)

FIG. 5 is a diagram illustrating an example of syntax of an AIT.

The AIT is described in a markup language such as an extensible markup language (XML). In FIG. 5, "@" is added to an attribute among elements and attributes. An indented element and an indented attribute are specified for a parent element thereof. This relationship is the same as in other syntax to be described later.

In FIG. 5, an ApplicationDiscovery element in a ServiceDiscovery element is a parent element of a DomainName attribute and an ApplicationList element. In the DomainName attribute, a name of a domain is specified. In the ApplicationList element, one or more Application elements are described as a parent element of the Application element in a list.

In the Application element, information on an application is specified. The Application element is a parent element of an appName element, an applicationIdentifier element, an applicationDescriptor element, an applicationTransport element, an applicationLocation element, and an application Boundary element.

In the appName element, a name of an application is specified.

In the applicationIdentifier element, information on the identification information of the application is specified. The applicationIdentifier element is a parent element of an orgId element and an appId element. In the orgId element, an organization ID is specified. In the appId element, an application ID is specified. The application ID corresponds to the application ID of the trigger information illustrated in FIG. 2.

The applicationDescriptor element is a parent element of a type element, a controlCode element, a serviceBound element, a priority element, and an icon element. In the type element, type information of the application is specified.

In the controlCode element, an action which is executed by the application is specified. As the action information, for example, auto start, present, kill, or prefetch is specified.

The auto start (AUTO START) is an action for instructing automatic execution of an application. On the other hand, the present (PRESENT) means that the application is not automatically executed. The kill (KILL) is an action for terminating an application in execution. The prefetch (PREFETCH) is an action for instructing acquisition of an application. The above-mentioned action information prescribed in the trigger information may be used as the action information.

In the serviceBound element, information indicating whether an application is dependent on a service is specified. In the priority element, information indicating priority when plural applications are present is specified. In the icon element, an acquisition source or a size of an icon used in the application is specified.

The applicationTransport element is a parent element of a type attribute, a URLBase element, and a URLExtension element. In the Type attribute, type information associated with transmission of an application is specified. The URL (application URL) of an acquisition source of the application is specified by the URLBase element, the URLExtension element, and the applicationLocation element. In the application Boundary element, a domain indicating a range in which the application operates is specified.

In FIG. 5, only one element or attribute is specified when "1" is specified as a cardinality (Cardinality), and whether an element or an attribute should be specified is arbitrary when "0 . . . 1" is specified. One or more elements or attributes are specified when "1 . . . N" is specified, and whether one or more elements or attributes should be specified is arbitrary when "0 . . . N" is specified. The meaning of the cardinality is the same in other syntax to be described later.

(Detailed Configuration of EMT)

FIG. 6 is a diagram illustrating an example of syntax of an EMT. The EMT is described in a markup language such as an XML.

An EMT element is a parent element of a majorProtocolversion attribute, a minorProtocolVersion attribute, an id attribute, an EMTVersion attribute, a beginMT attribute, a LiveTrigger element, and an Event element.

In the majorProtocolversion attribute and the minorProtocolVersion attribute, version information of the syntax is specified. In the id attribute, identification information for identifying the EMT is specified. For example, in the id attribute, a character string in which domain name and program_id (segment_id) are connected by "/" is specified. In the EMTVersion attribute, version information of the EMT is specified. In the beginMT attribute, information indicating the time at which the media time corresponding to the EMT starts is specified.

In the LiveTrigger element, information on the trigger information (live trigger information) when the trigger information is transmitted from a server on the Internet is described. In the LiveTrigger element, an URL attribute and a pollPeriod attribute are specified. In the URL attribute, an URL for accessing a server providing the live trigger information is specified. In the pollPeriod attribute, a polling period when the live trigger information is acquired from the server is specified.

In an Event element, event information is prescribed in a time series. The Event element is a parent element of an id attribute, an appID attribute, an action attribute, a startTime attribute, an endTime attribute, and a Data element. In the id attribute, the event ID is specified. In the appID attribute, the application ID is specified.

In the action attribute, an action which is executed by the application is specified. As the action information, a prefetch action, an executing action, a suspending action, a kill action, or an inject event action is specified.

The prefetch action (Prefetch) is an action for instructing acquisition of an application. As described above, the prefetch action may be called prepare (Prepare).

The executing action (Execute) is an action for instructing acquisition or start of an application. When a target application is deactivated, the executing action restarts execution of the application.

The suspending action (Suspend) is an action for interrupting and deactivating an application in execution. The kill action (Kill) is an action for terminating the application in execution. The inject event action (Inject Event) is an action for igniting an event as a stream event.

In the startTime attribute, information indicating a start time of an activation period of an action for an application is specified. In the endTime attribute, information indicating an end time of an activation period of an action for an application is specified.

That is, the activation period of an action for an application is determined by the startTime attribute and the endTime attribute indicating two points in a progressing time axis of corresponding AV content. For example, when the progressing timing of the AV content counted by an internal timepiece (media time information) of a receiver passes through an activation start time indicated by the startTime attribute, an action corresponding to the activation start time is activated. In this case, the endTime attribute may not be specified but only the startTime attribute may be specified.

The action corresponding to the activation period may be activated when the progressing timing of the AV content counted by the internal timepiece of the receiver is within the activation period, and the action corresponding to the activation period may be deactivated when the progressing timing of the AV content does not reach the activation period or has passed the activation period. That is, in the receiver, the action corresponding to the activation period is activated when the time counted by the internal timepiece (media time information) satisfies a predetermined activation condition based on the activation period or the like.

In the Data element, data used for the event is specified when the inject event action is specified as the action information. A data ID for identifying the data is specified by a dataID attribute as a child element of the Data element.

(Detailed Configuration of CCT)

FIG. 7 is a diagram illustrating a summary of a CCT.

FIG. 7 illustrates a structure of an application with an application ID of "a1". The application is constituted by plural files such as a hypertext markup language (HTML) file or a joint photographic experts group (JPEG) file. In FIG. 7, an HTML file is denoted by "An" and a resource file such as a JPEG file which is referred to by the HTML file is denoted by "Bn". In "An" and "Bn", a numeral for identifying each file is specified in "n".

An HTML file A11 in a top page is linked to an HTML file A01 and an HTML file A12. The HTML file A01 is linked to an HTML file A02, and the HTML file A02 is linked to an HTML file A03.

Here, when the plural files constituting the application are classified into groups in terms of presented units (that is, in terms of page units, which are hereinafter referred to as "presentation unit (PU)"), the HTML file A11 as the top page refers to resource files B02, B11, and B14 and thus PU_ID=1 is assigned to a set including these four files.

Similarly, since the HTML file Alt refers to resource files B07, B09, B12, and B13, these five files can be set as a set of PU_ID=2. Since the HTML file A01 refers to resource files B01, B03, and B04, these four files can be set as a set of PU_ID=3. Since the HTML file A02 refers to resource files B05 and B06, these three files can be set as a set of PU_ID=4. Since the HTML file A03 refers to resource files B05 and B08, these three files can be set as a set of PU_ID=S.

As described above, the file group constituting the application with an application ID of "a1" can be divided into plural groups as the sets identified by PU_ID=1 to 5 in terms of PUs.

In the receiver, a process speed of the application can be increased by storing the file groups constituting the application in a cache memory, but the files which can be stored in the cache memory are limited depending on capacity of the cache memory. Therefore, by providing cache control information for controlling the cache of the file groups constituting the application as a CCT, the receiver can store the files in the cache memory depending on the capacity of the cache memory.

Figure 8:
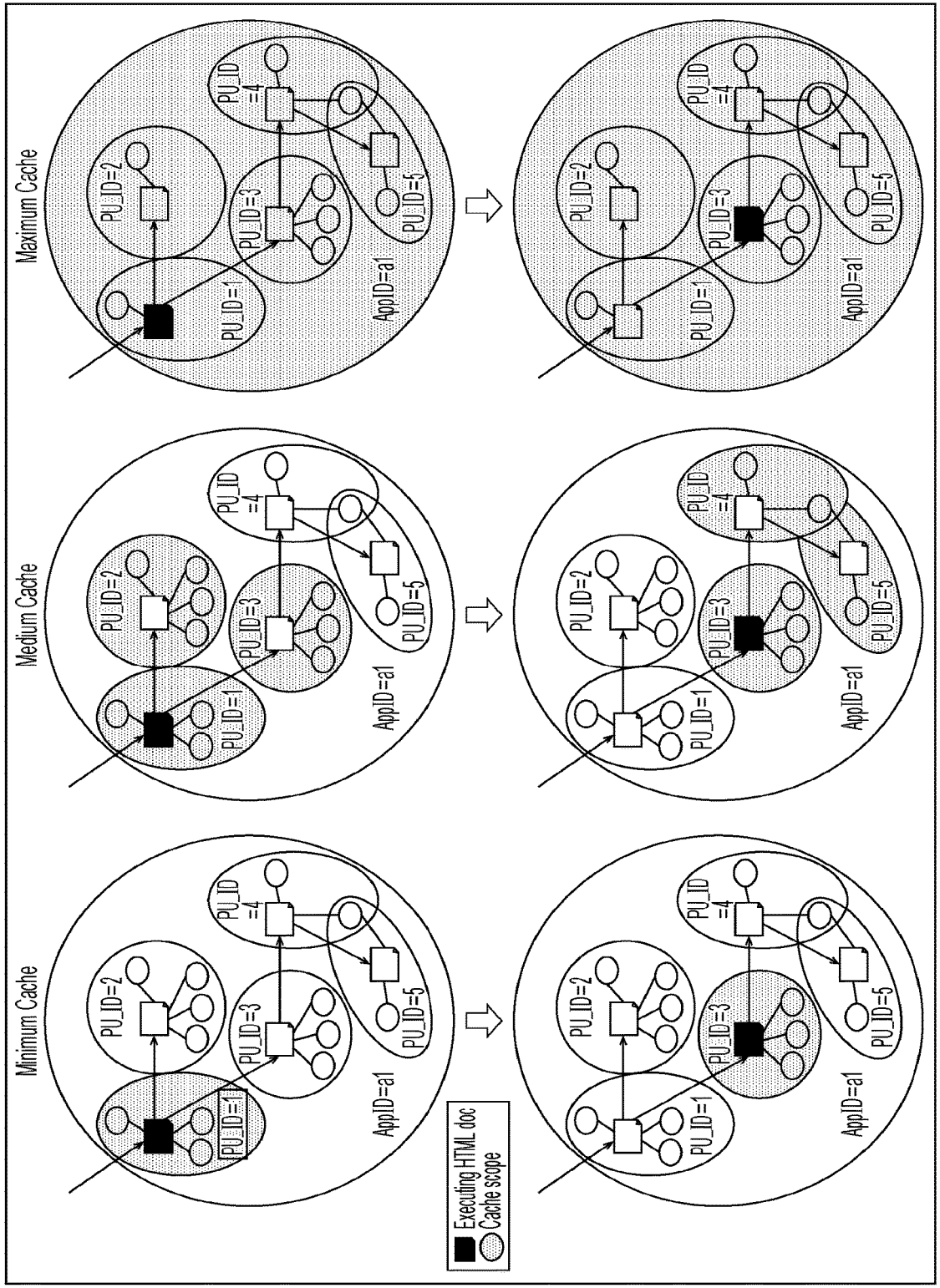
FIG. 8 is a diagram illustrating a summary of a CCT.

For example, as illustrated in FIG. 8, when the receiver cannot store only the minimum file groups in the cache memory ("Minimum Cache" in the left part of the drawing), only the presented HTML file and resource files thereof are stored in the cache memory. Specifically, when the HTML file A11 in the top page is presented, only the file group belonging to PU_ID=1 is stored in the cache memory. When the HTML file A11 transitions to the HTML file A01, only the file group belonging to PU_ID=3 is stored in the cache memory.

For example, when the receiver can store the intermediate file groups more than the minimum file groups in the cache memory ("Medium Cache" in the middle part of the drawing), the file groups around the presented HTML file as well as the presented HTML file and resource files thereof are stored in the cache memory. Specifically, when the HTML file A11 in the top page is presented, the file groups belonging to PU_ID=2 and 3 as the link destinations thereof as well as the file group belonging to PU_ID=1 are stored in the cache memory. When the HTML file A11 transitions to the HTML file A01, the file groups belonging to PU_ID=4 and 5 as the link destinations thereof as well as the file group belonging to PU_ID=3 are stored in the cache memory.

For example, when the receiver can store the maximum file groups in the cache memory ("Maximum Cache" in the right part of the drawing), all the file groups constituting the application as well as the presented HTML file and resource files thereof are stored in the cache memory. Specifically, when the HTML file A11 in the top page is presented, the file groups belonging to PU_ID=2 to 5 as well as the file group belonging to PU_ID=1 are stored in the cache memory. When the HTML file A11 transitions to the HTML file A01, the file groups belonging to PU_ID=1, 2, 4, and 5 as well as the file group belonging to PU_ID=3 are stored in the cache memory.

In this way, by providing the CCT as the cache control information, the receiver can adaptively store the files in the cache memory depending on the capacity of the cache memory or the like. Particularly, files distributed in broadcast are periodically distributed. Accordingly, when a desired file is missed, the file may be acquired only after several seconds or several minutes and thus this situation can be avoided by enabling the receiver to appropriately store the files in the cache memory.

FIG. 9 is a diagram illustrating an example of syntax of a CCT. The CCT is described in a markup language such as an XML.

A CCT element is a parent element of a majorProtocolversion attribute, a minorProtocolVersion attribute, a CCTVersion attribute, a baseURI attribute, and an Application element.

In the majorProtocolversion attribute and the minorProtocolVersion attribute, version information of the syntax is specified. In the CCTVersion attribute, version information of the CCT is specified. In the baseURI attribute, a common URL serving as a base of URLs related to the CCT is specified.

In the Application element, cache control information for each application is specified. The Application element is a parent element of an appID attribute, a size attribute, and a PU element. In the appID attribute, an application ID is specified. The application ID corresponds to the application ID of the AIT illustrated in FIG. 5 or the like. In the size attribute, information indicating the total size of the application is specified.

In the PU element, cache control information for each presentation unit is specified. The PU element is a parent element of an id attribute, a size attribute, an Item element, and a LinkedPU element. In the id attribute, identification information of a PU (PU_ID in FIG. 7 or the like) is specified. In the size attribute, information indicating a size for each PU is specified. The receiver can determine files to be stored in the cache memory by checking the size information for each PU.

In the Item element, information on each file constituting the PU is specified. The Item element is a parent element of a primary attribute, a uri attribute, and a type attribute. In the primary attribute, information on primary files in the PU is specified. For example, the primary files in an application are HTML files and the receiver can recognize that a specific PU is introduced on the basis of the information.

In the uri attribute, an URL of each file is specified. As the URL, a relative URL to the URL specified in the baseURI attribute is specified. In the type attribute, "m" or "p" is specified as the type information. When "m" is specified as the type information, it means a file constituting the PU. On the other hand, when "p" is specified as the type information, it means a specific file other than a file constituting the PU. For example, the type information of "p" is specified for a specific file which a broadcaster wants the receiver to forcibly acquire.

In the LinkedPU element, information on the PU linked to a target PU is specified. In the id attribute which is a child element of the LinkedPU element, identification information of the linked PU (PU_ID in FIG. 7 or the like) is specified. By referring to the identification information of the linked PU, the receiver can store, for example, the intermediate file groups more than the minimum file groups in the cache memory ("Medium Cache" at the center of FIG. 8).

<2. Summary of Digital Broadcast using IP Transmission Method>

AV content such as programs can be transmitted by digital broadcast employing an Internet protocol (IP) transmission method.

(System Pipe Model)

FIG. 10 is a diagram illustrating a system pipe model of digital broadcast using an IP transmission method.

In FIG. 10, plural baseband packet (BBP) streams are transmitted through a broadcast channel (RF Channel) having a predetermined frequency band. Each BBP stream includes a network time protocol (NTP), plural service channels (Service Channel), an electronic service guide (ESG) service, and a low layer signaling (LLS). The NTP, the service channels, and the ESG service are transmitted in accordance with a user datagram protocol/Internet protocol (UDP/IP), but the LLS is transmitted over the BBP streams.

The NTP is time information. The ESG service is an electronic service guide. As the LLS, low-layer signaling information is transmitted. For example, LLS signaling information such as service configuration description (SCD), emergency alerting description (EAD), and region rating description (RRD) is transmitted as the LLS.

The SCD indicates a BBP stream configuration and a service configuration in a broadcast network using an ID system based on an MPEG2-TS (Moving Picture Experts Group phase 2-Transport Stream) system. The SCD includes attribute setting information in the units of services, bootstrap information for accessing the ESG service or the SCS, or the like.

The EAD includes information on emergency alerting. The RRD includes rating information. The LLS signaling information such as the SCD, the EAD, and the RRD is described in a markup language such as an XML.

A service channel (hereinafter, referred to as a "service") is constituted by service channel signaling (SCS) and components such as video, an audio, and a caption constituting a program. A common IP address is assigned to the elements constituting each service, and the components or the SCS can be packaged for each service using the IP address.

As the SCS, signaling information in the units of services is transmitted. For example, SCS signaling information such as user service description (USD), media presentation description (MPD), session description protocol (SDP), file delivery description (FDD), service parameter description (SPD), and initialization segment (IS) is transmitted as the SCS.

The USD includes reference information for referring to the SCS signaling information such as the MPD, the FDD, and the SDP. The USD may be referred to as user service bundle description (USBD). The MPD includes information such as segment URL for each stream of the component transmitted in the units of services. The MPD is based on the MPEG-DASH (Moving Picture Expert Group-Dynamic Adaptive Streaming over HTTP) standard. The SDP includes service attributes in the units of services, configuration information or attributes of streams, filter information, and location information.

The FDD is index information for each transport session identifier (TSI) and includes information such as location information (for example, URL) or a transport object identifier (TOI). Here, in a file delivery over unidirectional transport (FLUTE) session, a file and the like to be transmitted is managed as one object using the TOI. A set of plural objects is managed as one session using the TSI.

That is, in the FLUTE session, a specific file can be specified by two pieces of identification information of a TSI and a TOI. The FDD may be included as an element in the USD. FLUTE+ (FLUTE plus) to which the FLUTE is extended may be used instead of the FLUTE.

The SPD includes various parameters which are prescribed at the level of service or component. The IS includes control information of segment data of a video or audio component transmitted in the FLUTE session.

That is, when a video or audio component is transmitted in the FLUTE session, a file of the component is divided into segments and each segment includes an initialization segment (IS) and a media segment (MS). The IS includes initialization information or control information such as a data compression method. Data of the video or audio component is stored in the MS. Each segment of the FLUTE session is based on the standard of ISO Base Media File Format.

The SCS signaling information such as the USD, the MPD, the SDP, the FDD, the SPD, and the IS is described in a markup language such as an XML. The IS may not be transmitted using an SCS stream, but may be transmitted using a video or audio stream. Hereinafter, when the LLS signaling information and the SCS signaling information do not need to be particularly distinguished from each other, both pieces of information is simply referred to as "signaling information".

Here, an RF channel ID (RF Channel ID) is assigned to a broadcast channel (RF Channel) having a predetermined frequency band, for example, for each broadcaster. A BBP stream ID (BBP Stream ID) is assigned to one or more BBP streams which are transmitted over each broadcast channel. A service ID (Service ID) is assigned to one or more services which are transmitted using each BBP stream.

In this way, a configuration corresponding to a combination (Triplet) of a network ID (Network ID), a transport steam ID (Transport Stream ID), and a service ID (Service ID) which are used in the MPEG2-TS system is employed as an ID system using an IP transmission method, and the BBP stream configuration and the service configuration in a broadcast network are expressed by the triplet.

It is possible to match the MPEG2-TS system which has been widely spread using the ID system. In the ID system using IP transmission method, the RF channel ID and the BBP stream ID correspond to the network ID and the transport stream ID in the MPEG2-TS system.

<3. Specific Use Case>

(1) Use Case 1: Application Control in Conjunction with Recorded Program

Figure 11:
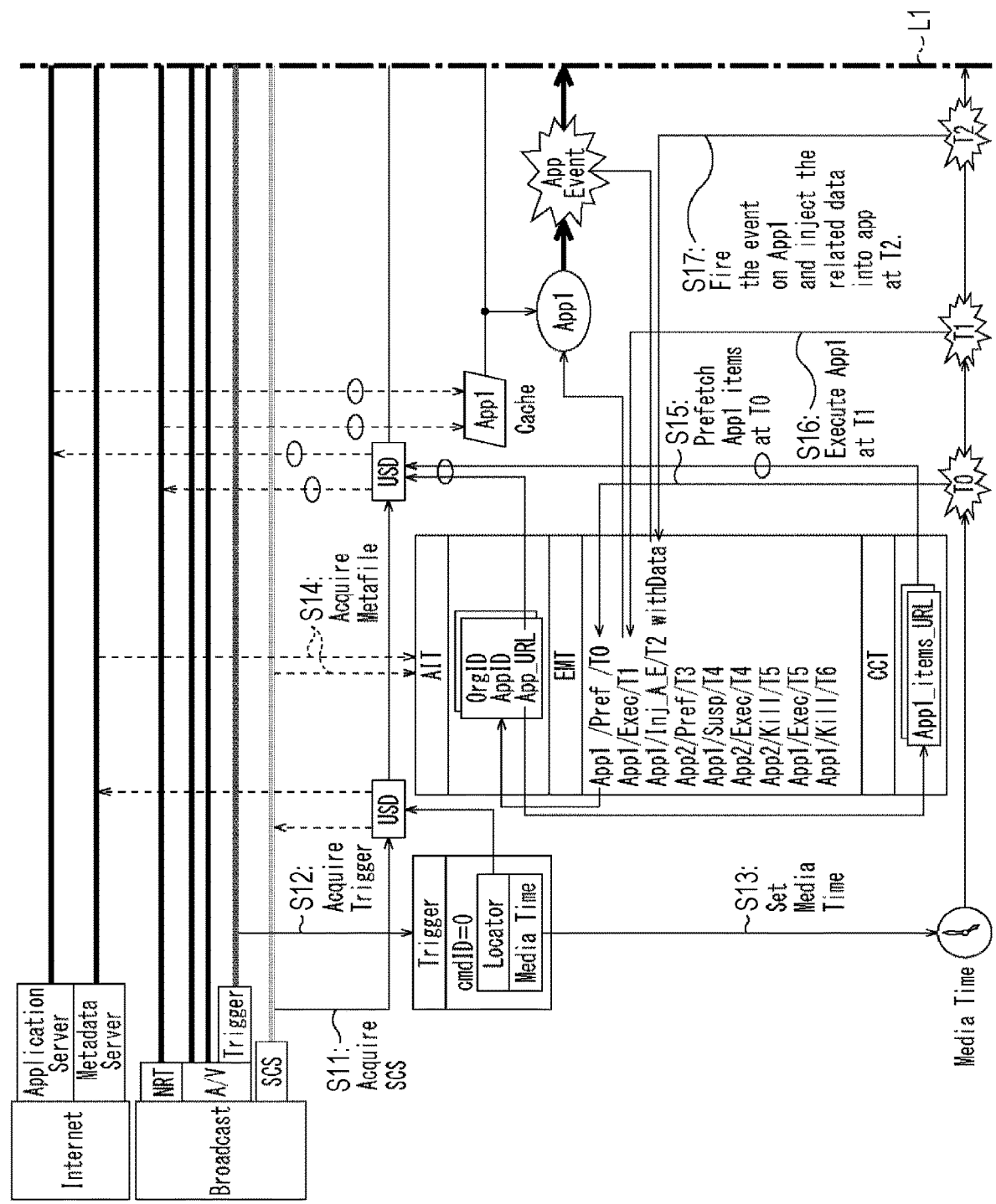
FIG. 11 is a diagram illustrating use case 1.
Figure 12:
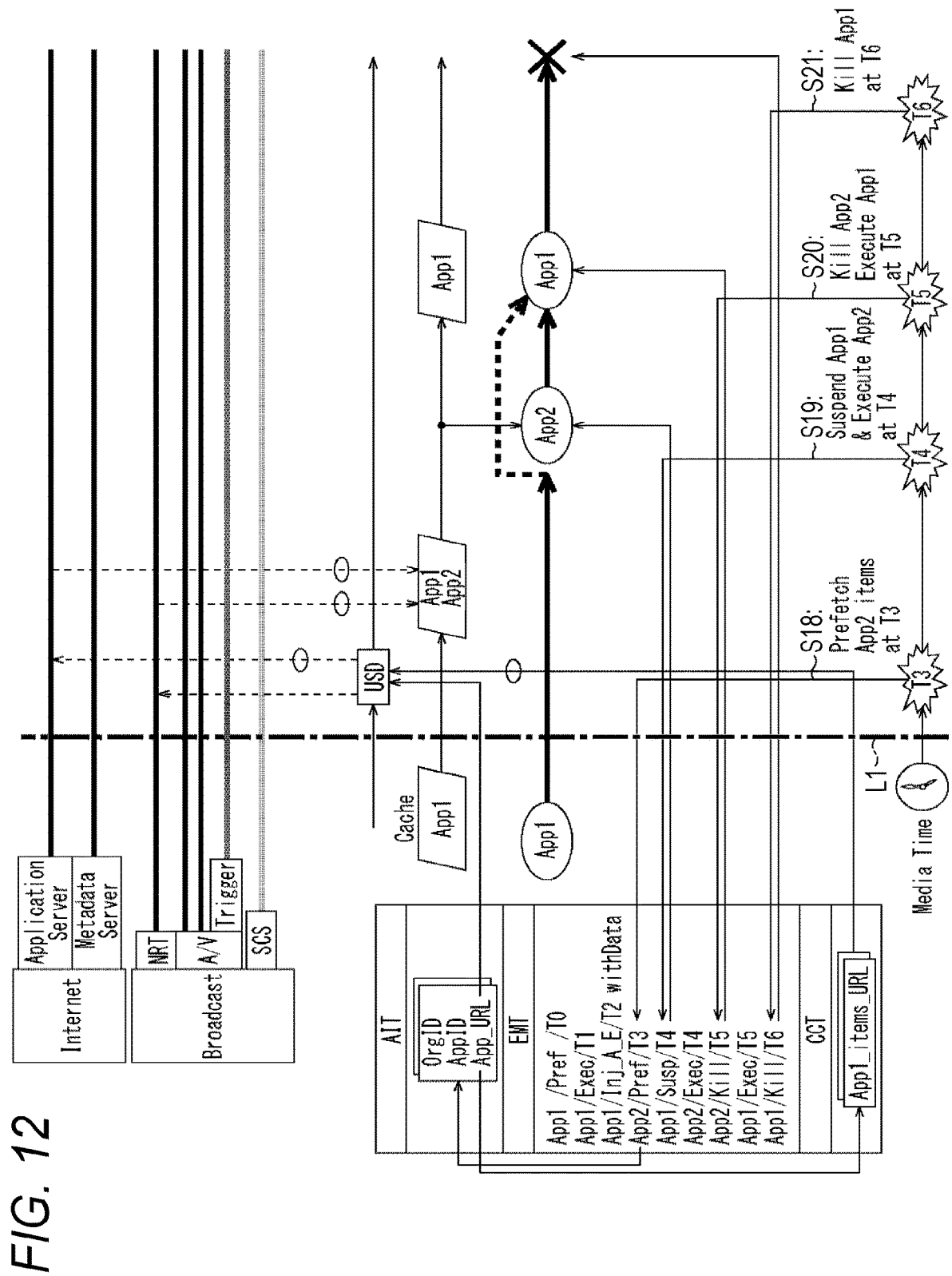
FIG. 12 is a diagram illustrating use case 1.

FIGS. 11 and 12 are diagrams illustrating use case 1. In FIGS. 11 and 12, the time progresses from the left side to the right side in the drawings, and it is assumed that both drawings are temporally connected to each other via vertical dotted line L1 in the drawings are illustrated in different drawings.

In FIGS. 11 and 12, a transmitter of a broadcast station (broadcaster) which is identified by an RF channel ID transmits a BBP stream which is identified by a BBP stream ID using a digital broadcast signal using the IP transmission method. In the BBP stream, streams of AV content ("A/V" in the drawings), SCS signaling information ("SCS" in the drawings), metadata ("SCS" in the drawings), and an application ("NRT" in the drawings) constituting a service which is identified by a service ID are transmitted.

Files transmitted using the streams are transmitted in the FLUTE session. Video data constituting the AV content includes trigger information (Trigger). In FIGS. 11 and 12, an application server (Application Server) disposed on the Internet (Internet) distributes applications, and a metadata server (Matadata Server) distributes metadata.

In use case 1, a recorded program such as a drama is transmitted as the AV content ("A/V" in the drawings) distributed from the transmitter. In FIG. 11, a receiver provided in each home accesses an A/V stream to reproduce the recorded program.

The receiver reads the SCD from a memory, accesses the SCS stream transmitted over a broadcast channel based on SCS bootstrap information, and acquires SCS signaling information (S11 in FIG. 11). The receiver acquires LLS signaling information transmitted using the LLS and stores the acquired information in the memory at the time of an initial scanning process or the like. When signaling information cannot be acquired in a redistribution environment, such information may not be acquired.

The receiver acquires trigger information transmitted using the video stream at the time at which the transmitter transmits the trigger information (S12 in FIG. 11). The trigger information includes location information (Locator) and media time information (Media Time). The receiver sets the media time information included in the trigger information and starts counting of time based on the media time information (S13 in FIG. 11).

The receiver determines which of broadcast and communication a distribution path of metadata is on the basis of the USD included in the SCS signaling information acquired in the process of step S11 and the location information included in the trigger information acquired in the process of step S12. When the signaling information cannot be acquired in the redistribution environment, the distribution path may be determined to be only communication.

When metadata is distributed in broadcast, the receiver accesses an SCS stream based on the SDP, the FDD, or the like included in the SCS signaling information and acquires metadata files transmitted in the FLUTE session (S14 in FIG. 11). On the other hand, when metadata is distributed in communication, the receiver accesses the metadata server via the Internet based on the location information included in the trigger information and acquires the metadata files (S14 in FIG. 11).

In this way, the receiver acquires the metadata which is transmitted in broadcast or communication. The metadata includes an AIT, an EMT, and a CCT. The AIT includes application control information such as an organization ID (OrgID), an application ID (AppID), and an application URL (App_URL).

In the EMT, action information for each application is prescribed in a time series. In the EMT illustrated in FIG. 11, a prefetch action (Pref) at time T0, an executing action (Exec) at time T1, an inject event action (Inj_A_E) at time T2, a suspending action (Susp) at time T4, an executing action (Exec) at time T5, and a kill action (Kill) at time T6 are prescribed as the action information of application 1 (App1). In the EMT illustrated in FIG. 11, a prefetch action (Pref) at time T3, an executing action (Exec) at time T4, and a kill action (Kill) at time T5 are prescribed as the action information of application 2 (App2).

The CCT includes cache control information such as URL of each file constituting a PU for each of application 1 and application 2.

In the receiver, counting of the time based on the media time information is started in the process of step S13, but it is normally monitored whether the counted time reaches a time (passes through a time) specified in the action information for each application in the EMT.

When the counted time reaches time T0, it is time to perform the prefetch action for application 1 (App1) prescribed in the EMT and thus the receiver acquires an application URL of application 1 with reference to the AIT based on the application ID (AppID) of application 1 (S15 in FIG. 11). The receiver determines files to be stored in the cache memory among file groups constituting application 1 with reference to the CCT. Here, the files to be stored in the cache memory are determined, for example, depending on the capacity of the cache memory of the receiver.

The receiver determines which of broadcast and communication a distribution path of (files of) application 1 is on the basis of the USD included in the SCS signaling information acquired in the process of step S11, an application URL, and an application item URL (a URL indicating an acquisition source of the files stored in the cache memory). When the signaling information cannot be acquired in the redistribution environment, the distribution path may be determined to be only communication.

When (the files of) application 1 is distributed in broadcast, the receiver accesses an NRT stream based on the SDP or the FDD included in the SCS signaling information and acquires the files of application 1 transmitted in the FLUTE session (S15 in FIG. 11). On the other hand, when (the files of) application 1 is distributed in communication, the receiver accesses the application server via the Internet based on the application URL or the like and acquires the files of application 1 (S15 in FIG. 11).

In this way, in the receiver, (the files of) application 1 which is transmitted in broadcast or communication is acquired and is stored in the cache memory (Cache). The files of application 1 stored in the cache memory is based on the capacity of the cache memory and the CCT as the cache control information.

Thereafter, when the counted time reaches time T1, it is time to perform the executing action for application 1 (App1) prescribed in the EMT, and thus the receiver reads and executes (the files of) application 1 stored in the cache memory (S16 in FIG. 11). Accordingly, in the receiver, application 1 is operated in conjunction with the recorded program.

Then, when the counted time reaches time T2, it is the timing at which the inject event action for application 1 (App1) prescribed in the EMT is executed and thus the receiver ignites an event for application 1 in execution (S17 in FIG. 11). Accordingly, in the receiver, for example, the display of application 1 which is executed in conjunction with the recorded program is switched.

Thereafter, when the counted time reaches time T3 in FIG. 12, it is time to perform the prefetch action for application 2 (App2) prescribed in the EMT and thus the receiver acquires an application URL of application 2 with reference to the AIT based on the application ID (AppID) of application 2 (S18 in FIG. 12). The receiver determines files to be stored in the cache memory among file groups constituting application 2 with reference to the CCT. Here, the files to be stored in the cache memory are determined, for example, depending on the capacity of the cache memory of the receiver.

The receiver determines which of broadcast and communication a distribution path of (files of) application 2 is on the basis of the USD included in the SCS signaling information acquired in the process of step S11, an application URL, and an application item URL (a URL indicating an acquisition source of the files stored in the cache memory). When the signaling information cannot be acquired in the redistribution environment, the distribution path may be determined to be only communication.

When (files of) application 2 is distributed in broadcast, the receiver accesses an NRT stream based on the SDP or the FDD included in the SCS signaling information and acquires the files of application 2 transmitted in the FLUTE session (S18 in FIG. 12). On the other hand, when application 2 is distributed in communication, the receiver accesses the application server via the Internet based on the application URL or the like and acquires the files of application 2 (S18 in FIG. 12).

In this way, in the receiver, application 2 which is transmitted in broadcast or communication is acquired and is stored in the cache memory (Cache). The files of application 2 stored in the cache memory is based on the capacity of the cache memory and the CCT as the cache control information.

Thereafter, when the counted time reaches time T4, it is time to perform the suspending action for application 1 (App1) and the executing action for application 2 (App2) prescribed in the EMT, and thus the receiver first unloads application 1 in execution to the cache memory (Cache) (S19 in FIG. 12). Subsequently, the receiver reads and executes (the files of) application 2 stored in the cache memory (S19 in FIG. 12). Accordingly, in the receiver, application 2 instead of application 1 is operated in conjunction with the recorded program.

When the counted time reaches time T5, it is time to perform the kill action for application 2 (App2) and the executing action for application 1 (App1) prescribed in the EMT, and thus the receiver first terminates application 2 in execution (S20 in FIG. 12). Subsequently, the receiver reads and executes application 1 unloaded to the cache memory in the process of step S19 (S20 in FIG. 12). Accordingly, in the receiver, application 2 which is executed in conjunction with the recorded program is terminated and application 1 is operated again in conjunction with the recorded program.

Then, when the counted time reaches time T6, it is time to perform the kill action for application 1 (App1) prescribed in the EMT and thus the receiver terminates application 1 in execution (S21 in FIG. 12). Accordingly, in the receiver, application 1 which is executed in conjunction with the recorded program is terminated and only the recorded program is displayed.

Figure 13:
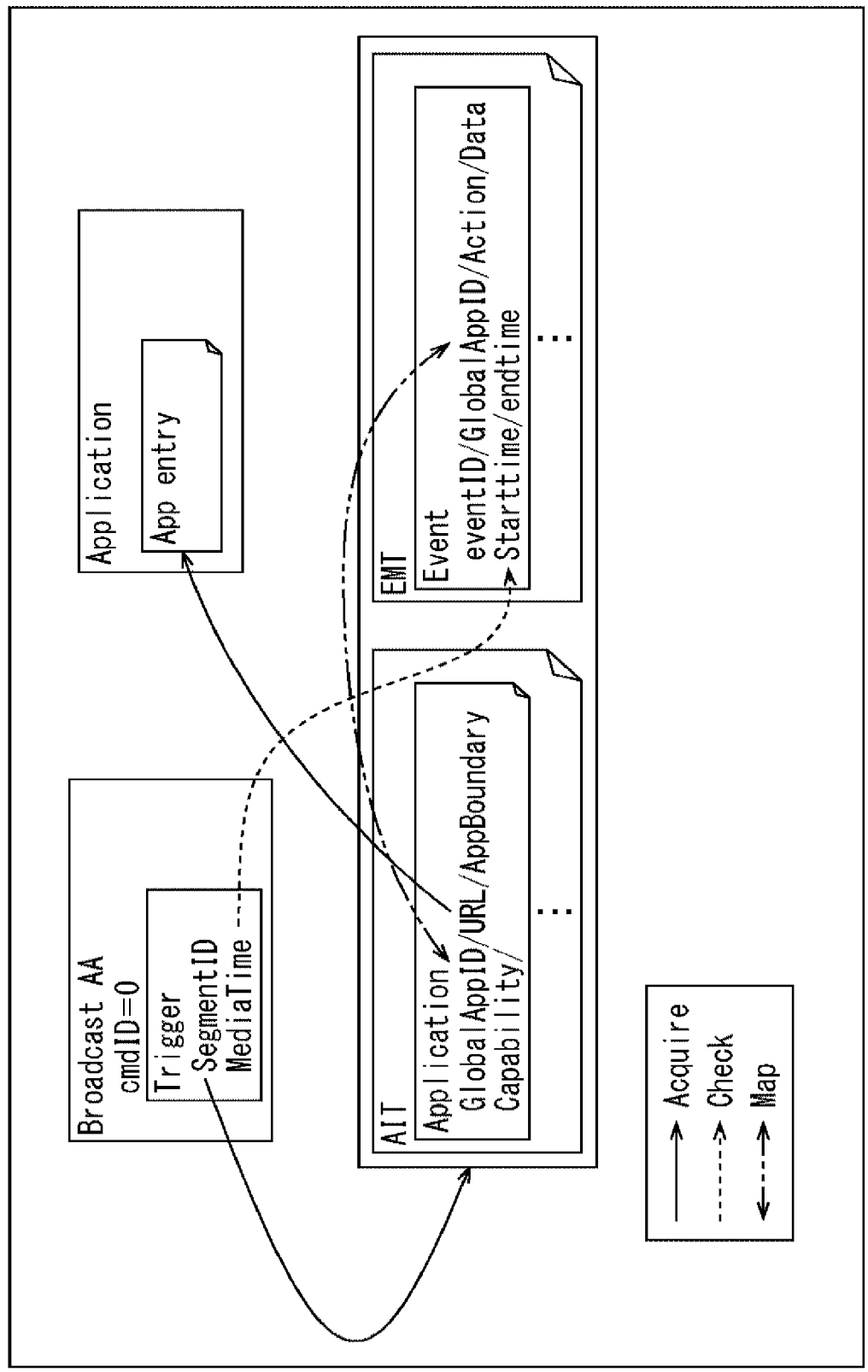
FIG. 13 is a diagram illustrating data correspondence in use case 1.

FIG. 13 illustrates data correspondence in use case 1. As illustrated in FIG. 13, the metadata such as the AIT or the EMT is acquired based on the location information included in the trigger information. In the AIT and the EMT, application IDs are correlated. The applications are acquired based on the application URL in the AIT.

Use case 1 has been described above.

(2) Use Case 2: Application Control in Conjunction with Live Program

Figure 14:
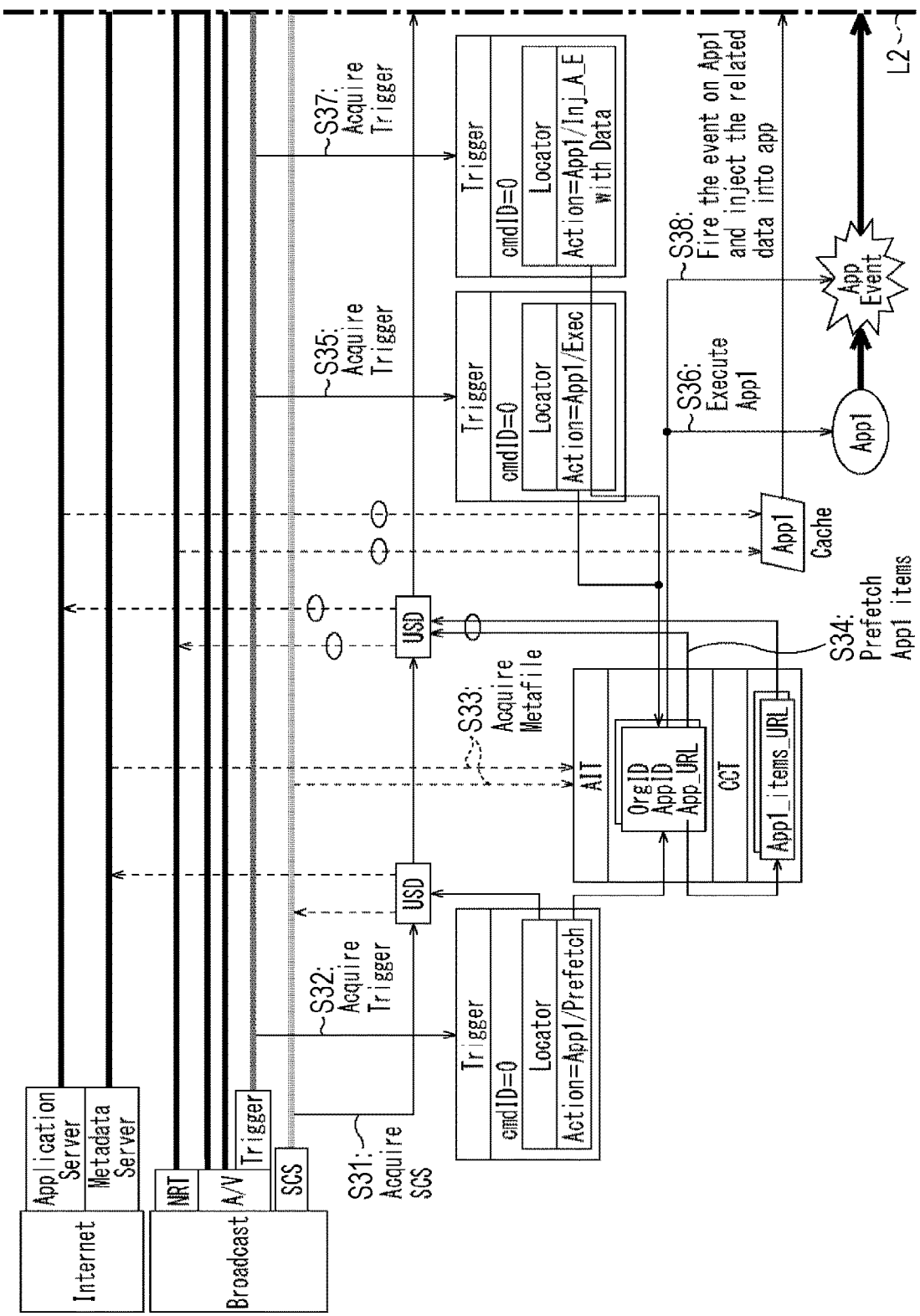
FIG. 14 is a diagram illustrating use case 2.
Figure 15:
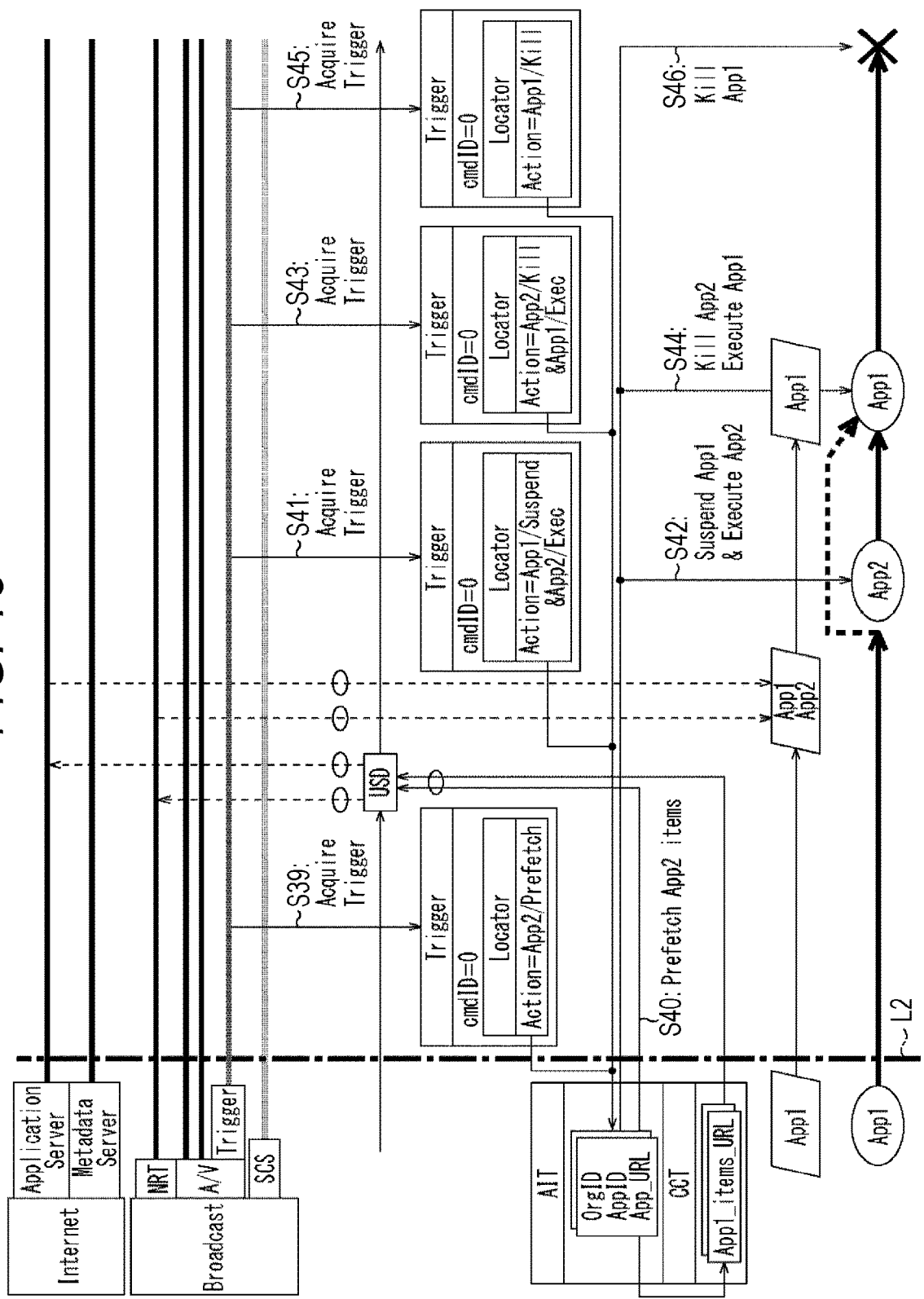
FIG. 15 is a diagram illustrating use case 2.

FIGS. 14 and 15 are diagrams illustrating use case 2. In FIGS. 14 and 15, the time progresses from the left side to the right side in the drawings, and it is assumed that both drawings are temporally connected to each other via vertical dotted line L2 in the drawings are illustrated in different drawings.

In FIGS. 14 and 15, similarly to FIG. 11 and the like, a transmitter of a broadcast station (broadcaster) transmits a BBP stream over a broadcast channel of digital broadcast using the IP transmission method. In the BBP stream, streams of AV content ("A/V" in the drawings), SCS signaling information ("SCS" in the drawings), metadata ("SCS" in the drawings), and an application ("NRT" in the drawings) constituting a service are transmitted.

Files transmitted using the streams are transmitted in the FLUTE session. Video data constituting the AV content includes trigger information (Trigger). In FIGS. 14 and 15, an application server (Application Server) disposed on the Internet (Internet) distributes applications, and a metadata server (Matadata Server) distributes metadata.

In use case 2, a live program such as sports rebroadcast is transmitted as the AV content ("A/V" in the drawings) distributed from the transmitter. In FIG. 14, a receiver provided in each home accesses an A/V stream to reproduce the live program.

The receiver reads the SCD from a memory, accesses the SCS stream transmitted over a broadcast channel based on SCS bootstrap information, and acquires SCS signaling information (S31 in FIG. 14). When signaling information cannot be acquired in a redistribution environment, such information may not be acquired.

The receiver acquires trigger information transmitted using the video stream at the time at which the transmitter transmits the trigger information (S32 in FIG. 14). The trigger information includes location information (Locator). A prefetch action as action information for application 1 (App1) is added to the location information.

The receiver determines which of broadcast and communication a distribution path of metadata is based on the USD included in the SCS signaling information acquired in the process of step S31 and the location information included in the trigger information acquired in the process of step S32. When the signaling information cannot be acquired in the redistribution environment, the distribution path may be determined to be only communication.

When metadata is distributed in broadcast, the receiver accesses an SCS stream based on the SDP, the FDD, or the like included in the SCS signaling information and acquires metadata files transmitted in the FLUTE session (S33 in FIG. 14). On the other hand, when metadata is distributed in communication, the receiver accesses the metadata server via the Internet based on the location information included in the trigger information and acquires the metadata files (S33 in FIG. 14).

In this way, the receiver acquires the metadata which is transmitted in broadcast or communication. The metadata includes an AIT and a CCT. The AIT includes application control information such as an organization ID (OrgID), an application ID (AppID), and an application URL (App_URL). The CCT includes cache control information such as URL of each file constituting a PU for each of application 1 and application 2.

The receiver acquires an application URL of application 1 with reference to the AIT based on the application ID (AppID) of application 1 (App1) as a target of the prefetch action added to the location information included in the trigger information (S34 in FIG. 14). The receiver determines files to be stored in the cache memory among file groups constituting application 1 with reference to the CCT.

The receiver determines which of broadcast and communication a distribution path of application 1 is on the basis of the USD included in the SCS signaling information acquired in the process of step S31, an application URL, and an application item URL (a URL indicating an acquisition source of the files stored in the cache memory). When the signaling information cannot be acquired in the redistribution environment, the distribution path may be determined to be only communication.

When (files of) application 1 is distributed in broadcast, the receiver accesses an NRT stream based on the SDP or the FDD included in the SCS signaling information and acquires the files of application 1 transmitted in the FLUTE session (S34 in FIG. 14). On the other hand, when (files of) application 1 is distributed in communication, the receiver accesses the application server via the Internet based on the application URL or the like and acquires the files of application 1 (S34 in FIG. 14).

In this way, in the receiver, (the files) of application 1 which is transmitted in broadcast or communication is acquired and is stored in the cache memory (Cache). The files of application 1 stored in the cache memory is based on the capacity of the cache memory and the CCT as the cache control information.

Thereafter, the receiver monitors whether the trigger information is transmitted using a video stream and acquires the trigger information at the time at which the transmitter transmits the trigger information (S35 in FIG. 14). In the trigger information, an executing action for application 1 (App1) is added to the location information. The receiver checks the AIT based on the trigger information and then reads and executes application 1 stored in the cache memory (S36 in FIG. 14). Accordingly, in the receiver, application 1 is operated in conjunction with the live program.

Thereafter, the receiver normally monitors whether the trigger information is transmitted using a video stream and acquires the trigger information at the time at which the transmitter transmits the trigger information (S37 in FIG. 14). In the trigger information, an inject event action for application 1 (App1) is added to the location information. The receiver checks the AIT based on the trigger information and then ignites an event for application 1 in execution (S38 in FIG. 14). Accordingly, in the receiver, for example, the display of application 1 which is executed in conjunction with the live program is switched.

Thereafter, in FIG. 15, the receiver acquires the trigger information at the time at which the transmitter transmits the trigger information (S39 in FIG. 15). In the trigger information, a prefetch action for application 2 (App2) is added to the location information. The receiver acquires an application URL of application 2 with reference to the AIT based on the application ID (AppID) of application 2 added to the location information (S40 in FIG. 15). The receiver determines files to be stored in the cache memory among the file groups constituting application 1 with reference to the CCT.

The receiver determines which of broadcast and communication a distribution path of application 2 is on the basis of the USD included in the SCS signaling information acquired in the process of step S31, an application URL, and an application item URL (a URL indicating an acquisition source of the files stored in the cache memory). When the signaling information cannot be acquired in the redistribution environment, the distribution path may be determined to be only communication.

When application 2 is distributed in broadcast, the receiver accesses an NRT stream based on the SDP or the FDD included in the SCS signaling information and acquires the files of application 2 transmitted in the FLUTE session (S40 in FIG. 15). On the other hand, when application 2 is distributed in communication, the receiver accesses the application server via the Internet based on the application URL or the like and acquires the files of application 2 (S40 in FIG. 15).

In this way, in the receiver, application 2 which is transmitted in broadcast or communication is acquired and is stored in the cache memory (Cache). The files of application 2 stored in the cache memory is based on the capacity of the cache memory and the CCT as the cache control information.

Thereafter, the receiver acquires the trigger information at the time at which the transmitter transmits the trigger information (S41 in FIG. 15). In the trigger information, a suspending action for application 1 (App1) and an executing action for application 2 (App2) are added to the location information.

The receiver first checks the AIT based on the suspending action for application 1 added to the location information and then unloads application 1 in execution to the cache memory (Cache) (S42 in FIG. 15). Subsequently, the receiver checks the AIT based on the executing action for application 2 added to the location information and then reads and executes application 2 stored in the cache memory (S42 in FIG. 15). Accordingly, in the receiver, application 2 instead of application 1 is operated in conjunction with the live program.

Thereafter, the receiver acquires the trigger information at the time at which the transmitter transmits the trigger information (S43 in FIG. 15). In the trigger information, a kill action for application 2 (App2) and an executing action for application 1 (App1) are added to the location information.

The receiver first checks the AIT based on the kill action for application 2 added to the location information and then terminates application 2 in execution (S44 in FIG. 15). The receiver checks the AIT based on the executing action for application 1 added to the location information, then reads application 1 unloaded to the cache memory in the process of step S42, and restarts the execution thereof (S44 in FIG. 15). Accordingly, in the receiver, application 2 which is executed in conjunction with the live program is terminated and application 1 is operated again in conjunction with the live program.

The receiver acquires the trigger information at the time at which the transmitter transmits the trigger information (S45 in FIG. 15). In the trigger information, a kill action for application 1 (App1) is added to the location information. The receiver first checks the AIT based on the kill action for application 1 added to the location information and then terminates application 1 in execution. Accordingly, in the receiver, application 1 which is executed in conjunction with the live program is terminated and only the live program is displayed.

Figure 16:
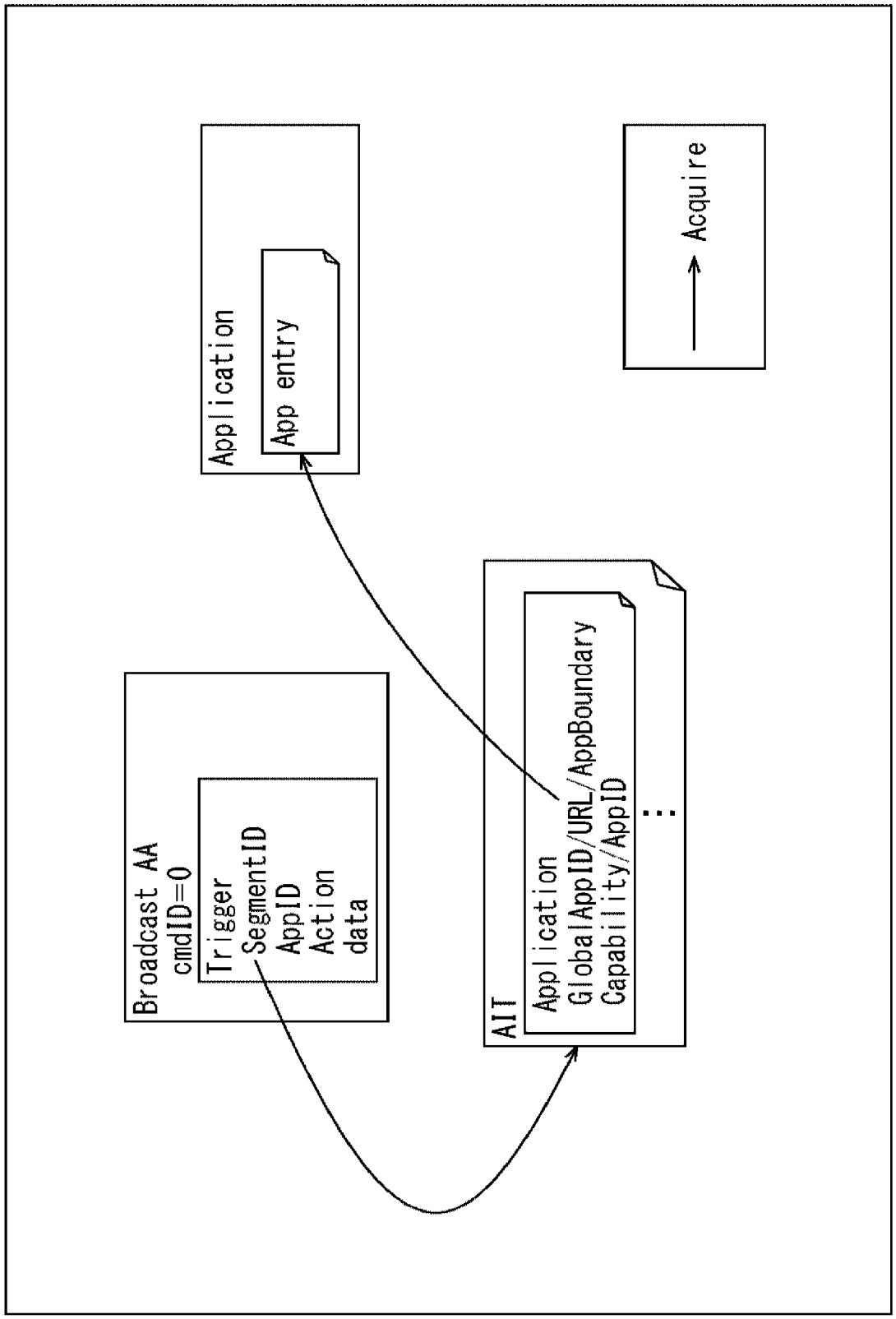
FIG. 16 is a diagram illustrating data correspondence in use case 2.

FIG. 16 illustrates data correspondence in use case 2. As illustrated in FIG. 16, the metadata such as the AIT is acquired based on the location information included in the trigger information. The applications are acquired based on the application URL in the AIT.

Use case 2 has been described above.

(3) Use Case 3: Hybrid Application Control

Figure 17:
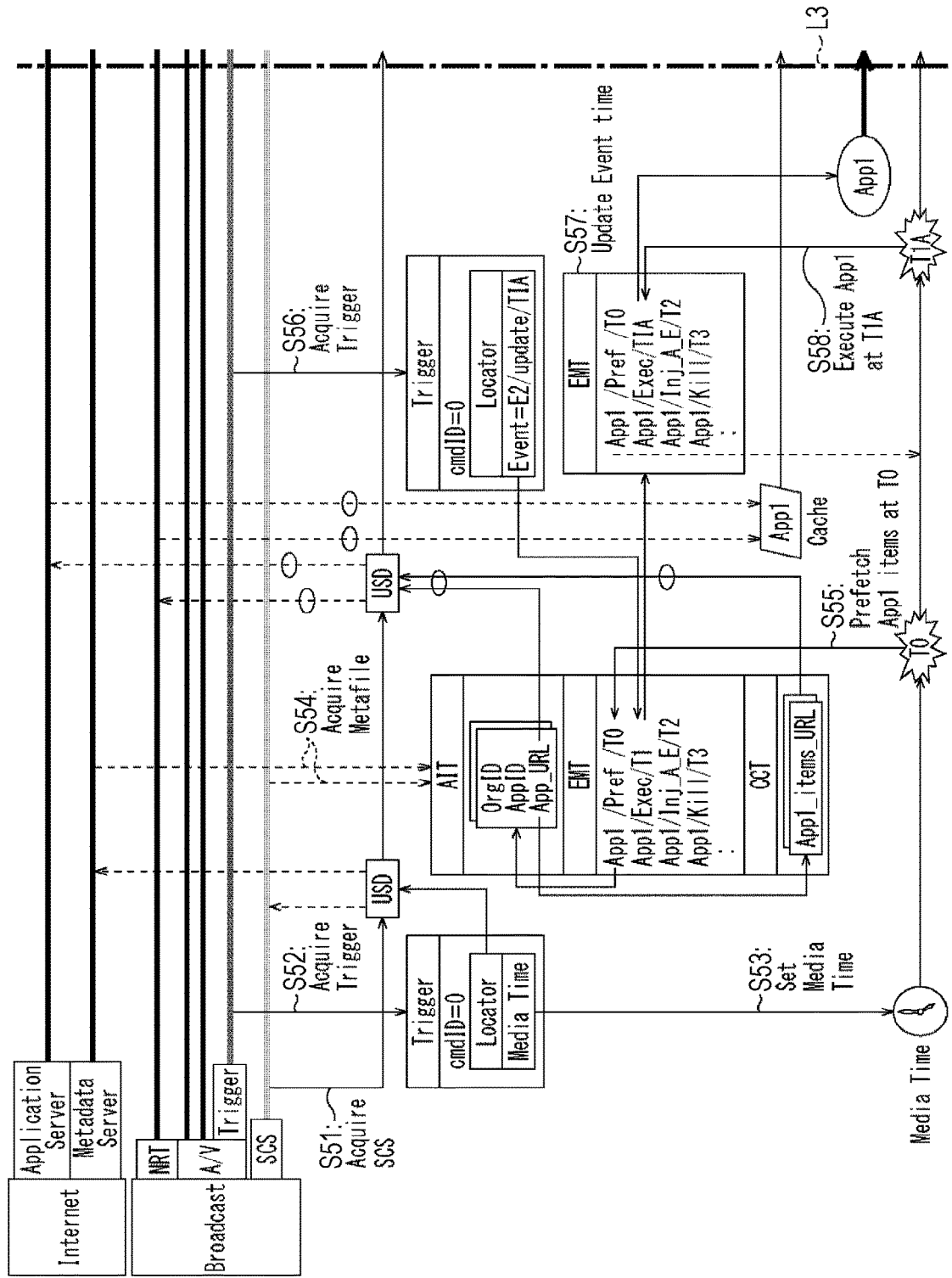
FIG. 17 is a diagram illustrating use case 3.
Figure 18:
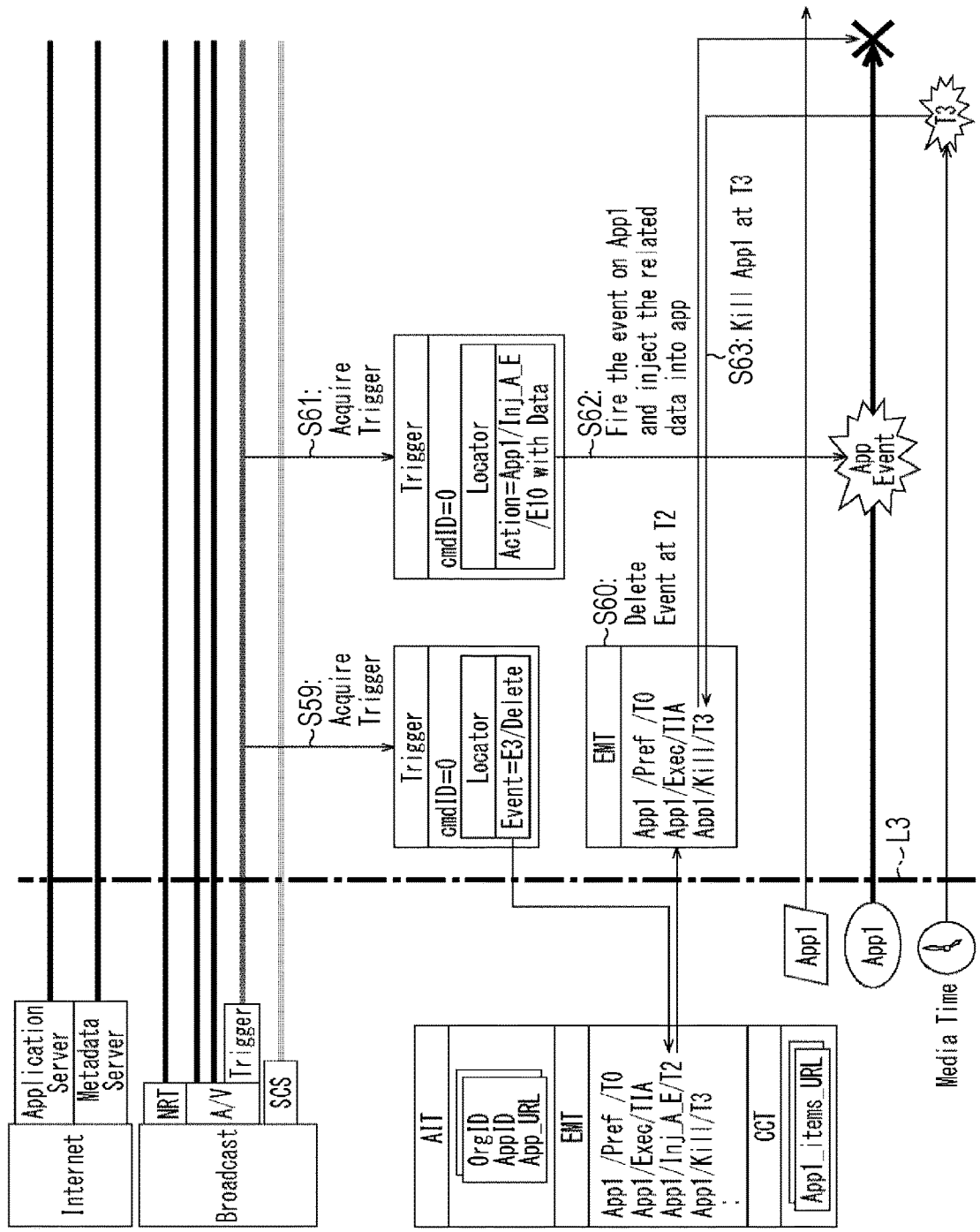
FIG. 18 is a diagram illustrating use case 3.

FIGS. 17 and 18 are diagrams illustrating use case 3. In FIGS. 17 and 18, the time progresses from the left side to the right side in the drawings, and it is assumed that both drawings are temporally connected to each other via vertical dotted line L3 in the drawings are illustrated in different drawings.

In FIGS. 17 and 18, similarly to FIG. 11 and the like, a transmitter of a broadcast station (broadcaster) transmits a BBP stream over a broadcast channel of digital broadcast using the IP transmission method. In the BBP stream, streams of AV content ("A/V" in the drawings), SCS signaling information ("SCS" in the drawings), metadata ("SCS" in the drawings), and an application ("NRT" in the drawings) constituting a service are transmitted.

Files transmitted using the streams are transmitted in the FLUTE session. Video data constituting the AV content includes trigger information (Trigger). In FIGS. 17 and 18, an application server (Application Server) disposed on the Internet (Internet) distributes applications, and a metadata server (Matadata Server) distributes metadata.

In FIG. 17, a receiver provided in each home accesses an A/V stream to reproduce the program. The receiver reads the SCD from a memory, accesses the SCS stream transmitted over a broadcast channel based on SCS bootstrap information, and acquires SCS signaling information (S51 in FIG. 17). When signaling information cannot be acquired in a redistribution environment, such information may not be acquired.

The receiver acquires trigger information transmitted using the video stream at the time at which the transmitter transmits the trigger information (S52 in FIG. 17). The trigger information includes location information (Locator) and media time information (Media_Time). The receiver sets the media time information included in the trigger information and starts counting of time based on the media time information (S53 in FIG. 17).

The receiver determines which of broadcast and communication a distribution path of metadata is based on the USD included in the SCS signaling information acquired in the process of step S51 and the location information included in the trigger information acquired in the process of step S52. When the signaling information cannot be acquired in the redistribution environment, the distribution path may be determined to be only communication.

When metadata is distributed in broadcast, the receiver accesses an SCS stream based on the SDP, the FDD, or the like included in the SCS signaling information and acquires metadata files transmitted in the FLUTE session (S54 in FIG. 17). On the other hand, when metadata is distributed in communication, the receiver accesses the metadata server via the Internet based on the location information included in the trigger information and acquires the metadata files (S54 in FIG. 17).

In this way, the receiver acquires the metadata which is transmitted in broadcast or communication. The metadata includes an AIT, an EMT, and a CCT. The AIT includes application control information such as an organization ID (OrgID), an application ID (AppID), and an application URL (App_URL).

In the EMT, action information for each application is prescribed in a time series. In the EMT illustrated in FIG. 17, a prefetch action (Pref) at time T0, an executing action (Exec) at time T1, an inject event action (Inj_A_E) at time T2, and a kill action (Kill) at time T3 are prescribed as the actions of application 1 (App1).

The CCT includes cache control information such as URL of each file constituting a PU for application 1.

In the receiver, counting of the time based on the media time information is started in the process of step S53, but it is normally monitored whether the counted time reaches a time (passes through a time) specified in the action information for each application in the EMT.

When the counted time reaches time T0, it is time to perform the prefetch action for application 1 (App1) prescribed in the EMT and thus the receiver acquires an application URL of application 1 with reference to the AIT based on the application ID (AppID) of application 1 (S55 in FIG. 17). The receiver determines files to be stored in the cache memory among file groups constituting application 1 with reference to the CCT.

The receiver determines which of broadcast and communication a distribution path of (files of) application 1 is on the basis of the USD included in the SCS signaling information acquired in the process of step S51, an application URL, and an application item URL (a URL indicating an acquisition source of the files stored in the cache memory). When the signaling information cannot be acquired in the redistribution environment, the distribution path may be determined to be only communication.

When (the files of) application 1 is distributed in broadcast, the receiver accesses an NRT stream based on the SDP or the FDD included in the SCS signaling information and acquires the files of application 1 transmitted in the FLUTE session (S55 in FIG. 17). On the other hand, when (the files of) application 1 is distributed in communication, the receiver accesses the application server via the Internet based on the application URL or the like and acquires the files of application 1 (S55 in FIG. 17).

In this way, in the receiver, (the files) of application 1 which is transmitted in broadcast or communication is acquired and is stored in the cache memory (Cache). The files of application 1 stored in the cache memory is based on the capacity of the cache memory and the CCT as the cache control information.

Thereafter, the receiver acquires the trigger information at the time at which the transmitter transmits the trigger information (S56 in FIG. 17). In the trigger information, event information for updating the time of executing an executing action for application 1 (App1) from time T1 to time T1A is added to the location information. The receiver updates the time of executing the executing action for application 1 prescribed in the EMT from time T1 to time T1A based on the event information included in the trigger information (S57 in FIG. 17).

Then, when the counted time reaches the updated time T1A, it is time to perform the executing action for application 1 prescribed in the EMT, and thus the receiver reads and executes application 1 stored in the cache memory (S58 in FIG. 17). Accordingly, in the receiver, application 1 is operated in conjunction with the recorded program.

Thereafter, in FIG. 18, the receiver acquires the trigger information at the time at which the transmitter transmits the trigger information (S59 in FIG. 18). In the trigger information, event information for deleting the inject event action at time T2 for application 1 (App1) is added to the location information. The receiver deletes the inject event action at time T2 for application 1 (App1) prescribed in the EMT based on the event information included in the trigger information (S60 in FIG. 18).

In the receiver, the trigger information is acquired at the time at which the transmitter transmits the trigger information (S61 in FIG. 18). In the trigger information, the inject event action for application 1 (App1) is added to the location information. The receiver checks the AIT based on the trigger information and then ignites an event for application 1 in execution (S62 in FIG. 18). Accordingly, in the receiver, for example, the display of application 1 which is executed in conjunction with the program is switched. That is, the event for application 1 is ignited at the changed time specified in the event information included in the trigger information, not at the time prescribed in the EMT.

Thereafter, when the counted time reaches time T3, it is time to perform the kill action for application 1 (App1) prescribed in the EMT and thus the receiver terminates application 1 in execution (S63 in FIG. 18). Accordingly, in the receiver, application. 1 which is executed in conjunction with the program is terminated and only the program is displayed.

Use case 3 has been described above.

(4) Use Case 4: Application Control in Conjunction with Recorded Program (Corresponding to ACR)

Figure 19:
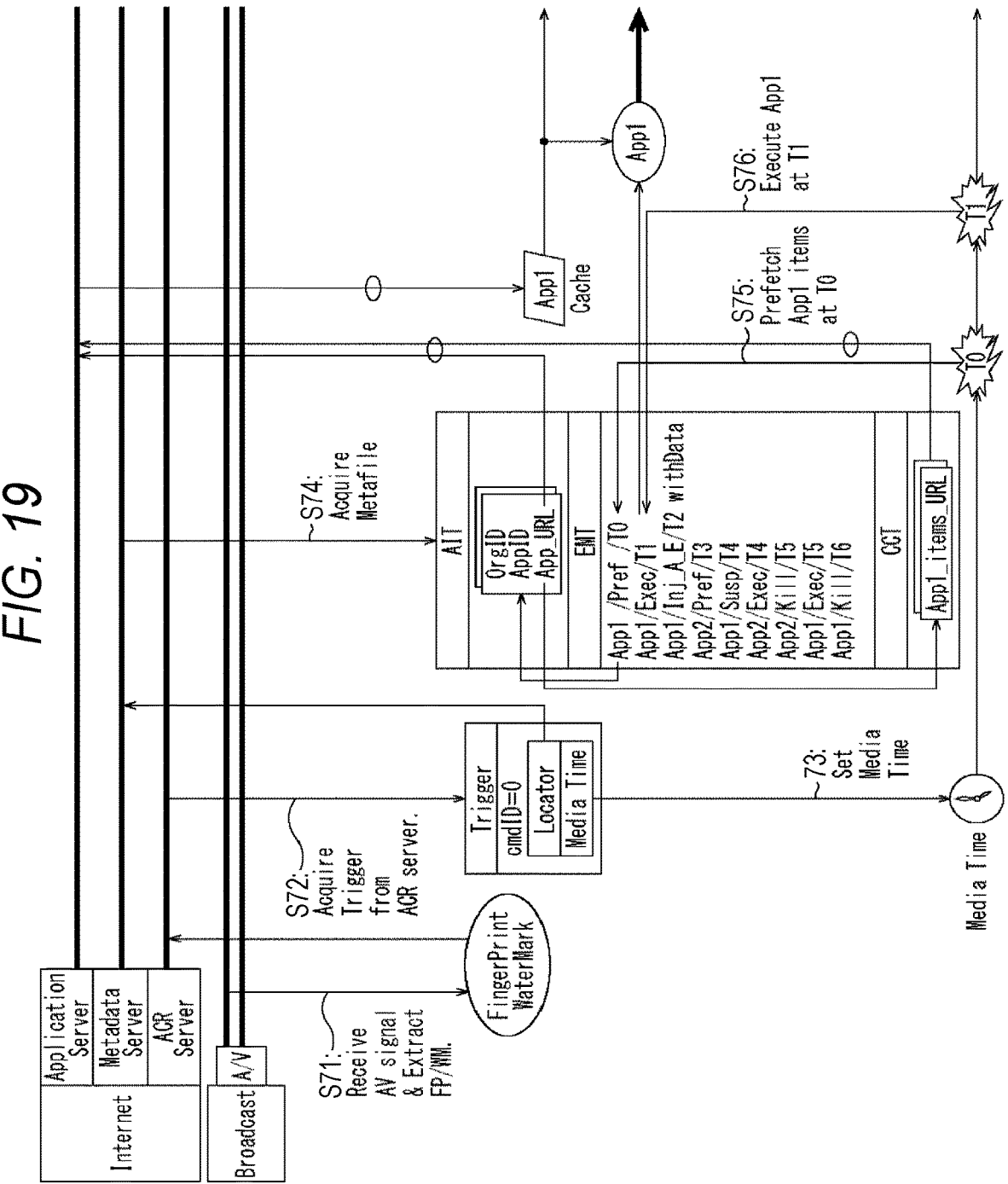
FIG. 19 is a diagram illustrating use case 4.

FIG. 19 is a diagram illustrating use case 4.

In FIG. 19, similarly to FIG. 11 and the like, a transmitter of a broadcast station (broadcaster) transmits a BBP stream over a broadcast channel of digital broadcast using the IP transmission method. In the BBP stream, a stream of AV content ("A/V" in the drawings) constituting a service are transmitted. Files transmitted using the stream are transmitted in the FLUTE session.

In FIG. 19, an application server (Application Server) disposed on the Internet (Internet) distributes applications, and a metadata server (Matadata Server) distributes metadata. An ACR server (ACR Server) is disposed on the Internet, identifies AV content using an automatic content recognition (ACR) technique and provides trigger information based on the identification result in response to an inquiry from a receiver.

In use case 4, a recorded program such as a drama is transmitted as the AV content ("A/V" in the drawings) distributed from the transmitter. In FIG. 19, a receiver provided in each home accesses an A/V stream to reproduce the recorded program.

The receiver transmits a feature (hereinafter, referred to as "fingerprint information (Finger Print)") extracted from at least one of video data and audio data of the recorded program in execution to the ACR server via the Internet (S71). The fingerprint information is transmitted from the receiver to the ACR server, for example, with a cycle of several seconds.

When the fingerprint information is received from the receiver, the ACR server identifies the recorded program which is executed in the receiver using the ACR technique by comparing the fingerprint information with a database, and generates trigger information based on the identification result. The ACR server transmits the trigger information based on the ACR identification result to the receiver via the Internet.

Here, watermark information (Water Mark) may be used instead of the fingerprint information. When the watermark information is used, the watermark information may include information for specifying scenes of the program. Accordingly, in this case, the ACR server does not need to specify the scenes of the program.

The receiver acquires the trigger information transmitted from the ACR server via the Internet (S72). The trigger information includes location information (Locator) and media time information (Media Time). The receiver sets the media time information included in the trigger information and starts counting of time based on the media time information (S73).

The receiver accesses the metadata server via the Internet based on the location information included in the trigger information acquired in the process of step S72 and acquires files of metadata (S74). The metadata includes an AIT, an EMT, and a CCT. The AIT includes application control information such as an organization ID (OrgID), an application ID (AppID), and an application URL (App_URL).

In the EMT, action information for each application is prescribed in a time series. In the EMT illustrated in FIG. 19, a prefetch action (Prep) at time T0, an executing action (Exec) at time T1, an inject event action (Inj_A_E) at time T2, a suspending action (Susp) at time T4, an executing action (Exec) at time T5, and a kill action (Kill) at time T6 are prescribed as the action information of application 1 (App1). In the EMT illustrated in FIG. 19, a prefetch action (Prep) at time T3, an executing action (Exec) at time T4, and a kill action (Kill) at time T5 are prescribed as the action information of application 2 (App2).

The CCT includes cache control information such as URL of each file constituting a PU for each of application 1 and application 2.

In the receiver, counting of the time based on the media time information is started in the process of step S73, but it is normally monitored whether the counted time reaches a time (passes through a time) specified in the action information for each application in the EMT.

When the counted time reaches time T0, it is time to perform the prefetch action for application 1 (App1) prescribed in the EMT and thus the receiver acquires an application URL of application 1 with reference to the AIT based on the application ID (AppID) of application 1 (S75). The receiver determines files to be stored in the cache memory among file groups constituting application 1 with reference to the CCT.

The receiver accesses the application server via the Internet based on the application URL or the like and acquires the files of application 1 (S75). In this way, in the receiver, application 1 which is transmitted in communication is acquired and is stored in the cache memory (Cache). The files of application 1 stored in the cache memory is based on the capacity of the cache memory and the CCT as the cache control information.

Thereafter, when the counted time reaches time T1, it is time to perform the executing action for application 1 (App1) prescribed in the EMT, and thus the receiver reads and executes application 1 stored in the cache memory (S76). Accordingly, in the receiver, application 1 is operated in conjunction with the recorded program.

Although the subsequent operation of application 1 is not illustrated in FIG. 19, when the counted time reaches time T2, it is time to perform the inject event action for application 1 (App1) prescribed in the EMT and thus the receiver ignites an event for application 1 in execution.

When the counted time reaches time T3, it is time to perform a prefetch action for application 2 (App2) prescribed in the EMT. Accordingly, the receiver accesses the application server via the Internet based on the application URL for acquiring application 2 and acquires files of application 2. Application 2 is stored in the cache memory (Cache).

Thereafter, when the counted time reaches time T4, it is time to perform the suspending action for application 1 (App1) and the executing action for application 2 (App2) prescribed in the EMT, and thus the receiver first unloads application 1 in execution to the cache memory (Cache). Subsequently, the receiver reads and executes application 2 stored in the cache memory.

When the counted time reaches time T5, it is time to perform the kill action for application 2 (App2) and the executing action for application 1 (App1) prescribed in the EMT, and thus the receiver first terminates application 2 in execution. Subsequently, the receiver reads and executes application 1 unloaded to the cache memory.

Then, when the counted time reaches time T6, it is time to perform the kill action for application 1 (App1) prescribed in the EMT and thus the receiver terminates application 1 in execution. Accordingly, in the receiver, application 1 which is executed in conjunction with the recorded program is terminated and only the recorded program is displayed.

Figure 20:
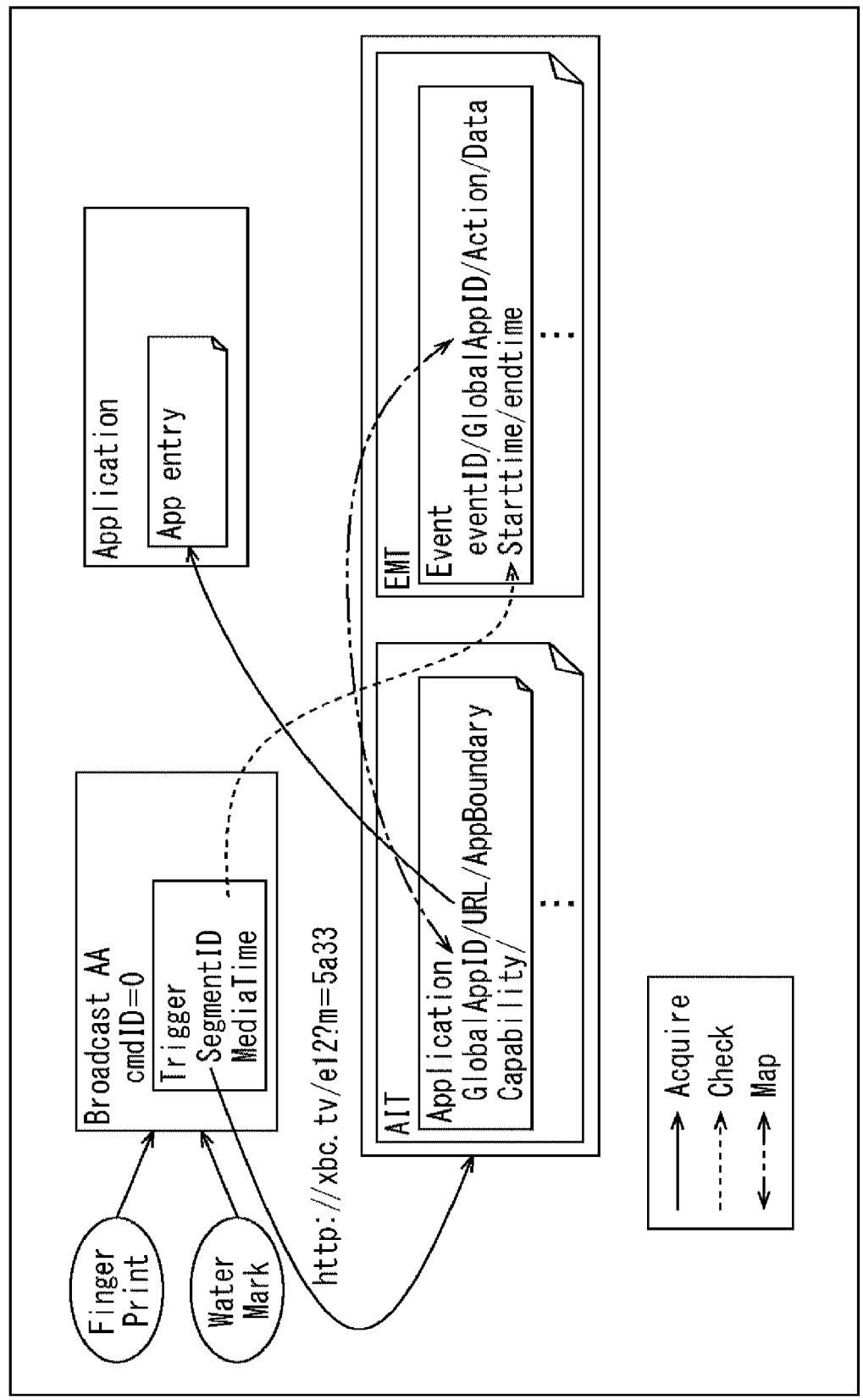
FIG. 20 is a diagram illustrating data correspondence in use case 4.

FIG. 20 illustrates data correspondence in use case 4. In FIG. 20, the trigger information is not transmitted using a video stream the like, but is acquired as an inquiry result by transmitting fingerprint information or watermark information to the ACR server.

As illustrated in FIG. 20, the metadata such as the AIT or the EMT is acquired based on the location information included in the trigger information. In the AIT and the EMT, application IDs are correlated. The applications are acquired based on the application URL in the AIT.

Use case 4 has been described above.

(5) Use Case 5: Application Control in Conjunction with Live Program (Corresponding to ACR)

Figure 21:
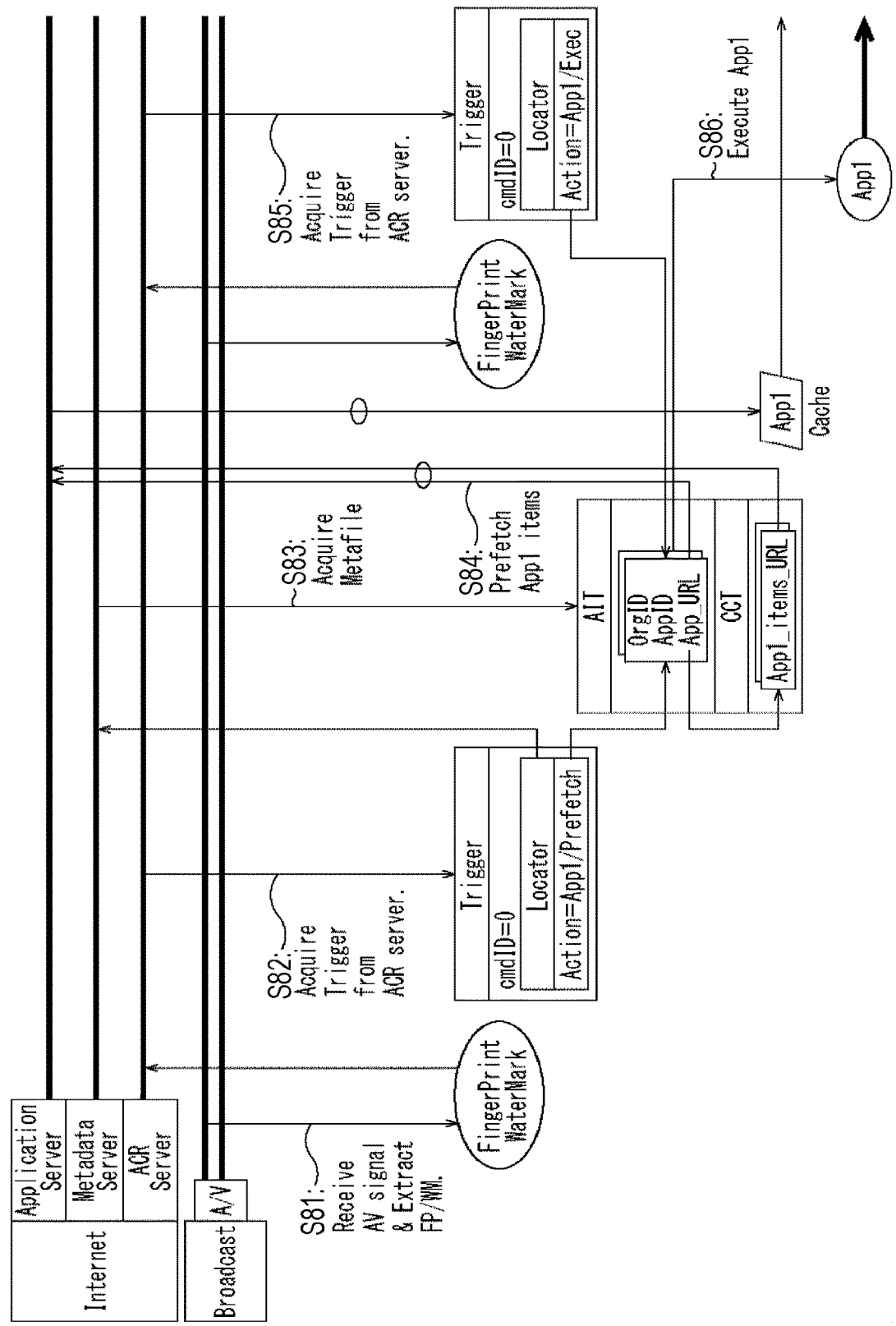
FIG. 21 is a diagram illustrating use case 5.

FIG. 21 is a diagram illustrating use case 5.

In FIG. 21, similarly to FIG. 11 and the like, a transmitter of a broadcast station (broadcaster) transmits a BBP stream over a broadcast channel of digital broadcast using the IP transmission method. In the BBP stream, streams of AV content ("A/V" in the drawings) constituting a service are transmitted in the FLUTE session.

In FIG. 21, an application server (Application Server) disposed on the Internet (Internet) distributes applications, and a metadata server (Matadata Server) distributes metadata. An ACR server (ACR Server) provides trigger information based on an identification result of AV content using the ACR technique.

In use case 5, a live program such as sports rebroadcast is transmitted as the AV content ("A/V" in the drawings) distributed from the transmitter. In FIG. 21, a receiver provided in each home accesses an A/V stream to reproduce the live program.

In FIG. 21, the receiver transmits fingerprint information extracted from at least one of video data and audio data of the live program in execution to the ACR server via the Internet (S81).

When the fingerprint information is received from the receiver, the ACR server identifies the live program which is executed in the receiver using the ACR technique by comparing the fingerprint information with a database, and generates trigger information based on the identification result. The ACR server transmits the trigger information to the receiver via the Internet. Watermark information (Water Mark) may be used instead of the fingerprint information.

Accordingly, the receiver receives and acquires the trigger information transmitted from the ACR server via the Internet (S82). The trigger information includes location information. A prefetch action as action information for application 1 (App1) is added to the location information. The receiver accesses the metadata server via the Internet based on the location information included in the trigger information acquired in the process of step S82 and acquires files of metadata (S83). The metadata includes an AIT and a CCT. The AIT includes application control information such as an organization ID (OrgID), an application ID (AppID), and an application URL (App_URL). The CCT includes cache control information such as URL of each file constituting a PU for each of application 1 and the like.

The receiver acquires an application URL of application 1 (App1) with reference to the AIT based on the application ID (AppID) of application 1 as a target of the pre fetch action added to the location information included in the trigger information (S84). The receiver determines files to be stored in the cache memory among file groups constituting application 1 with reference to the CCT.

The receiver accesses the application server via the Internet based on the application URL and the application item URL (a URL indicating an acquisition source of the files stored in the cache memory) and acquires the files of application 1 (S84). In this way, in the receiver, application 1 which is transmitted in communication is acquired and is stored in the cache memory (Cache). The files of application 1 stored in the cache memory is based on the capacity of the cache memory and the CCT as the cache control information.

Thereafter, the receiver transmits fingerprint information extracted from the live program in execution to the ACR server via the Internet periodically (for example, with a cycle of several seconds), and acquires trigger information based on the ACR identification result (S85). In the trigger information, an executing action for application 1 (App1) is added to the location information. The receiver checks the AIT based on the trigger information and then reads and executes application 1 stored in the cache memory (S86). Accordingly, in the receiver, application 1 is operated in conjunction with the live program.

Although the subsequent operation of application 1 is not illustrated in FIG. 21, the receiver transmits the fingerprint information extracted from the live program in reproduction to the ACR server via the Internet periodically (for example, with a cycle of several seconds), and acquires trigger information. When an inject event action for application 1 (App1) is added to the location information in the trigger information, the receiver ignites an event for application 1 in execution based on the trigger information.

When a prefetch action for application 2 (App2) is specified in the acquired trigger information, the receiver accesses the application server via the Internet based on the trigger information, acquires files of application 2, and stores the acquired files in the cache memory (Cache).

When a suspending action for application 1 (App1) and an executing action for application 2 (App2) are specified in the acquired trigger information, application 1 in execution is unloaded to the cache memory and application 2 stored in the cache memory is read and executed.

When a kill action for application 2 (App2) and an executing action for application 1 (App1) are specified in the acquired trigger information, application 2 in execution is terminated and application 1 unloaded to the cache memory is read and executed again. When a kill action for application 1 (App1) is included in the acquired trigger information, the receiver terminates application 1 in execution.

Figure 22:
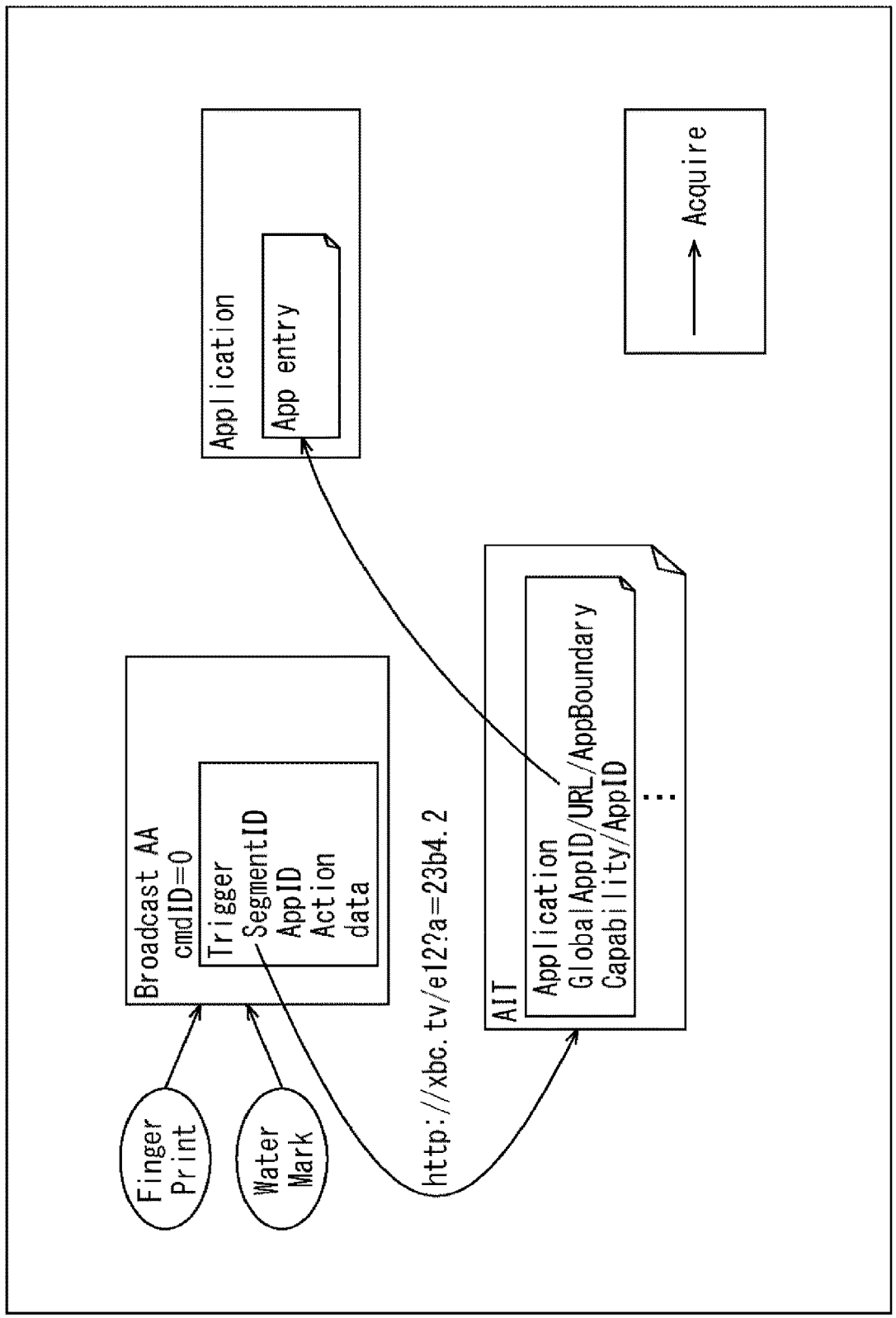
FIG. 22 is a diagram illustrating data correspondence in use case 5.

FIG. 22 illustrates data correspondence in use case 5. In FIG. 22, the trigger information is not transmitted using a video stream or the like, but is acquired as an inquiry result by transmitting fingerprint information or watermark information to the ACR server.

As illustrated in FIG. 22, the metadata such as the AIT or the EMT is acquired based on the location information included in the trigger information. The applications are acquired based on the application URL in the ATT.

Use case 5 has been described above.

(6) Use Case 6: Application Control Using SCS Signaling Information

Figure 23:
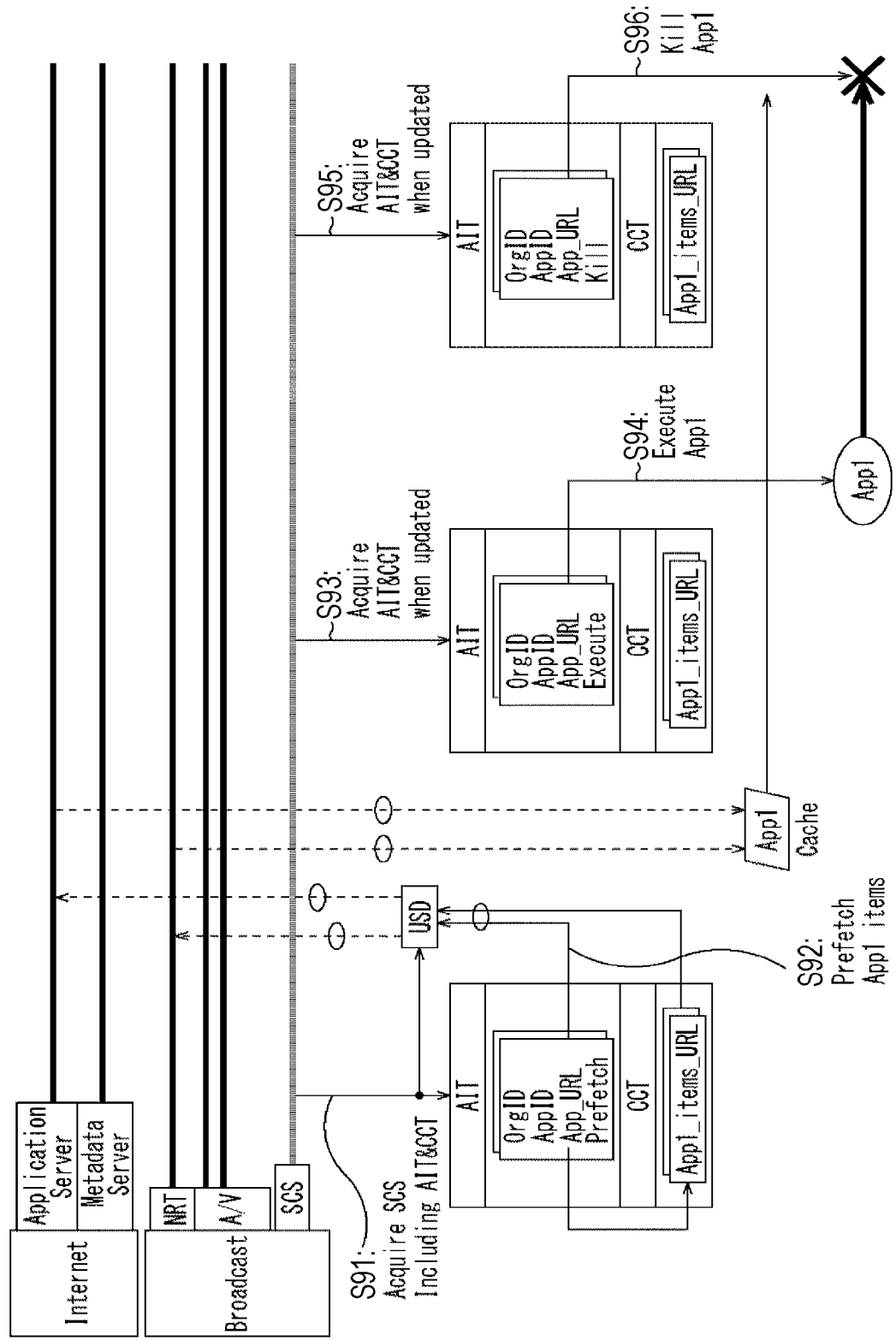
FIG. 23 is a diagram illustrating use case 6.

FIG. 23 is a diagram illustrating use case 6.

In FIG. 23, similarly to FIG. 11 and the like, a transmitter of a broadcast station (broadcaster) transmits a BBP stream over a broadcast channel of digital broadcast using the IP transmission method. In the BBP stream, a stream of AV content ("A/V" in the drawings), SCS signaling information ("SCS" in the drawings), and an application ("NRT" in the drawings) constituting a service are transmitted. Files transmitted using the stream are transmitted in the FLUTE session.

In FIG. 23, an application server (Application Server) disposed on the Internet (Internet) distributes applications. A metadata server (Matadata Server) is illustrated in FIG. 23, but it is assumed that the metadata server does not distribute metadata.

In use case 6, the SCS signaling information includes metadata (such as an AIT or a CCT). In use case 6, since trigger information is not used, video data or the like does not include trigger information and an ACR server providing the trigger information is not provided.

In FIG. 23, a receiver provided in each home accesses an A/V stream to reproduce the program. The receiver reads the SCD from a memory, accesses the SCS stream transmitted over a broadcast channel based on SCS bootstrap information, and acquires the SCS signaling information (S91). The SCS signaling information includes an AIT and a CCT in addition to the USD. In FIG. 23, the AIT includes a prefetch action as action information in addition to an organization ID (OrgID), an application ID (AppID), and an application URL (App_URL). The CCT includes cache control information such as URL of each file constituting a PU for application 1.

The receiver acquires an application URL corresponding to the application ID (AppID) of application 1 (App1) as a target of the prefetch action with reference to the AIT (S92). The receiver determines files to be stored in the cache memory among file groups constituting application 1 with reference to the CCT.

The receiver determines which of broadcast and communication a distribution path of (files of) application 1 is on the basis of the USD included in the SCS signaling information acquired in the process of step S91, an application URL, and an application item URL (a URL indicating an acquisition source of the files stored in the cache memory).

When (files of) application 1 is distributed in broadcast, the receiver accesses an NRT stream based on the SDP or the FDD included in the SCS signaling information and acquires the files of application 1 transmitted in the FLUTE session (S92). On the other hand, when (files of) application 1 is distributed in communication, the receiver accesses the application server via the Internet based on the application URL or the like and acquires the files of application 1 (S92).

In this way, in the receiver, (the files of) application 1 which is transmitted in broadcast or communication is acquired and is stored in the cache memory (Cache). The files of application 1 stored in the cache memory is based on the capacity of the cache memory and the CCT as the cache control information.

Thereafter, the receiver monitors whether the AIT and the CCT included in the SCS signaling information transmitted using the SCS stream are updated, and acquires the SCS signaling information including the AIT and the CCT when at least one of the AIT and the CCT is updated (S93). In the AIT, an executing action for application 1 (App1) is specified. The receiver reads and executes application 1 stored in the cache memory based on the AIT (S94). Accordingly, in the receiver, application 1 is operated in conjunction with the program.

Thereafter, the receiver monitors update of the AIT and the CCT, and acquires the SCS signaling information including the AIT and the CCT when at least one of the AIT and the CCT is updated (S95). The kill action for application 1 (App1) is specified in the ATT. The receiver terminates application 1 in execution based on the AIT. Accordingly, in the receiver, application 1 which is executed in conjunction with the program is terminated and only the program is displayed.

Use case 6 has been described above.

<4. System Configuration>

(Configuration Example of Broadcast Communication System)

Figure 24:
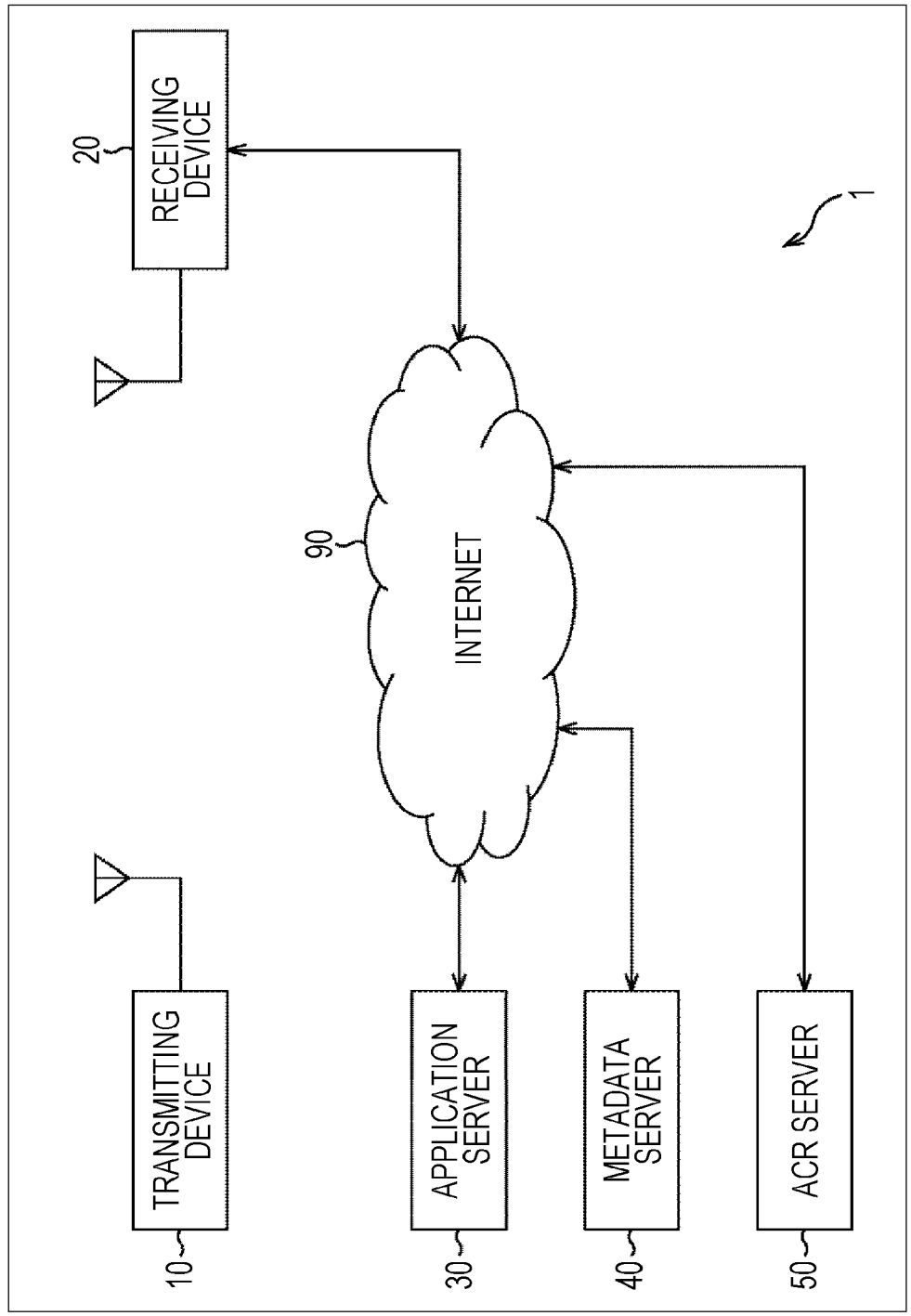
FIG. 24 is a diagram illustrating a configuration example of a broadcast communication system.

FIG. 24 is a diagram illustrating a configuration example of a broadcast communication system. A system means a set of plural elements (such as devices).

The broadcast communication system 1 illustrated in FIG. 24 has a configuration for realizing the above-described use cases 1 to 6. That is, in FIG. 24, the broadcast communication system 1 includes a transmitting device 10, a receiving device 20, an application server 30, a metadata server 40, and an ACR server 50. The receiving device 20 is connected to the application server 30, the metadata server 40, and the ACR server 50 via the Internet 90.

The transmitting device 10 transmits AV content such as a recorded program or a live program and signaling information using a digital broadcast signal. The transmitting device 10 transmits trigger information, metadata, or an application which has been included in the digital broadcast signal. The transmitting device 10 corresponds to the above-mentioned transmitter, is provided, for example, by a broadcaster, and is disposed in a broadcast station thereof.

The receiving device 20 receives the digital broadcast signal transmitted from the transmitting device 10. The receiving device 20 acquires and outputs video and an audio of the AV content based on the signaling information acquired from the digital broadcast signal. The receiving device 20 receives the digital broadcast signal from the transmitting device 10 and acquires the trigger information, the metadata, or the application.

The receiving device 20 accesses the application server 30 via the Internet 90 and acquires an application. The receiving device 20 accesses the metadata server 40 via the Internet 90 and acquires metadata.

The receiving device 20 controls an operation of an application acquired in broadcast or communication based on the signaling information, the trigger information, and the metadata acquired in broadcast or communication. The receiving device 20 is a TV receiver corresponding to the above-mentioned receiver and is disposed at each home and the like.

The application server 30 distributes an application to the receiving device 20 via the Internet 90 in response to a request from the receiving device 20. The application server 30 corresponds to the above-mentioned application server ("Application Server" in FIG. 11 and the like) and is installed, for example, by a broadcaster or the like.

The metadata server 40 distributes metadata to the receiving device 20 via the Internet 90 in response to a request from the receiving device 20. The metadata server 40 corresponds to the above-mentioned metadata server ("Matadata Server" in FIG. 11 and the like) and is installed, for example, by a broadcaster or the like.

The receiving device 20 accesses the ACR server 50 via the Internet 90 and inquires about the trigger information. At this time, the receiving device 20 transmits fingerprint information to the ACR server 50. The receiving device 20 acquires trigger information transmitted from the ACR server 50 and controls an operation of an application based on the trigger information.

The ACR server 50 performs an ACR process on the fingerprint information in response to the inquiry from the receiving device 20 and identifies AV content which is reproduced in the receiving device 20. The ACR server 50 generates trigger information based on the ACR identification result and transmits the trigger information to the receiving device 20 via the Internet 90. The ACR server 50 corresponds to the above-mentioned ACR server ("ACR Server" in FIG. 19 and the like) and is installed, for example, by a broadcaster or the like.

The broadcast communication system 1 has the above-mentioned configuration. Configuration examples of the devices constituting the broadcast communication system 1 illustrated in FIG. 24 will be described below.

(Configuration Example of Transmitting Device)

Figure 25:
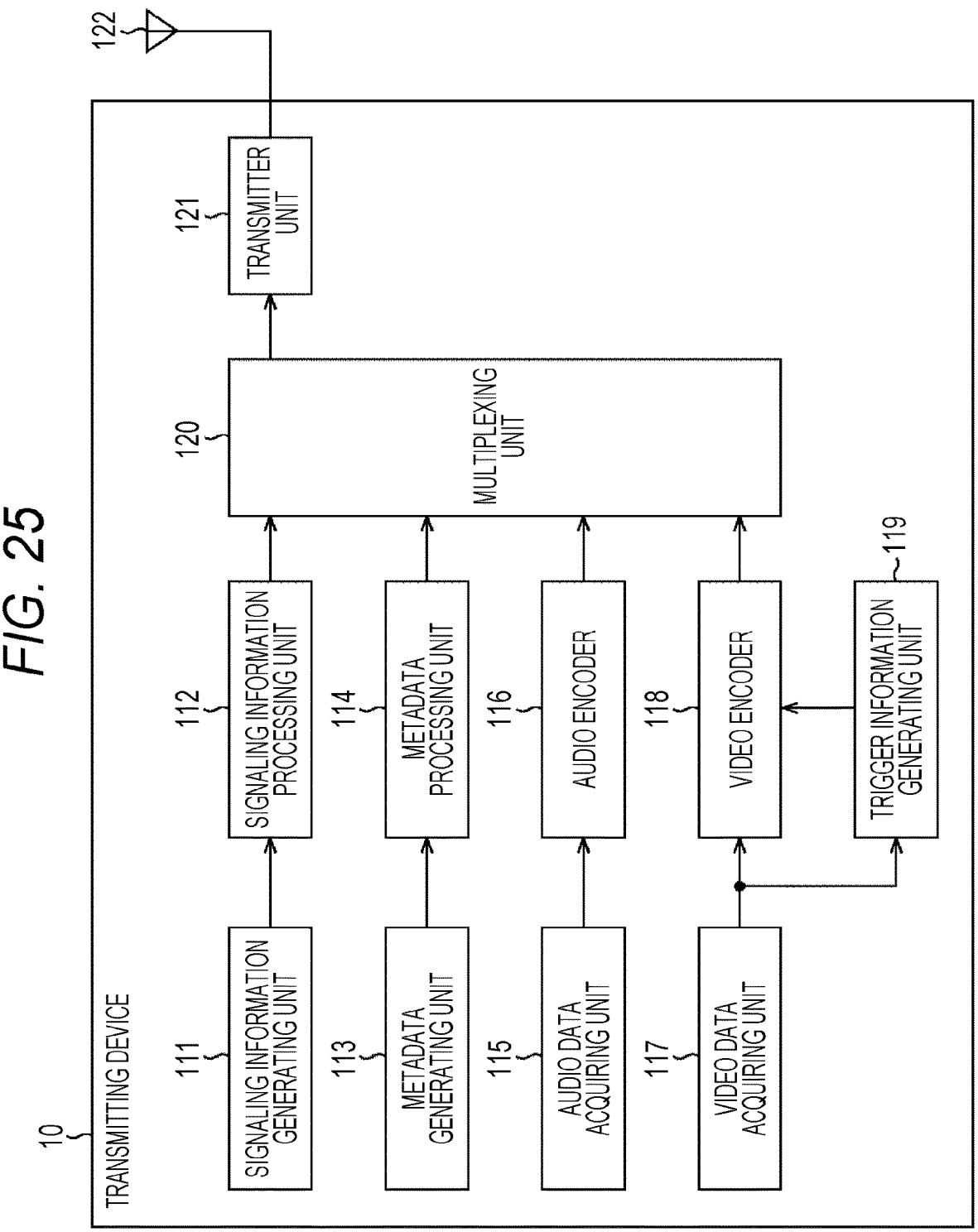
FIG. 25 is a diagram illustrating a configuration example of a transmitting device.

FIG. 25 is a diagram illustrating a configuration example of the transmitting device illustrated in FIG. 24.

In FIG. 25, the transmitting device 10 includes a signaling information generating unit 111, a signaling information processing unit 112, a metadata generating unit 113, a metadata processing unit 114, an audio data acquiring unit 115, an audio encoder 116, a video data acquiring unit 117, a video encoder 118, a trigger information generating unit 119, a multiplexing unit 120, and a transmitter unit 121.

The signaling information generating unit 111 generates and supplies signaling information to the signaling information processing unit 112. The signaling information processing unit 112 processes the signaling information supplied from the signaling information generating unit 111 and supplies the processed signaling information to the multiplexing unit 120.

The metadata generating unit 113 generates and supplies metadata to the metadata processing unit 114. The metadata processing unit 114 processes the metadata supplied from the metadata generating unit 113 and supplies the processed metadata to the multiplexing unit 120.

The audio data acquiring unit 115 acquires audio data of AV content from an external server, a microphone, a recording medium, or the like and supplies the audio data to the audio encoder 116. The audio encoder 116 encodes the audio data supplied from the audio data acquiring unit 115 based on an encoding method such as MPEG (Moving Picture Experts Group) and supplies the encoded audio data to the multiplexing unit 120.

The video data acquiring unit 117 acquires video data of the AV content from an external server, a camera, a recording medium, or the like and supplies the video data to the video encoder 118 and the trigger information generating unit 119. The video encoder 118 encodes the video data supplied from the video data acquiring unit 117 based on the encoding method such as MPEG and supplies the encoded video data to the multiplexing unit 120.

The trigger information generating unit 119 generates trigger information in conjunction with the progress of the AV content corresponding to the video data supplied from the video data acquiring unit 117 and supplies the trigger information to the video encoder 118 or the multiplexing unit 120. The video encoder 118 can include the trigger information supplied from the trigger information generating unit 119 in the video data and encode the resultant at the time of encoding the video data.

The multiplexing unit 120 multiplexes the signaling information from the signaling information processing unit 112, the metadata from the metadata processing unit 114, the audio data from the audio encoder 116, and the video data from the video encoder 118 and supplies a BBP stream obtained as the result to the transmitter unit 121.

When the trigger information is supplied from the trigger information generating unit 119, the multiplexing unit 120 further multiplexes the trigger information in addition to the audio data and the video data to generate a BBP stream. The metadata does not need to be transmitted when the distribution path thereof is communication. In this case, the metadata may not be included in the BBP stream. Although not illustrated in the configuration of FIG. 25, an application may be included in the BBP stream and be transmitted together.

The transmitter unit 121 transmits the BBP stream supplied from the multiplexing unit 120 as a digital broadcast signal via an antenna 122.

In FIG. 25, a case in which the trigger information is included in the video data and a case in which the trigger information is included in the BBP stream are exemplified, but the trigger information may be arranged using another method such as including the trigger information in the audio data.

(Configuration Example of Receiving Device)

Figure 26:
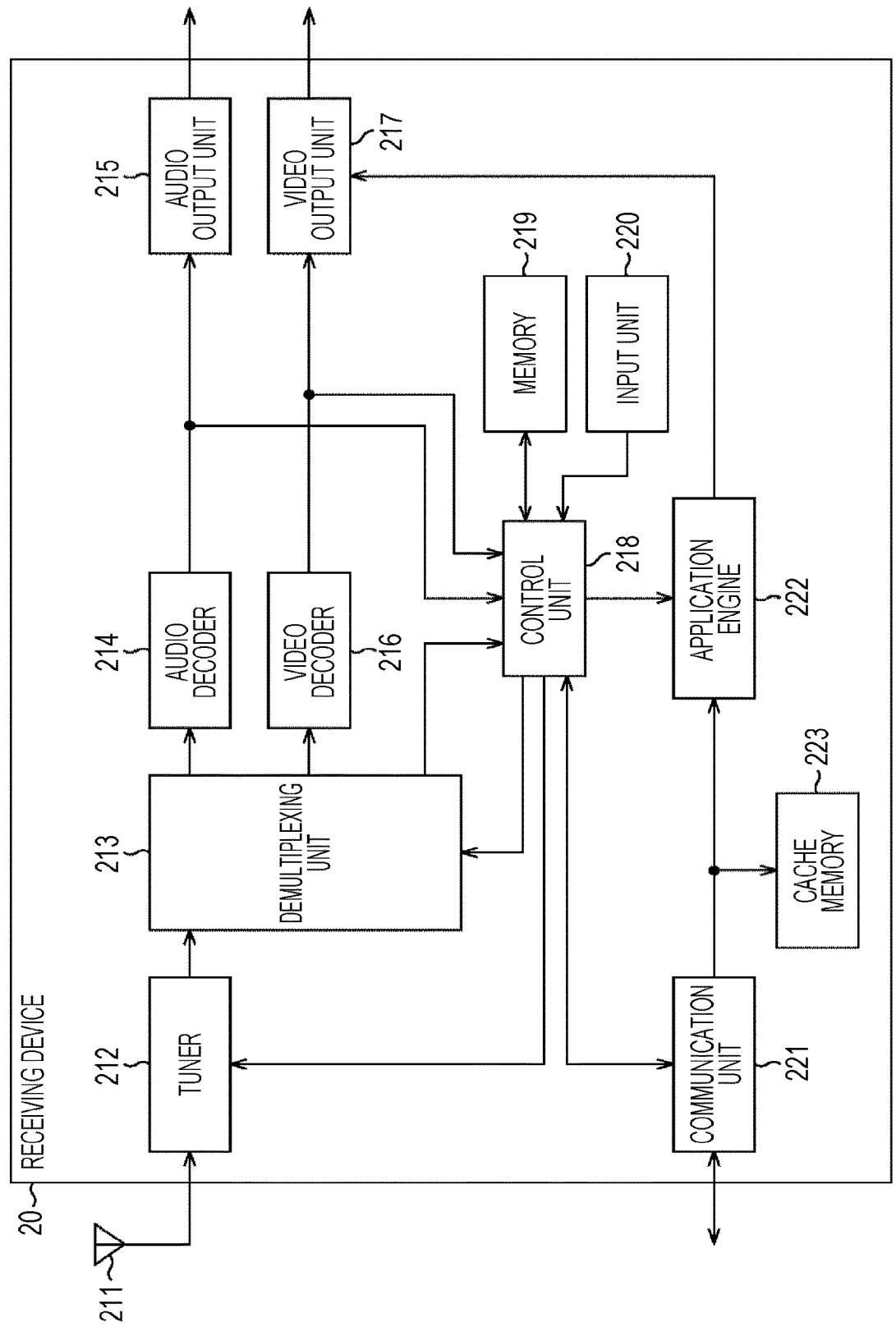
FIG. 26 is a diagram illustrating a configuration example of a receiving device.

FIG. 26 is a diagram illustrating a configuration example of the receiving device illustrated in FIG. 24.

In FIG. 26, the receiving device 20 includes a tuner 212, a demultiplexing unit 213, an audio decoder 214, an audio output unit 215, a video decoder 216, a video output unit 217, a control unit 218, a memory 219, an input unit 220, a communication unit 221, an application engine 222, and a cache memory 223.

The tuner 212 tunes and demodulates a digital broadcast signal received via an antenna 211 and supplies a BBP stream obtained as the result to the demultiplexing unit 213. The demultiplexing unit 213 demultiplexes the BBP stream supplied from the tuner 212 into audio data, video data, signaling information, and metadata. The demultiplexing unit 213 supplies the audio data to the audio decoder, supplies the video data to the video decoder, and supplies the signaling information and the metadata to the control unit 218.

The audio decoder 214 decodes the audio data supplied from the demultiplexing unit 213 using a decoding method corresponding to the encoding method in the audio encoder 116 (FIG. 25) and supplies the audio data obtained as the result to the audio output unit 215 and the control unit 218.

The audio output unit 215 outputs the audio data supplied from the audio decoder 214 to a speaker (not illustrated). The speaker outputs sound corresponding to the audio data supplied from the audio output unit 215.

The video decoder 216 decodes the video data supplied from the demultiplexing unit 213 using a decoding method corresponding to the encoding method in the video encoder 118 (FIG. 25) and supplies the video data obtained as the result to the video output unit 217 and the control unit 218.

The video output unit 217 outputs the video data supplied from the video decoder 216 to a display (not illustrated). The display displays video corresponding to the video data supplied from the video output unit 217.

The control unit 218 controls operations of the units of the receiving device 20 such as the tuner 212, the demultiplexing unit 213, and the communication unit 221. A variety of data supplied from the control unit 218 is stored in the memory 219. The input unit 220 receives an operation from a user and supplies an operation signal corresponding thereto to the control unit 218.

The control unit 218 acquires the signaling information and the metadata supplied from the demultiplexing unit 213. The control unit 218 acquires the trigger information or the fingerprint information based on the audio data supplied from the audio decoder 214 or the video data supplied from the video decoder 216. The control unit 218 supplies the fingerprint information to the communication unit 221.

The communication unit 221 accesses the application server 30 via the Internet 90 and requests for an application under the control by the control unit 218. The communication unit 221 acquires an application transmitted from the application server 30 via the Internet 90 and stores the acquired application in the cache memory 223.

The communication unit 221 accesses the metadata server 40 via the Internet 90 and requests for metadata under the control by the control unit 218. The communication unit 221 acquires metadata supplied from the metadata server 40 via the Internet 90 and supplies the acquired metadata to the control unit 218.

The communication unit 221 accesses the ACR server 50 via the Internet 90, transmits fingerprint information thereto, and inquires about trigger information under the control by the control unit 218. The communication unit 221 acquires trigger information transmitted from the ACR server 50 via the Internet 90 and supplies the acquired trigger information to the control unit 218.

The control unit 218 controls an operation of an application acquired in broadcast or communication based on the signaling information, the trigger information, and the metadata which are acquired in broadcast or communication. The application engine 222 reads and executed an application stored in the cache memory 223 under the control by the control unit 218. The application engine 222 controls operations such as deactivation (suspending), event ignition, termination of an application under the control of the control unit 218.

The video data of the application is supplied to the video output unit 217. The video output unit 217 combines the video data supplied from the application engine 222 with the video data supplied from the video decoder 216 and displays video obtained as the result on the display.

Although not illustrated in the configuration of FIG. 26, when the distribution path of an application is broadcast and the application is included in and transmitted with a BBP stream, the application demultiplexed by the demultiplexing unit 213 is stored in the cache memory 223.

(Configuration of Control Unit)

Figure 27:
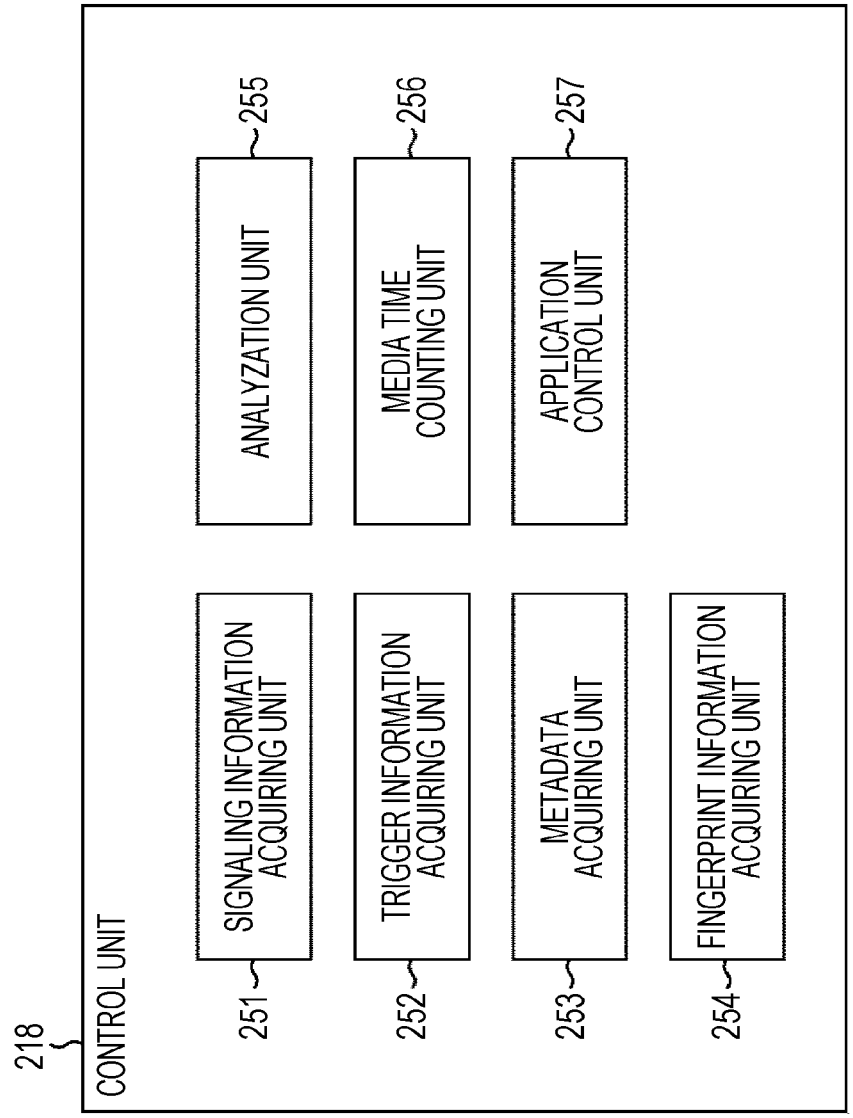
FIG. 27 is a diagram illustrating a configuration example of a control unit.

FIG. 27 is a diagram illustrating a functional configuration example of a part that performs a control process of an application in the control unit 218 illustrated in FIG. 26.

In FIG. 27, the control unit 218 includes a signaling information acquiring unit 251, a trigger information acquiring unit 252, a metadata acquiring unit 253, a fingerprint information acquiring unit 254, an analyzation unit 255, a media time counting unit 256, and an application control unit 257.

The signaling information acquiring unit 251 accesses an SCS stream based on SCS bootstrap information and acquires and supplies SCS signaling information to the analyzation unit 255.

The trigger information acquiring unit 252 normally monitors video data supplied from the video decoder 216, and acquires and supplies trigger information included in the video data to the analyzation unit 255. When media time information is included in the trigger information, the trigger information acquiring unit 252 supplies the media time information to the media time counting unit 256.

When the trigger information is disposed in a BBP stream, the trigger information acquiring unit 252 monitors a pack including the trigger information demultiplexed by the demultiplexing unit 213 and acquires the trigger information therefrom.

The metadata acquiring unit 253 acquires metadata distributed in broadcast or communication as an analysis result from the analyzation unit 255 and supplies the metadata to the acquired analyzation unit 255.

The fingerprint information acquiring unit 254 acquires (extracts) fingerprint information from at least one of the audio data supplied from the audio decoder 214 and the video data supplied from the video decoder 216 and supplies the acquired fingerprint information to the communication unit 221. The communication unit 221 accesses the ACR server 50 via the Internet 90 and transmits the fingerprint information thereto. The communication unit 221 receives the trigger information transmitted from the ACR server 50 and supplies the trigger information to the trigger information acquiring unit 252. The trigger information acquiring unit 252 acquires the trigger information supplied from the communication unit 221 and supplies the trigger information to the analyzation unit 255.

The analyzation unit 255 is supplied with the signaling information from the signaling information acquiring unit 251, the trigger information from the trigger information acquiring unit 252, and the metadata from the metadata acquiring unit 253. The analyzation unit 255 analyzes at least one of the signaling information, the trigger information, and the metadata and supplies the analyzation result to the metadata acquiring unit 253 or the application control unit 257.

The media time counting unit 256 sets the media time information supplied from the trigger information acquiring unit 252 and counts the time based on the media time information.

The application control unit 257 controls the application engine 222 (FIG. 26) based on the analyzation result from the analyzation unit 255 to control the operation of the application.

(Configuration Examples of Servers)

Figure 28:
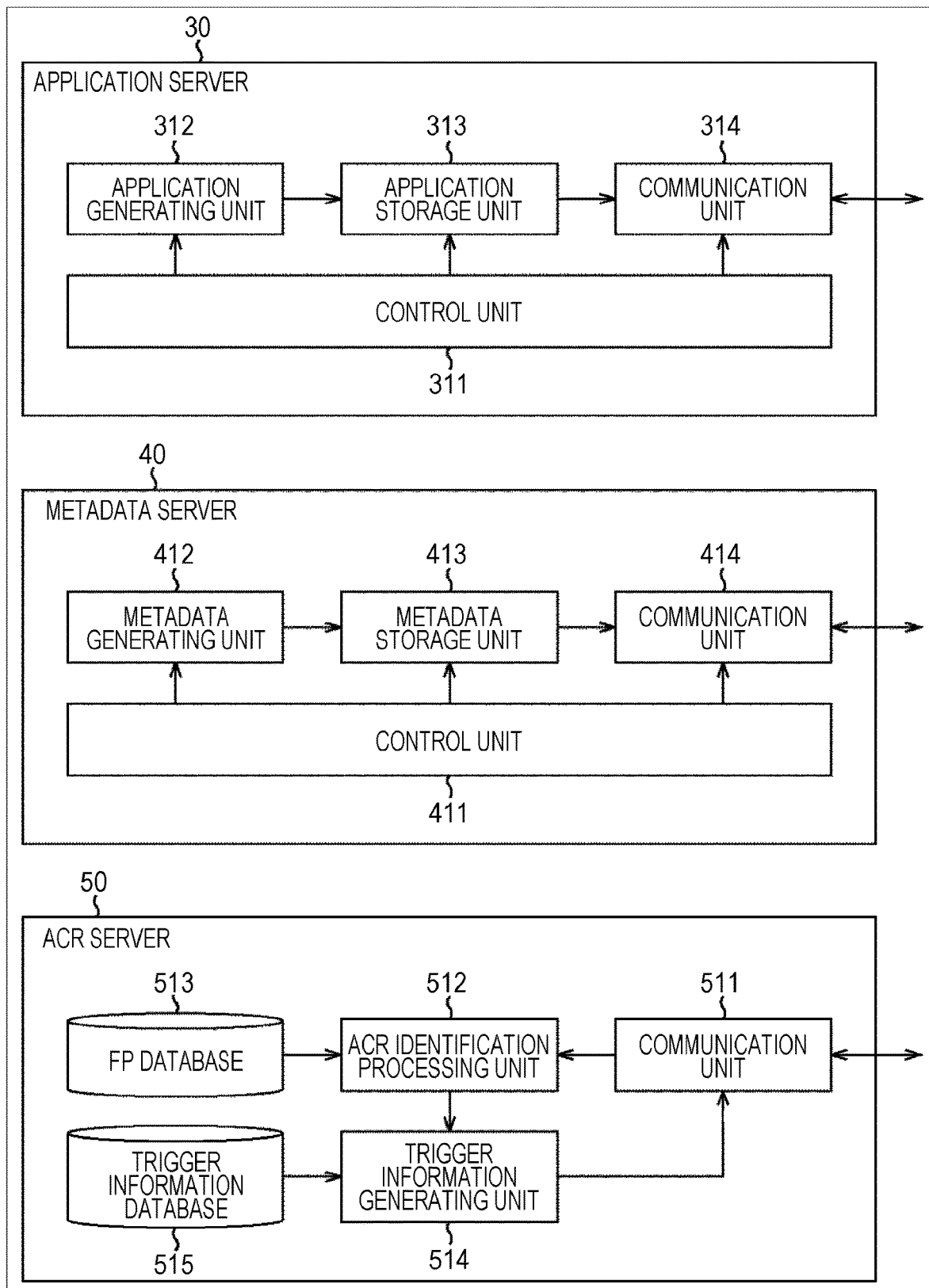
FIG. 28 is a diagram illustrating a configuration example of servers.

FIG. 28 is a diagram illustrating configuration examples of the servers illustrated in FIG. 24. FIG. 28 illustrates configuration examples of the application server 30, the metadata server 40, and the ACR server 50.

In FIG. 28, the application server 30 includes a control unit 311, an application generating unit 312, an application storage unit 313, and a communication unit 314. The control unit 311 controls operations of the units of the application server 30. The application generating unit 312 generates an application (which includes, for example, HTML files or JPEG file) which is executed in conjunction with AV content and stores the generated application in the application storage unit 313 under the control by the control unit 311.

The communication unit 314 communicates with the receiving device 20 via the Internet 90 under the control by the control unit 311. The control unit 311 normally monitors a communication state of the communication unit 314, acquires an application from the application storage unit 313 when the application is requested for by the receiving device 20, and supplies the acquired application to the communication unit 314. The communication unit 314 transmits the application to the receiving device 20 as the request source via the Internet 90 under the control by the control unit 311.

The application server 30 has the above-mentioned configuration.

In FIG. 28, the metadata server 40 includes a control unit 411, a metadata generating unit 412, a metadata storage unit 413, and a communication unit 414. The control unit 411 controls operations of the units of the metadata server 40. The metadata generating unit 412 generates metadata including at least one piece of information of an AIT, an EMT, and a CCT and stores the generated metadata in the metadata storage unit 413 under the control by the control unit 411.

The communication unit 414 communicates with the receiving device 20 via the Internet 90 under the control by the control unit 411. The control unit 411 normally monitors a communication state of the communication unit 414, acquires the metadata from the metadata storage unit 413 when the metadata is requested for by the receiving device 20, and supplies the acquired metadata to the communication unit 414. The communication unit 414 transmits the metadata to the receiving device 20 as a request source via the Internet 90 under the control by the control unit 411.

The metadata server 40 has the above-mentioned configuration.

In FIG. 28, the ACR server 50 includes a communication unit 511, an ACR identification processing unit 512, an FP database 513, a trigger information generating unit 514, and a trigger information database. The communication unit 511 communicates with the receiving device 20 via the Internet 90. When trigger information is inquired about by the receiving device 20, the communication unit 511 receives and supplies fingerprint information to the ACR identification processing unit 512.

The ACR identification processing unit 512 compares the fingerprint information supplied from the communication unit 511 with a preset FP database 513, and performs an ACR identification process of identifying AV content in execution in the receiving device 20 as an inquiry source. The ACR identification processing unit 512 supplies the result of the ACR identification process to the trigger information generating unit 514.

The fingerprint information (feature) is, for example, information specific to all or some elements of the AV content, and information specific to multiple AV content is registered in the FP database 513. In the ACR identification process, for example, similarity or coincidence of the specific information is determined. As a method of determining the similarity or coincidence, known techniques disclosed in various documents and the like can be used.

The trigger information generating unit 514 generates and supplies trigger information to the communication unit 511 based on the result of the ACR identification process supplied from the ACR identification processing unit 512 and a variety of information registered in the trigger information database 515. The communication unit 511 transmits the trigger information supplied from the trigger information generating unit 514 to the receiving device 20 as an inquiry source via the Internet 90.

The ACR server 50 has the above-mentioned configuration.

<5. Process Flows Performed by Devices>

Process flows which are performed by the devices constituting the broadcast communication system 1 in FIG. 24 will be described below with reference to the flowcharts illustrated in FIGS. 29 to 36.

(Digital Broadcast Signal Transmitting Process)

Figure 29:
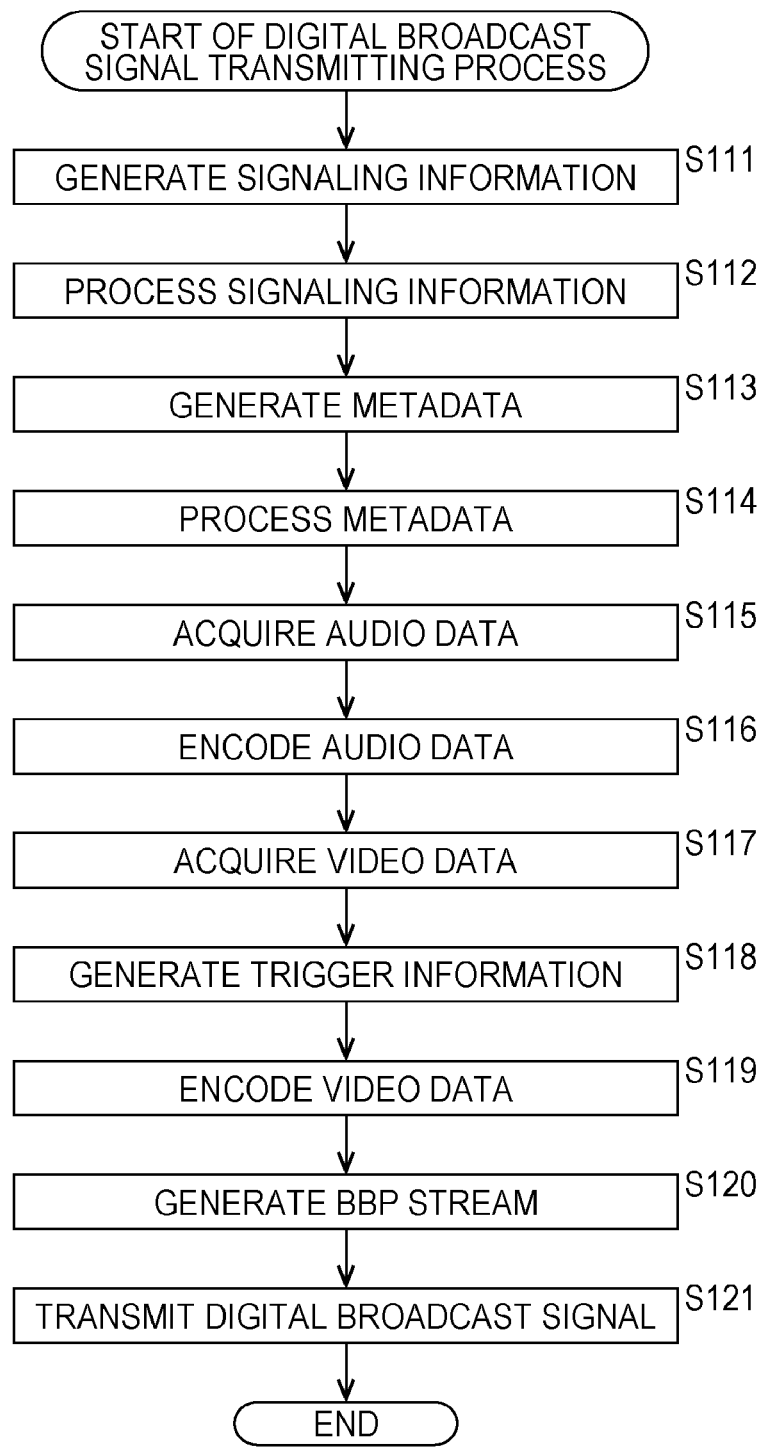
FIG. 29 is a flowchart illustrating a flow of a digital broadcast signal transmitting process.

First, a flow of a digital broadcast signal transmitting process which is performed by the transmitting device 10 illustrated in FIG. 24 will be described with reference to the flowchart illustrated in FIG. 29.

In step S111, the signaling information generating unit 111 generates signaling information. In step S112, the signaling information processing unit 112 processes the signaling information generated in the process of step S111.

In step S113, the metadata generating unit 113 generates metadata. In step S114, the metadata processing unit 114 processes the metadata generated in the process of step S113.

In step S115, the audio data acquiring unit 115 acquires audio data of AV content from an external server or the like. In step S116, the audio encoder 116 encodes the audio data acquired in the process of step S115 based on an encoding method such as MPEG.

In step S117, the video data acquiring unit 117 acquires video data of the AV content from an external server or the like. In step S118, the trigger information generating unit 119 generates trigger information in conjunction with the progress of the AV content corresponding to the video data acquired in the process of step S117.

In step S119, the video encoder 118 encodes the video data acquired in the process of step S117 based on an encoding method such as MPEG. Here, in encoding the video data, the video encoder 118 includes the trigger information supplied from the trigger information generating unit 119 in the video data and encodes the resultant data together.

In step S120, the multiplexing unit 120 multiplexes the signaling information processed in step S112, the metadata processed in step S114, the audio data encoded in step S116, and the video data encoded in step S119 and supplies the BBP stream obtained as the result to the transmitter unit 121.

In step S121, the transmitter unit 121 transmits the BBP stream generated in the process of step S120 as a digital broadcast signal using an IP transmission method via the antenna 122. When the process of step S121 ends, the digital broadcast signal transmitting process illustrated in FIG. 29 ends.

The flow of the digital broadcast signal transmitting process has been described above. In the digital broadcast signal transmitting process illustrated in FIG. 29, an example in which the trigger information is included in the video data is described for the purpose of simplification of explanation.

(Digital Broadcast Receiving Process)

A flow of a digital broadcast signal receiving process which is performed by the receiving device 20 illustrated in FIG. 24 will be described below with reference to the flowchart illustrated in FIG. 30.

In step S211, the tuner 212 tunes and demodulates a digital broadcast signal using an IP transmission method which is received via the antenna 211. In step S212, the demultiplexing unit 213 demultiplexes the audio data and the video data from the BBP stream demodulated in the process of step S211.

In step S213, the audio decoder 214 decodes the audio data demultiplexed in the process of step S212 using a decoding method corresponding to the encoding method used in the audio encoder 116 (FIG. 25). In step S214, the video decoder 216 decodes the video data demultiplexed in the process of step S212 using a decoding method corresponding to the encoding method used in the video encoder 118 (FIG. 25).

In step S215, the audio output unit 215 outputs the audio data decoded in the process of step S213 to a speaker (not illustrated). In step S216, the video output unit 217 outputs the video data decoded in the process of step S214 to a display (not illustrated). Accordingly, video of the AV content is displayed on the display and an audio synchronized with the video is output from the speaker.

Figure 30:
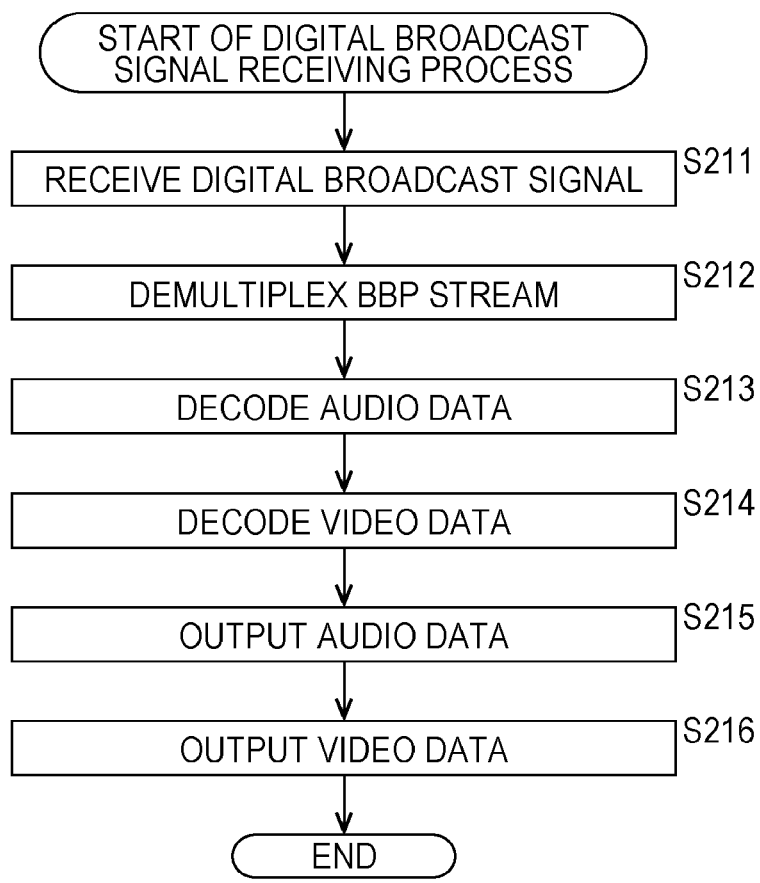
FIG. 30 is a flowchart illustrating a flow of a digital broadcast signal receiving process.

When the process of step S216 ends, the digital broadcast signal receiving process illustrated in FIG. 30 ends.

The flow of the digital broadcast signal receiving process has been described above.

(Application Control Process in Conjunction with Recorded Program)

A flow of an application control process in conjunction with a recorded program which is performed by the receiving device 20 illustrated in FIG. 24 will be described below with reference to the flowchart illustrated in FIG. 31. Before the application control process in conjunction with a recorded program, it is assumed that the receiving device 20 receives a digital broadcast signal from the transmitting device 10 and reproduces a recorded program such as a drama as the AV content.

In step S231, the signaling information acquiring unit 251 accesses an SCS stream based on SCS bootstrap information and acquires SCS signaling information. The SCS signaling information is analyzed by the analyzation unit 255.

In step S232, the trigger information acquiring unit 252 normally monitors video data supplied from the video decoder 216 and acquires trigger information included in the video data. The trigger information is analyzed by the analyzation unit 255.

In step S233, the media time counting unit 256 sets media time information based on the analyzation result of the trigger information acquired in the process of step S232 and starts counting of time based on the media time information.

In step S234, the metadata acquiring unit 253 acquires metadata (AIT, EMT, and CCT) distributed in broadcast or communication based on the analyzation result from the analyzation unit 255. Specifically, it is determined which of broadcast and communication the distribution path of the metadata is based on the USD included in the SCS signaling information acquired in the process of step S231 and the location information included in the trigger information acquired in the process of step S232.

When the metadata is distributed in broadcast, the metadata acquiring unit 253 accesses the SCS stream based on the SDP or the FDD included in the SCS signaling information and acquires files of the metadata transmitted in the FLUTE session. On the other hand, when the metadata is distributed in communication, the metadata acquiring unit 253 controls the communication unit 221 to access the metadata server 40 via the Internet 90 based on the location information included in the trigger information and acquires the files of the metadata. The metadata is analyzed by the analyzation unit 255.

In step S235, it is determined whether the time counted by the media time counting unit 256 reaches the start time of an event prescribed in a list of the EMT. When it is determined in step S235 that the counted time does not reach the start time of an event prescribed in the list of the EMT, the process flow is returned to step S235 and the determination process of step S235 is repeated. That is, the process flow waits until the counted time reaches the start time of an event prescribed in the list of the EMT in step S235, and then the process flow moves to step S236.

In step S236, the application control unit 257 controls the application engine 222 to perform an action for an application corresponding to the event in which it is determined in step S235 that the counted time reaches the start time.

In step S237, it is determined whether an event to be executed remains in the list of the EMT. When it is determined in step S237 that an event to be executed remains, the process flow is returned to step S235 and the subsequent processes thereof are repeated.

That is, for example, when the EMT illustrated in FIG. 11 is acquired in the process of step S234, a prefetch action (Pref) at time T0, an executing action (Exec) at time T1, an inject event action (Inj_A_E) at time T2, a suspending action (Susp) at time T4, an executing action (Exec) at time T5, and a kill action (Kill) at time T6 are prescribed as action information for application 1 (App1) in the EMT. In the EMT illustrated in FIG. 11, a prefetch action (Pref) at time T3, an executing action (Exec) at time T4, and a kill action (Kill) at time T5 are prescribed as action information for application (App2).

In this case, the processes of steps S235 to S237 are repeated, and corresponding events, that is, the prefetch action and the executing action for application 1, the prefetch action for application 2, and the like, are sequentially performed at the times at which the time counted by the media time counting unit 256 reaches times T0 to T6.

Figure 31:
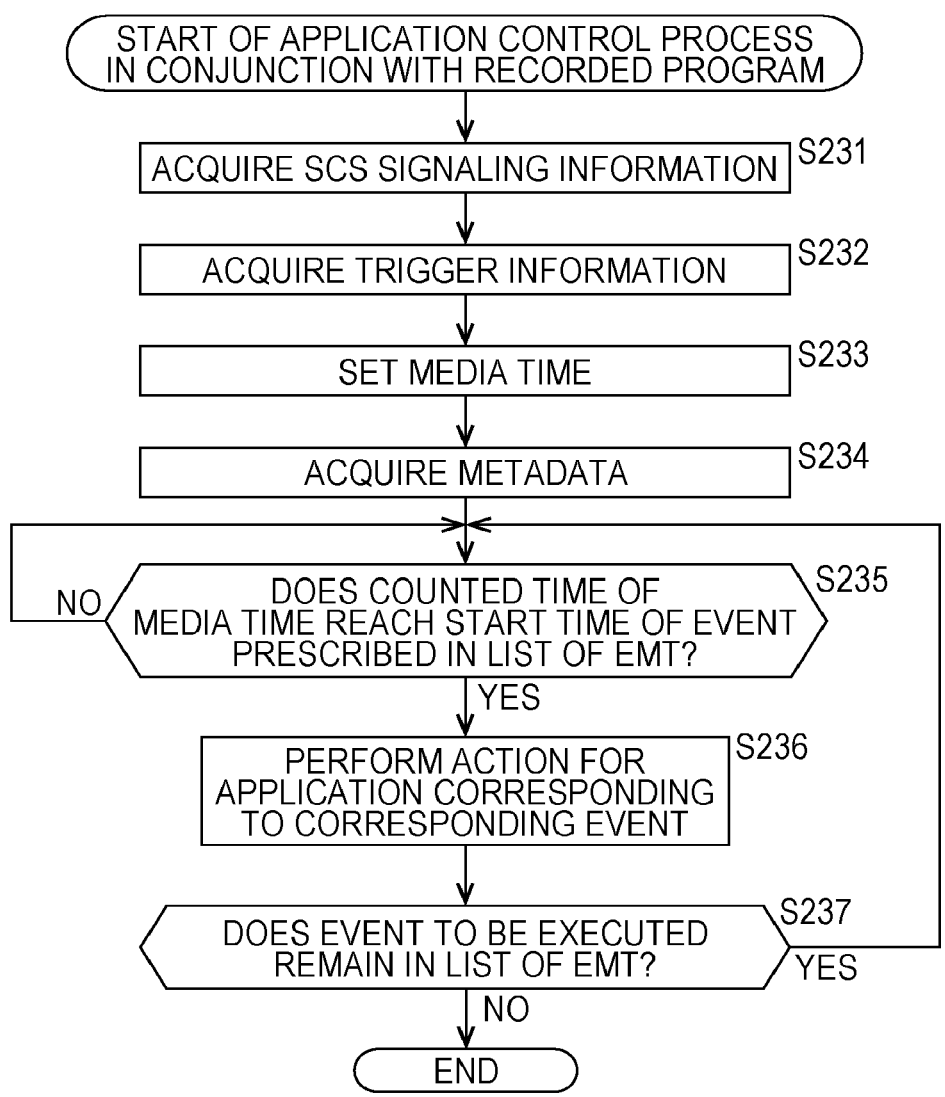
FIG. 31 is a flowchart illustrating a flow of an application control process in conjunction with a recorded program.

When it is determined in step S237 that an event to be executed does not remain, the application control process in conjunction with a recorded program illustrated in FIG. 31 ends.

The flow of the application control process in conjunction with a recorded program has been described above. The application control process in conjunction with a recorded program corresponds to the above-mentioned use cases 1 and 4.

(Application Control Process in Conjunction with Live Program)

A flow of an application control process in conjunction with a live program which is performed by the receiving device 20 illustrated in FIG. 24 will be described below with reference to the flowchart illustrated in FIG. 32. Before the application control process in conjunction with a live program, it is assumed that the receiving device 20 receives a digital broadcast signal from the transmitting device 10 and reproduces a recorded program such as sports rebroadcast as the AV content.

In step S251, the signaling information acquiring unit 251 accesses an SCS stream based on SCS bootstrap information and acquires SCS signaling information. The SCS signaling information is analyzed by the analyzation unit 255.

In step S252, the trigger information acquiring unit 252 normally monitors video data supplied from the video decoder 216 and acquires trigger information included in the video data. The trigger information is analyzed by the analyzation unit 255.

In step S253, the metadata acquiring unit 253 acquires metadata (AIT and CCT) distributed in broadcast or communication based on the analyzation result from the analyzation unit 255. Specifically, it is determined which of broadcast and communication the distribution path of the metadata is based on the USD included in the SCS signaling information acquired in the process of step S251 and the location information included in the trigger information acquired in the process of step S252.

When the metadata is distributed in broadcast, the metadata acquiring unit 253 accesses the SCS stream based on the SDP or the FDD included in the SCS signaling information and acquires files of the metadata transmitted in the FLUTE session. On the other hand, when the metadata is distributed in communication, the metadata acquiring unit 253 controls the communication unit 221 to access the metadata server 40 via the Internet 90 based on the location information included in the trigger information and acquires the files of the metadata. The metadata is analyzed by the analyzation unit 255.

In step S254, the application control unit 257 supplies the application distributed in broadcast or communication to the application engine 222 based on the analyzation result from the analyzation unit 255. Specifically, it is determined which of broadcast and communication the distribution path of the application is based on the USD included in the SCS signaling information acquired in the process of step S251, the application URL acquired in the process of step S253, and the application item URL (URL indicating an acquisition source of the files stored in the cache memory).

When the application is distributed in broadcast, the application control unit 257 accesses an NRT stream based on the SDP or the FDD included in the SCS signaling information and acquires files of the application transmitted in the FLUTE session. On the other hand, when the application is distributed in communication, the application control unit 257 controls the communication unit 221 to access the application server 30 via the Internet 90 and to acquire the files of the application based on the application URL or the like. The acquired application is stored in the cache memory 223. The files of the application stored in the cache memory 223 are based on the capacity of the cache memory 223 and the CCT as the cache control information.

In step S255, the video data supplied from the video decoder 216 is normally monitored by the trigger information acquiring unit 252 and it is determined whether the trigger information included in the video data is acquired. When it is determined in step S255 that the trigger information is acquired, the process flow moves to step S256.

In step S256, the application control unit 257 controls the application engine 222 to perform an action of the application included in the trigger information acquired in the process of step S255. When the process of step S256 ends, the process flow moves to step S257. When it is determined in step S255 that the trigger information is not acquired, the process of step S256 is skipped and the process flow moves to step S257.

In step S257, it is determined whether the live program in execution is terminated. When it is determined in step S257 that the live program in execution is not terminated, the process flow is returned to step S255 and the subsequent processes thereof are repeated.

Then, the processes of steps S255 to S257 are repeated, and the prefetch action and the executing action for application 1, the prefetch action for application 2, and the like are performed at the time at which the trigger information is acquired based on the action information included in the trigger information.

Figure 32:
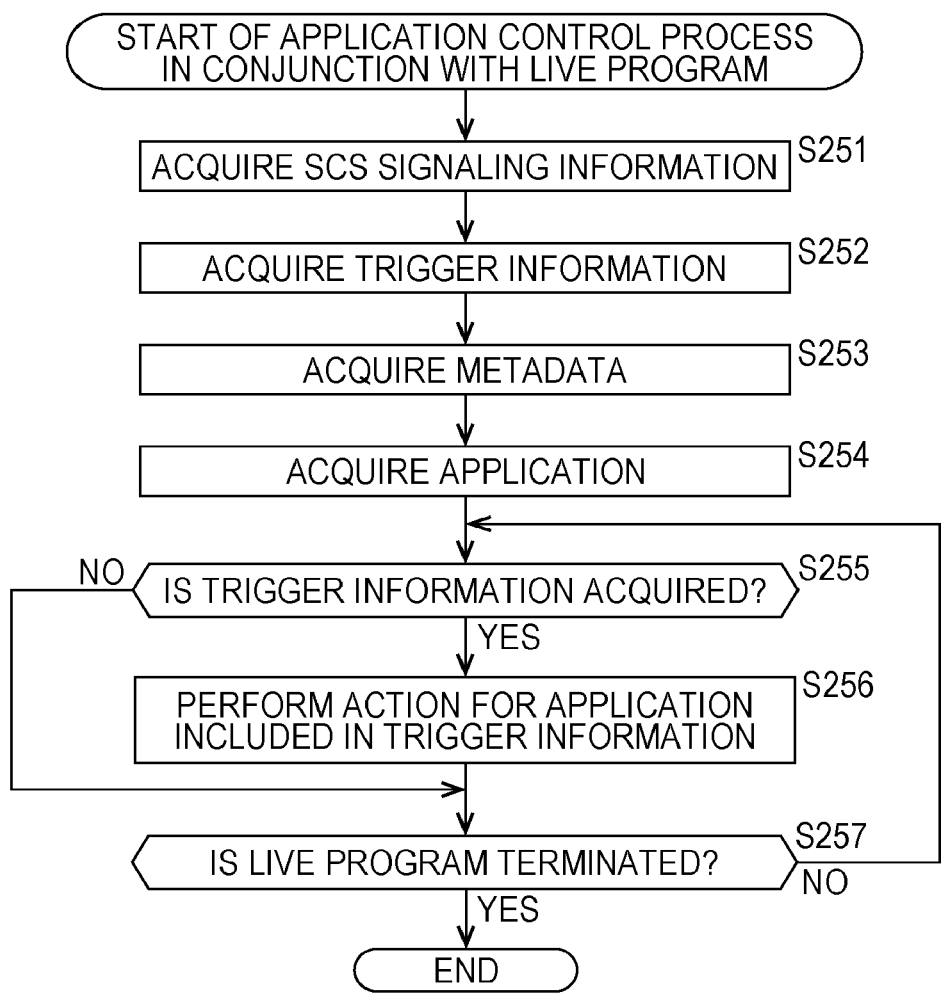
FIG. 32 is a flowchart illustrating a flow of an application control process in conjunction with a live program.

When it is determined in step S257 that the live program is terminated, the application control process in conjunction with a live program illustrated in FIG. 32 ends.

The flow of the application control process in conjunction with a live program has been described above. The application control process in conjunction with a live program corresponds to the above-mentioned use cases 2 and 5.

(Hybrid Application Control Process)

Figure 33:
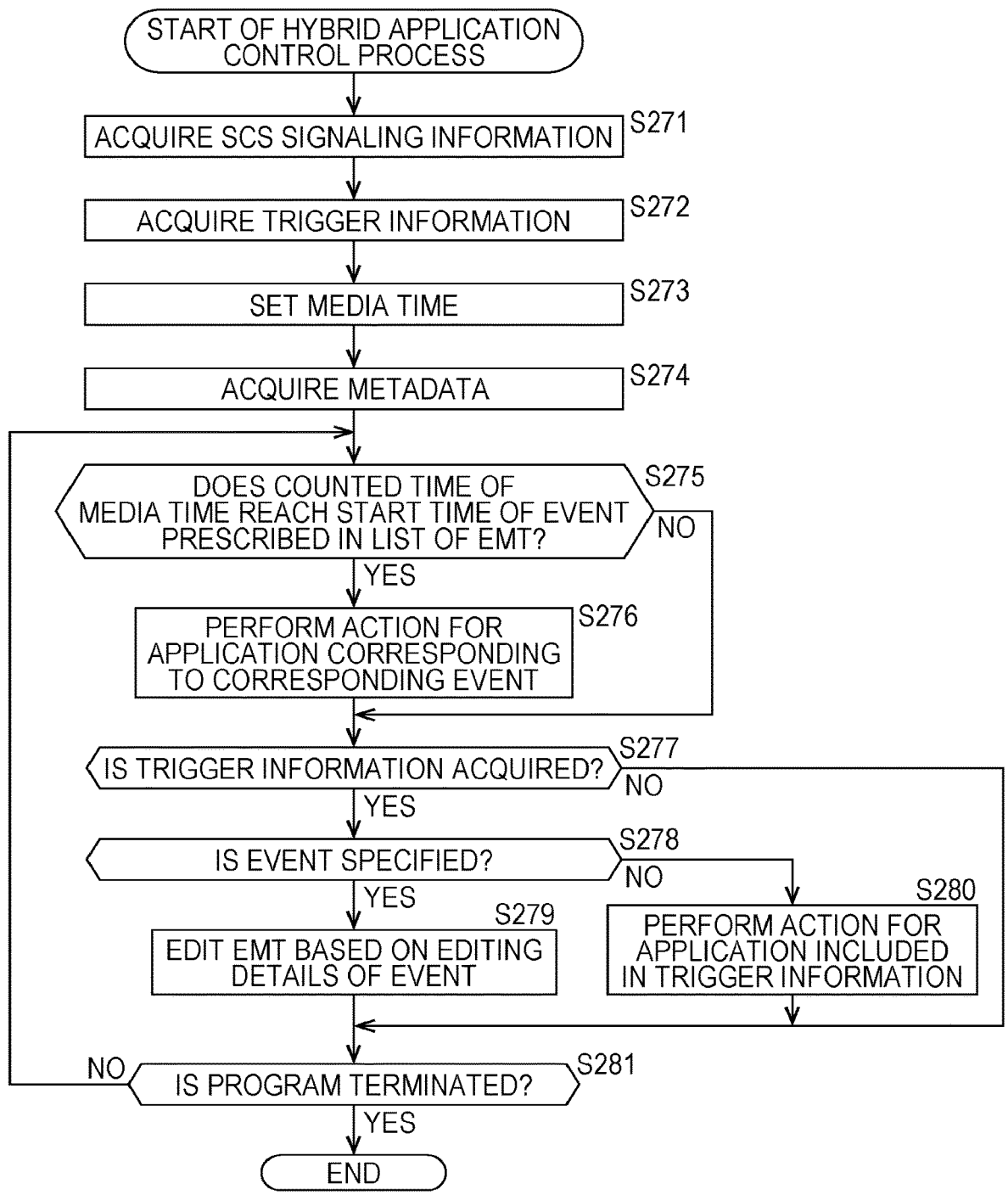
FIG. 33 is a flowchart illustrating a flow of a hybrid application control process.

A flow of a hybrid application control process which is performed by the receiving device 20 illustrated in FIG. 24 will be described below with reference to the flowchart illustrated in FIG. 33. In the receiving device 20, it is assumed that AV content such as a program is reproduced.

In step S271, the signaling information acquiring unit 251 accesses an SCS stream based on SCS bootstrap information and acquires SCS signaling information. The SCS signaling information is analyzed by the analyzation unit 255.

In step S272, the trigger information acquiring unit 252 normally monitors video data supplied from the video decoder 216 and acquires trigger information included in the video data. The trigger information is analyzed by the analyzation unit 255.

In step S273, the media time counting unit 256 sets media time information based on the analyzation result of the trigger information acquired in the process of step S272 and starts counting of time based on the media time information.

In step S274, the metadata acquiring unit 253 acquires metadata (AIT, EMT, and CCT) distributed in broadcast or communication based on the analyzation result from the analyzation unit 255. Specifically, it is determined which of broadcast and communication the distribution path of the metadata is based on the USD included in the SCS signaling information acquired in the process of step S271 and the location information included in the trigger information acquired in the process of step S272.

When the metadata is distributed in broadcast, the metadata acquiring unit 253 accesses the SCS stream based on the SDP or the FDD included in the SCS signaling information and acquires files of the metadata transmitted in the FLUTE session. On the other hand, when the metadata is distributed in communication, the metadata acquiring unit 253 controls the communication unit 221 to access the metadata server 40 via the Internet 90 based on the location information included in the trigger information and acquires the files of the metadata. The metadata is analyzed by the analyzation unit 255.

In step S275, it is determined whether the time counted by the media time counting unit 256 reaches the start time of an event prescribed in a list of the EMT. When it is determined in step S275 that the counted time reaches the start time of an event prescribed in the list of the EMT, the process flow moves to step S276.

In step S276, the application control unit 257 controls the application engine 222 to perform an action for an application corresponding to the event in which it is determined in step S275 that the counted time reaches the start time. When the process of step S276 ends, the process flow moves to step S277. When it is determined in step S275 that the counted time does not reach the start time of the event prescribed in the list of the EMT, the process of step S276 is skipped and the process flow moves to step S277.

In step S277, the video data supplied from the video decoder 216 is normally monitored and it is determined whether trigger information included in the video data is acquired. When it is determined in step S277 that the trigger information is acquired, the process flow moves to step S278.

In step S278, it is determined whether event information is specified in the trigger information acquired in the process of step S277. When it is determined in step S278 that event information is specified in the trigger information, the process flow moves to step S279.

In step S279, the analyzation unit 255 edits the EMT based on the editing details of the event information included in the trigger information. Here, an editing operation of updating the time at which an executing action for application 1 is performed, which is prescribed in the EMT, from time T1 to time T1A or deleting the inject event action at time T2 for application 1 is performed.

On the other hand, when it is determined in step S278 that event information is not specified in the trigger information, the process flow moves to step S280. In step S280, the application control unit 257 controls the application engine 222 to perform an action for the application included in the trigger information.

When it is determined in step S277 that the trigger information is not acquired, the processes of steps S278 to S280 are skipped and the process flow moves to step S281. When the process of step S279 or S280 ends, the process flow moves to step S281.

In step S281, it is determined whether the program in execution is terminated. When it is determined in step S281 that the program in execution is not terminated, the process flow is returned to step S275 and the subsequent processes thereof are repeated. When it is determined in step S281 that the program in execution is terminated, the hybrid application control process illustrated in FIG. 33 ends.

The flow of the hybrid application control process has been described above. The hybrid application control process corresponds to the above-mentioned use case 3.

(Application Distributing Process)

Figure 34:
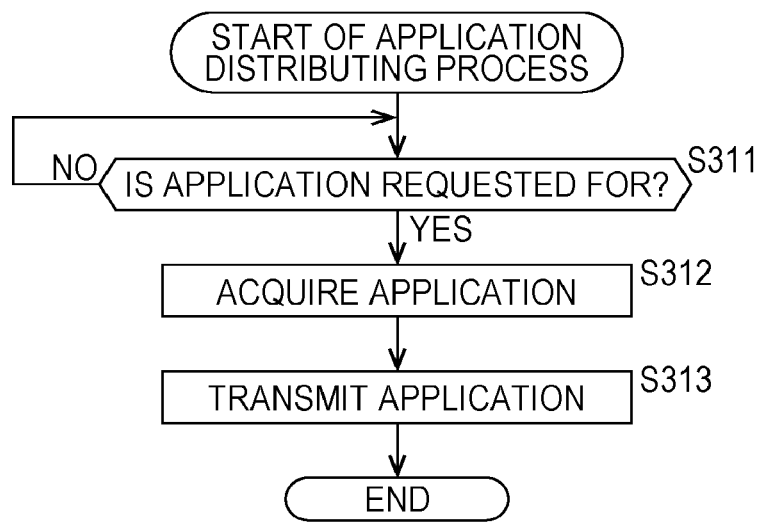
FIG. 34 is a flowchart illustrating a flow of an application distributing process.

A flow of an application distributing process which is performed by the application server 30 illustrated in FIG. 24 will be described below with reference to the flowchart illustrated in FIG. 34.

In step S311, the control unit 311 normally monitors a communication state of the communication unit 314 and determines whether an application is requested for from the receiving device 20. When it is determined in step S311 that an application is not requested for, the determination process of step S311 is repeated. That is, the process flow waits until an application is requested for by the receiving device 20 in step S311 and the process flow moves to step S312.

In step S312, the communication unit 314 acquires an application stored in the application storage unit 313 under the control by the control unit 311. In step S313, the communication unit 314 transmits the application acquired in the process of step S312 to the receiving device 20 as a request source via the Internet 90 under the control by the control unit 311. When the process of step S313 ends, the application distributing process illustrated in FIG. 34 ends.

The flow of the application distributing process has been described above.

(Metadata Distributing Process)

Figure 35:
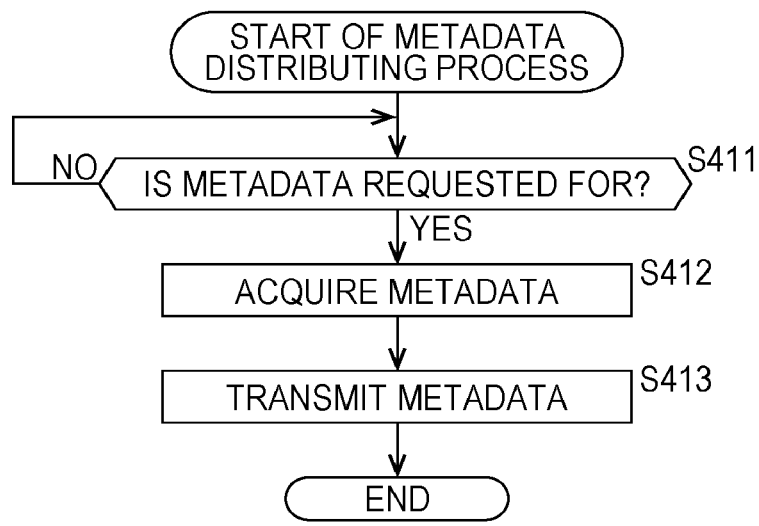
FIG. 35 is a flowchart illustrating a flow of a metadata distributing process.

A flow of a metadata distributing process which is performed by the metadata server 40 illustrated in FIG. 24 will be described below with reference to the flowchart illustrated in FIG. 35.

In step S411, the control unit 411 normally monitors a communication state of the communication unit 414 and determines whether metadata is requested for from the receiving device 20. When it is determined in step S411 that metadata is not requested for, the determination process of step S411 is repeated. That is, the process flow waits until metadata is requested for by the receiving device 20 in step S411 and then the process flow moves to step S412.

In step S412, the communication unit 414 acquires metadata stored in the metadata storage unit 413 under the control by the control unit 411. In step S413, the communication unit 414 transmits the metadata acquired in the process of step S412 to the receiving device 20 as a request source via the Internet 90 under the control by the control unit 411. When the process of step S413 ends, the metadata distributing process illustrated in FIG. 35 ends.

The flow of the metadata distributing process has been described above.

(Trigger Information Distributing Process)

Figure 36:
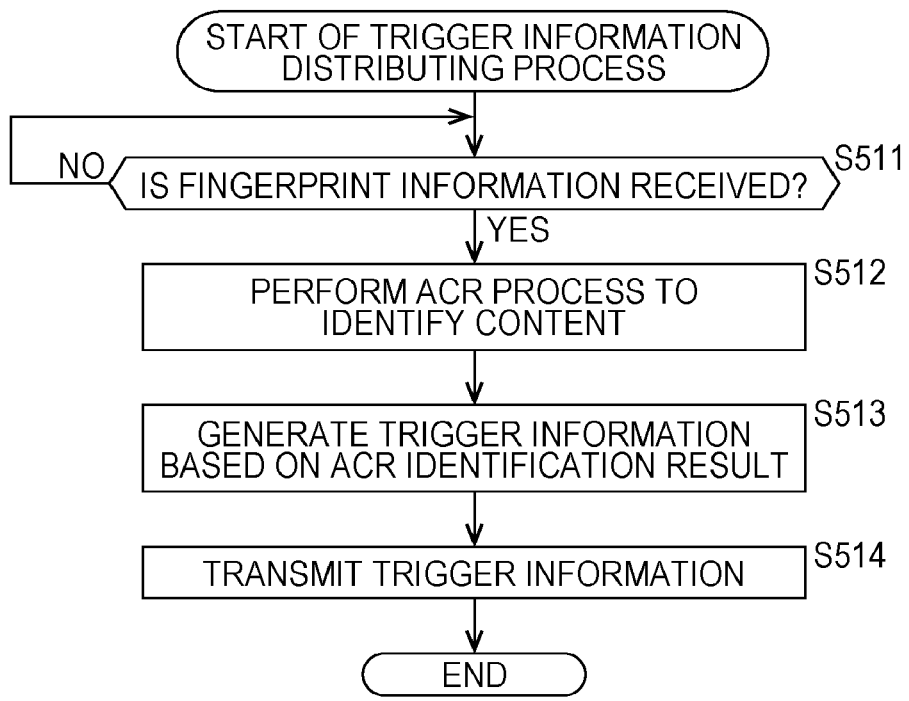
FIG. 36 is a flowchart illustrating a flow of a trigger information distributing process.

A flow of a trigger information distributing process which is performed by the ACR server 50 illustrated in FIG. 24 will be described below with reference to the flowchart illustrated in FIG. 36.

In step S511, trigger information is inquired about by the receiving device 20 and it is determined whether fingerprint information is received. When it is determined in step S511 that fingerprint information is not received, the determination process of step S511 is repeated. That is, the process flow waits until fingerprint information is received by the communication unit 511 in step S511 and then the process flow moves to step S512.

In step S512, the ACR identification processing unit 512 compares the fingerprint information received in the process of step S511 with the predetermined FP database 513 and performs an ACR identification process of identifying AV content in execution in the receiving device 20 as an inquiry source.

In step S513, the trigger information generating unit 514 generates trigger information based on the result of the ACR identification process acquired in the process of step S512 and a variety of information registered in the trigger information database 515.

In step S514, the communication unit 511 transmits the trigger information generated in the process of step S513 to the receiving device 20 as an inquiry source via the Internet 90. When the process of step S514 ends, the trigger information distributing process illustrated in FIG. 36 ends.

The flow of the trigger information distributing process has been described above.

Broadcast content such as a recorded program or a live program have been described above as the AV content, but communication content instead of the broadcast content may be streaming-distributed from a streaming server (not illustrated) via the Internet 90.

<6. Configuration of Computer>

Figure 37:
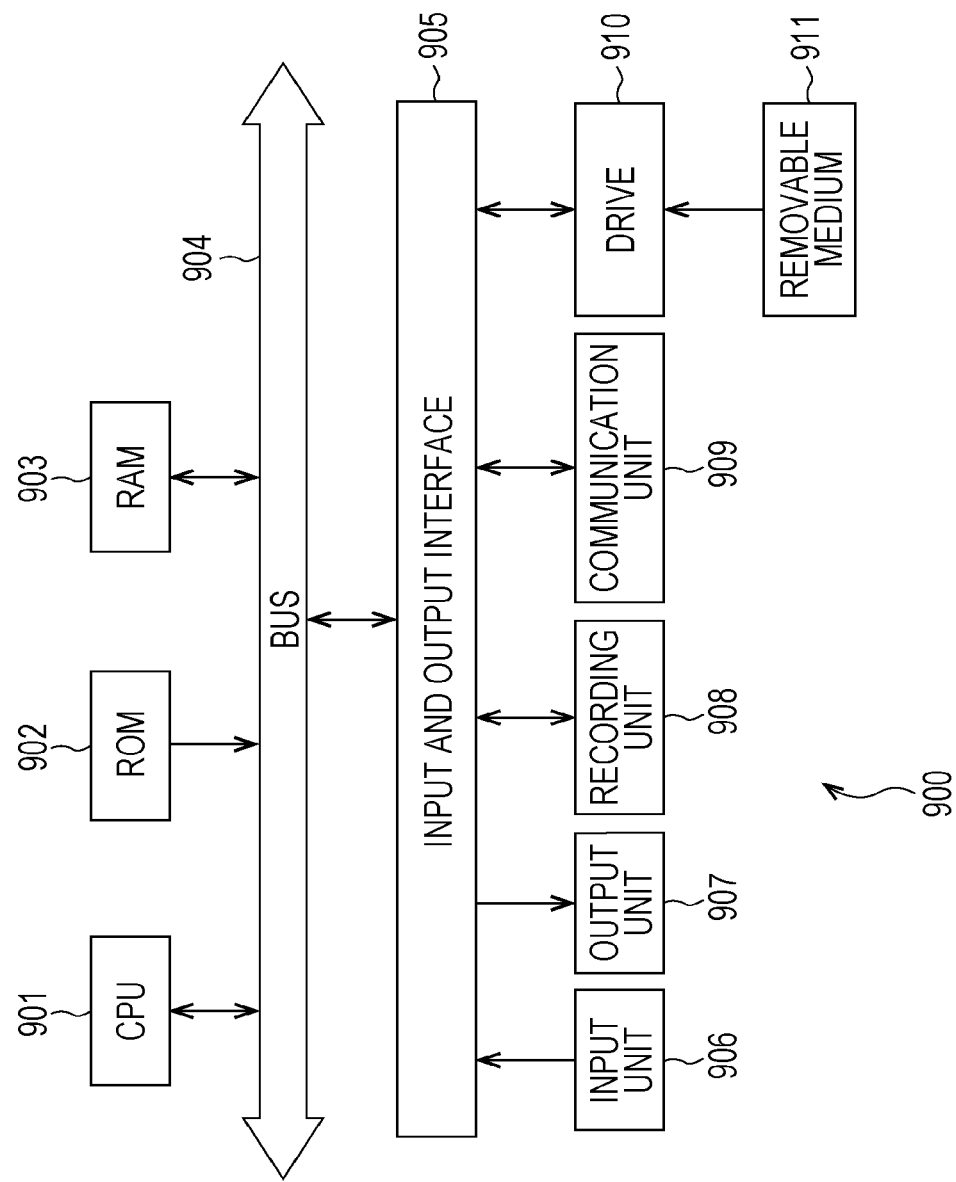
FIG. 37 is a diagram illustrating a configuration example of a computer.

The above-mentioned series of processes may be performed by hardware or may be performed by software. When a series of processes is performed by software, a program constituting the software is installed in a computer. FIG. 37 is a diagram illustrating a hardware configuration example of a computer which performs the above-mentioned series of processes using a program.

In a computer 900, a central processing unit (CPU) 901, read only memory (ROM) 902, and random access memory (RAM) 903 are connected to each other via a bus 904. The bus 904 is also connected to an input and output interface 905. The input and output interface 905 is connected to an input unit 906, an output unit 907, a recording unit 908, a communication unit 909, and a drive 910.

The input unit 906 is constituted by a keyboard, a mouse, a microphone, and the like. The output unit 907 is constituted by a display, a speaker, and the like. The recording unit 908 is constituted by a hard disk, nonvolatile memory, and the like. The communication unit 909 is constituted by a network interface and the like. The drive 910 drives a removable medium 911 such as a magnetic disk, an optical disk, a magneto-optical disk, or semiconductor memory.

In the computer 900 having the above-mentioned configuration, the above-mentioned series of processes is performed by causing the CPU 901 to load a program stored in the ROM 902 or the recording unit 908 to the RAM 903 via the input and output interface 905 and the bus 904 and to execute the loaded program.

The program which is executed by the computer 900 (the CPU 901) can be recorded and be provided in the removable medium 911, for example, as a package medium. The program can be provided via a wired or wireless transmission medium such as a local area network, the Internet, or digital satellite broadcast.

In the computer 900, the program can be installed in the recording unit 908 via the input and output interface 905 by mounting the removable medium 911 in the drive 910. The program may be received by the communication unit 909 via a wired or wireless transmission medium and may be installed in the recording unit 908. Otherwise, the program may be installed in the ROM 902 or the recording unit 908 in advance.

In this specification, the processes which are performed in accordance with the program by the computer do not need to be performed in a time series in the order in which the processes are described in the flowcharts. That is, the processes which are performed in accordance with the program by the computer include the processes which are performed in parallel or individually (for example, parallel processes or processes by objects). The program may be executed by a single computer (processor) or may be distributed and executed by plural computers.

The present technique is not limited to the above-mentioned embodiments, but can be modified in various forms without departing from the gist of the present technique.

The present technique can have the following configurations.

(1)

A receiving device including:

a first acquiring unit that acquires trigger information including at least location information as information for controlling an operation of an application which is executed in conjunction with audio-video (AV) content;

a second acquiring unit that acquires application control information for controlling the operation of the application; and a control unit that controls the operation of the application based on the trigger information and the application control information.

(2)

The receiving device described in (1), wherein the trigger information includes time information serving as a reference of a time to control the operation of the application, the second acquiring unit acquires schedule control information in which the operation of the application is prescribed in a time series, and the control unit controls the operation of the application based on action information for the application corresponding to the time when the time counted based on the time information passes through the time prescribed in the schedule control information.

(3)

The receiving device described in (2), wherein the application is constituted by a plurality of files, the second acquiring unit acquires cache control information for controlling a cache of a file group constituting the application, and the control unit stores the file group constituting the application in a cache memory based on the cache control information.

(4)

The receiving device described in (2) or (3), wherein the trigger information includes editing information for editing details prescribed in the schedule control information, and the control unit edits the schedule control information based on the editing information.

(5)

The receiving device described in (3) or (4), wherein the location information is information for acquiring the application control information, the schedule control information, and the cache control information, and the application control information, the schedule control information, and the cache control information are correlated by identification information of the application.

(6)

The receiving device described in (1), wherein the trigger information includes action information for the application, and the control unit controls the operation of the application based on the action information included in the trigger information when the trigger information is acquired.

(7)

The receiving device described in (6), wherein the application is constituted by a plurality of files, the second acquiring unit acquires cache control information for controlling a cache of a file group constituting the application, and the control unit stores the file group constituting the application in a cache memory based on the cache control information.

(8)

The receiving device described in (7), wherein the location information is information for acquiring the application control information and the cache control information, and the trigger information, the application control information, and the cache control information are correlated by identification information of the application.

(9)

The receiving device described in any of (1) to (8), wherein the AV content is broadcast content which is transmitted by a digital broadcast signal, the trigger information is included in the digital broadcast signal and is distributed along with the digital broadcast signal or distributed from a server on the Internet, and the first acquiring unit acquires the trigger information which is distributed in broadcast or communication.

(10)

A receiving method of a receiving device, the receiving method including:

acquiring trigger information including at least location information as information for controlling an operation of an application which is executed in conjunction with AV content;

acquiring application control information for controlling the operation of the application; and controlling the operation of the application based on the trigger information and the application control information, the acquiring trigger information, the acquiring application control information, and the controlling the operation of the application being performed by the receiving device.

(11)

A transmitting device including:

an acquiring unit that acquires AV content;

a first generating unit that generates trigger information including at least location information as information for controlling an operation of an application which is executed in conjunction with the AV content;

a second generating unit that generates application control information for controlling the operation of the application; and a transmitter unit that transmits the trigger information and the application control information along with the AV content.

(12)

The transmitting device described in (11), wherein the first generating unit generates the trigger information including time information serving as a reference of a time to control the operation of the application, the second generating unit generates schedule control information in which the operation of the application is prescribed in a time series, and the transmitter unit transmits the trigger information including the time information and the schedule control information.

(13)

The transmitting device described in (12), wherein the application is constituted by a plurality of files, the second generating unit generates cache control information for controlling a cache of a file group constituting the application, and the transmitter unit additionally transmits the cache control information.

(14)

The transmitting device described in (12) or (13), wherein the first generating unit generates the trigger information including editing information for editing details prescribed in the schedule control information, and the transmitter unit transmits the trigger information including the editing information.

(15)

The transmitting device described in (13) or (14), wherein the location information is information for acquiring the application control information, the schedule control information, and the cache control information, and the application control information, the schedule control information, and the cache control information are correlated by identification information of the application.

(16)

The transmitting device described in (11), wherein the first generating unit generates the trigger information including action information for the application, and the transmitter unit transmits the trigger information including the action information.

(17)

The transmitting device described in (16), wherein the application is constituted by a plurality of files, the second generating unit generates cache control information for controlling a cache of a file group constituting the application, and the transmitter unit additionally transmits the cache control information.

(18)

The transmitting device described in (17), wherein the location information is information for acquiring the application control information and the cache control information, and the trigger information, the application control information, and the cache control information are correlated by identification information of the application.

(19)

The transmitting device described in any of (11) to (18), wherein the AV content is broadcast content, and the transmitter unit transmits the trigger information and the application control information along with the AV content using a digital broadcast signal.

(20)

A transmitting method of a transmitting device, the transmitting method including:

acquiring AV content;

generating trigger information including at least location information as information for controlling an operation of an application which is executed in conjunction with the AV content;

generating application control information for controlling the operation of the application; and transmitting the trigger information and the application control information along with the AV content, the acquiring AV content, the generating trigger information, the generating application control information, and the transmitting the trigger information and the application control information being performed by the transmitting device.

REFERENCE SIGNS LIST

1 Broadcast communication system
10 Transmitting device
20 Receiving device
30 Application server
40 Metadata server
50 ACR server
90 Internet
111 Signaling information generating unit
113 Metadata generating unit
115 Audio data acquiring unit
117 Video data acquiring unit
119 Trigger information generating unit
121 Transmitter unit
212 Tuner
218 Control unit
221 Communication unit
222 Application engine
223 Cache memory
251 Signaling information acquiring unit
252 Trigger information acquiring unit
253 Metadata acquiring unit
254 Fingerprint information acquiring unit
255 Analyzation unit
256 Media time counting unit
257 Application control unit
311 Control unit
313 Application storage unit
314 Communication unit
411 Control unit
413 Metadata storage unit
414 Communication unit
511 Communication unit
512 ACR identification processing unit
514 Trigger information generating unit
900 Computer
901 CPU

The invention claimed is:

1. A receiving device comprising:
circuitry configured to
acquire a digital broadcast signal that includes audio-video (AV) content and location information, the location information indicating a source from which application control information for controlling an operation of an application executed in conjunction with a progressing timing of the AV content is obtainable;
acquire the application control information from the source indicated by the location information, the application control information including an application ID and a uniform resource locator (URL);
obtain, from the URL included in the acquired application control information, control information during a polling period that is defined in accordance with an attribute specified in the acquired application control information; and
control the operation of the application based on the acquired application control information and the obtained control information.

2. The receiving device according to claim 1, wherein
the digital broadcast signal includes time information serving as a reference of a time to control the operation of the application, and
the circuitry is configured to
acquire schedule control information in which the operation of the application is prescribed in a time series; and
control the operation of the application based on action information for the application corresponding to a time when a time counted based on the time information passes through a time prescribed in the schedule control information.

3. The receiving device according to claim 2, wherein
the application is constituted by a plurality of files, and
the circuitry is configured to
acquire cache control information for controlling a cache of a file group constituting the application; and
store the file group constituting the application in a cache memory based on the cache control information.

4. The receiving device according to claim 3, wherein
the digital broadcast signal includes editing information for editing details prescribed in the schedule control information, and
the circuitry is configured to edit the schedule control information based on the editing information.

5. The receiving device according to claim 1, wherein
the circuitry is configured to
acquire schedule control information in which the operation of the application is prescribed in a time series; and
acquire cache control information for controlling a cache of a file group constituting the application,
the location information indicates the source from which the schedule control information or the cache control information is obtainable, and
the application control information, the schedule control information, and the cache control information are correlated by identification information of the application.

6. The receiving device according to claim 1, wherein
the digital broadcast signal includes action information for the application, and
the circuitry is configured to control the operation of the application based on the action information when the action information is acquired.

7. The receiving device according to claim 6, wherein
the application is constituted by a plurality of files, and
the circuitry is configured to
acquire cache control information for controlling a cache of a file group constituting the application; and
store the file group constituting the application in a cache memory based on the cache control information.

8. The receiving device according to claim 1, wherein
the circuitry is configured to acquire cache control information for controlling a cache of a file group constituting the application,
the location information further indicates the source from which the cache control information is obtainable, and
the location information, the application control information, and the cache control information are correlated by identification information of the application.

9. A receiving method of a receiving device, the receiving method comprising:
acquiring a digital broadcast signal that includes audio-video (AV) content and location information, the location information indicating a source from which application control information for controlling an operation of an application executed in conjunction with a progressing timing of the AV content is obtainable;

acquiring the application control information from the source indicated by the location information, the application control information including an application ID and a uniform resource locator (URL);

obtaining, from the URL included in the acquired application control information, control information during a polling period that is defined in accordance with an attribute specified in the acquired application control information; and controlling the operation of the application based on the acquired application control information and the obtained control information.

10. A transmitting device comprising:
circuitry configured to
generate application control information for controlling an operation of an application executed in conjunction with a progressing timing of audio-video (AV) content, the application control information including an attribute that defines a polling period specifying a timing for obtaining control information for controlling the operation of the application, and the application control information including an application ID and a uniform resource locator (URL) for obtaining the control information; and
generate location information indicating a source from which the application control information is obtainable; and
a transmitter configured to transmit a digital broadcast signal that includes the AV content and the location information.

11. The transmitting device according to claim 10, wherein
the circuitry is configured to
generate schedule control information in which the operation of the application is prescribed in a time series; and
generate cache control information for controlling a cache of a file group constituting the application,
the location information indicates the source from which the schedule control information or the cache control information is obtainable, and
the application control information, the schedule control information, and the cache control information are correlated by identification information of the application.

12. A transmitting method of a transmitting device, the transmitting method comprising:
generating application control information for controlling an operation of an application executed in conjunction with a progressing timing of audio-video (AV) content, the application control information including an attribute that defines a polling period specifying a timing for obtaining control information for controlling the operation of the application, and the application control information including an application ID and a uniform resource locator (URL) for obtaining the control information;
generating location information indicating a source from which the application control information is obtainable; and
transmitting a digital broadcast signal that includes the AV content and the location information.

13. The receiving device according to claim 1, wherein the circuitry includes:
a digital broadcast signal receiver configured to receive the digital broadcast signal; and
a communication interface configured to acquire the application control information from the source, which is a server accessible over a network as indicated by the location information included in the received digital broadcast signal.

14. The receiving device according to claim 1, wherein the location information includes another uniform resource locator (URL) incorporating a code that specifies a purpose of the other URL being for indicating the source from which the application control information is obtainable.

15. The receiving method according to claim 9, wherein the location information includes a-another uniform resource locator (URL) incorporating a code that specifies a purpose of the other URL being for indicating the source from which the application control information is obtainable.

16. The receiving method of claim 9, wherein
the digital broadcast signal includes time information serving as a reference of a time to control the operation of the application, and
the method further comprises:
acquiring schedule control information in which the operation of the application is prescribed in a time series; and
controlling the operation of the application based on action information for the application corresponding to a time when a time counted based on the time information passes through a time prescribed in the schedule control information.

17. The receiving method of claim 9, further comprising:
acquiring schedule control information in which the operation of the application is prescribed in a time series; and
acquiring cache control information for controlling a cache of a file group constituting the application,
wherein the location information indicates the source from which the schedule control information or the cache control information is obtainable, and
wherein the application control information, the schedule control information, and the cache control information are correlated by identification information of the application.

18. The receiving method of claim 9, wherein
the digital broadcast signal includes action information for the application, and
the method further comprises controlling the operation of the application based on the action information when the action information is acquired.

19. The receiving method of claim 9, further comprising:
acquiring cache control information for controlling a cache of a file group constituting the application,
wherein the location information further indicates the source from which the cache control information is obtainable, and
wherein the location information, the application control information, and the cache control information are correlated by identification information of the application.

20. The receiving method of claim 9, wherein the receiving device includes:
a digital broadcast signal receiver configured to receive the digital broadcast signal; and a communication interface configured to acquire the application control information from the source, which is a server accessible over a network as indicated by the location information included in the received digital broadcast signal.

21. A receiving device comprising:
circuitry configured to
  acquire a digital broadcast signal that includes audio-video (AV) content and location information, the location information indicating a source from which application control information for controlling an operation of an application executed in conjunction with a progressing timing of the AV content is obtainable;
  acquire the application control information from the source indicated by the location information, the application control information including an application ID and a uniform resource locator (URL);
  obtain, from the URL included in the acquired application control information, control information during a polling period that is defined in accordance with an attribute specified in the acquired application control information; and
  control the operation of the application based on the acquired application control information and the obtained control information,
wherein the circuitry is further configured to acquire schedule control information in which the operation of the application is prescribed in a time series, and
wherein the times series includes at least a time of a set including:
  (i) a time prescribed to fetch the application,
  (ii) a time prescribed to execute the application, and
  (iii) a time prescribed to terminate the application.

22. A receiving method of a receiving device, the receiving method comprising:
  acquiring a digital broadcast signal that includes audio-video (AV) content and location information, the location information indicating a source from which application control information for controlling an operation of an application executed in conjunction with a progressing timing of the AV content is obtainable;
  acquiring the application control information from the source indicated by the location information, the application control information including an application ID and a uniform resource locator (URL);
  obtaining, from the URL included in the acquired application control information, control information during a polling period that is defined in accordance with an attribute specified in the acquired application control information; and
  controlling the operation of the application based on the acquired application control information and the obtained control information,
  acquiring schedule control information in which the operation of the application is prescribed in a time series, and
  wherein the times series includes at least a time of a set including:
    (i) a time prescribed to fetch the application,
    (ii) a time prescribed to execute the application, and
    (iii) a time prescribed to terminate the application.

23. The receiving device according to claim 1, wherein the receiving device is a television receiver.

24. The receiving device according to claim 23, wherein the receiving device includes a display and a speaker.

* * * * *